US012391037B2

(12) United States Patent
Tsuyuki et al.

(10) Patent No.: US 12,391,037 B2
(45) Date of Patent: Aug. 19, 2025

(54) LIQUID DISCHARGE APPARATUS

(71) Applicant: SEIKO EPSON CORPORATION, Tokyo (JP)

(72) Inventors: Masahiko Tsuyuki, Chino (JP); Makoto Takamuku, Matsumoto (JP); Kazuya Imura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 164 days.

(21) Appl. No.: 18/477,576

(22) Filed: Sep. 29, 2023

(65) Prior Publication Data

US 2024/0109301 A1 Apr. 4, 2024

(30) Foreign Application Priority Data

Sep. 30, 2022 (JP) ................................ 2022-158886

(51) Int. Cl.
*B41J 2/045* (2006.01)
*B41J 29/377* (2006.01)

(52) U.S. Cl.
CPC ....... *B41J 2/04548* (2013.01); *B41J 2/04541* (2013.01); *B41J 2/0455* (2013.01); *B41J 2/04581* (2013.01); *B41J 29/377* (2013.01)

(58) Field of Classification Search
CPC ......................... B41J 2/04548; B41J 2/14072; B41J 2/04541; B41J 2/0455
See application file for complete search history.

(56) References Cited

U.S. PATENT DOCUMENTS 10,265,949 B2 4/2019 Matsumoto

FOREIGN PATENT DOCUMENTS

| | | | | |
|---|---|---|---|---|
| CN | 114425911 A | * | 5/2022 | ................ B41J 2/01 |
| CN | 114425914 A | * | 5/2022 | .......... B41J 2/04501 |
| CN | 114425915 A | * | 5/2022 | .......... B41J 2/04501 |
| JP | 2018-099835 A | | 6/2018 | |

OTHER PUBLICATIONS

Matsumoto, MachineTranslationofCN-114425914-A, 2022 (Year: 2022).*
Matsumoto, MachineTranslationofCN-114425911-A, 2022 (Year: 2022).*
Matsumoto, MachineTranslationofCN-114425915-A, 2022 (Year: 2022).*

* cited by examiner

*Primary Examiner* — Scott A Richmond
(74) *Attorney, Agent, or Firm* — Harness, Dickey & Pierce, P.L.C.

(57) ABSTRACT

There is provided a liquid discharge apparatus including a substrate unit, and includes a wiring substrate having a plurality of rigid members and flexible member, in which a first rigid member, and a second rigid member are positioned facing each other, a third rigid member laminated on a first surface of a third region of the flexible member is positioned such that a normal direction of a third front surface intersects a normal direction of a first front surface and a second front surface, the second connector is provided on a fourth rigid member laminated on a second surface of a third region of the flexible member, and a size of the third rigid member and a fourth rigid member is smaller than a size of the print head when a first discharge section is viewed from the first connector.

8 Claims, 32 Drawing Sheets

| [SIH, SIL] | | [1, 1] (LD) | [1, 0] (MD) | [0, 1] (SD) | [0, 0] (ND) |
|---|---|---|---|---|---|
| S1 | t1 | H | H | H | L |
| | t2 | H | L | L | L |
| S2 | t1 | L | L | L | H |
| | t2 | L | H | L | L |

LIQUID DISCHARGE APPARATUS

The present application is based on, and claims priority from JP Application Serial Number 2022-158886, filed Sep. 30, 2022, the disclosure of which is hereby incorporated by reference herein in its entirety.

BACKGROUND

1. Technical Field

The present disclosure relates to a liquid discharge apparatus.

2. Related Art

More than half a century passed since the liquid discharge technology using piezoelectric elements was invented, and the liquid discharge apparatus using the technology is utilized in a wide range of fields such as an ink jet printer and a color filter manufacturing apparatus. Nowadays, the basic technology of such a liquid discharge technology is established, and the focus of the market demand for a liquid discharge apparatus is to improve the productivity of a product produced by using the liquid discharge apparatus. In response to such market demands, the focus of technological development of liquid discharge technology is to increase the number of nozzles through which the liquid discharge apparatus discharges a liquid and to increase the discharge amount of ink discharged per unit time by the liquid discharge apparatus.

In JP-A-2018-099835, a printing apparatus (liquid discharge apparatus) devised to increase a discharge amount per unit time by using a plurality of heads provided with a large number of nozzles in order to increase productivity of a product, the apparatus including: a plurality of head units (liquid discharge heads) provided in a housing; a plurality of drive circuits for supplying a driving signal to the head unit; and a cooling mechanism for cooling the drive circuit, is disclosed.

However, although the liquid discharge apparatus described in JP-A-2018-099835 can improve productivity, it is not sufficient from the viewpoints of size reduction of the liquid discharge apparatus, improvement of liquid discharge accuracy, and the like, and there is room for improvement.

SUMMARY

According to an aspect of the present disclosure, there is provided a liquid discharge apparatus including: a print head that discharges a liquid; and a substrate unit electrically coupled to the print head, in which the print head includes a first discharge section that has a first piezoelectric element that is displaced by receiving a first driving signal and discharges a liquid by displacement of the first piezoelectric element, and a first connector electrically coupled to the substrate unit, the substrate unit includes a second connector that is electrically coupled to the print head by being fitted to the first connector, and a wiring substrate provided with a plurality of circuit components having the second connector, the wiring substrate is a rigid flexible substrate including a plurality of rigid members provided with the plurality of circuit components and a flexible member more flexible than the plurality of rigid members, the flexible member includes a first surface, a second surface opposite to the first surface, a first region, a second region, a third region, a fourth region, and a fifth region, the fourth region is positioned between the first region and the second region, the fifth region is positioned between the second region and the third region, the plurality of rigid members include a first rigid member, a second rigid member, a third rigid member, and a fourth rigid member, the first rigid member includes a first front surface, and is laminated on the first surface of the first region such that the first front surface extends along the first surface, the second rigid member includes a second front surface, and is laminated on the first surface of the second region such that the second front surface extends along the first surface, the third rigid member includes a third front surface, and is laminated on the first surface of the third region such that the third front surface extends along the first surface, the fourth rigid member includes a fourth front surface, and is laminated on the second surface of the third region such that the fourth front surface extends along the second surface, the first rigid member and the second rigid member are positioned such that the first front surface and the second front surface face each other when the flexible member is bent in the fourth region, the third rigid member is positioned such that a normal direction of the third front surface intersects both a normal direction of the first front surface and a normal direction of the second front surface when the flexible member is bent in the fifth region, the second connector is provided on the fourth rigid member, and sizes of the third rigid member and the fourth rigid member when viewed along a direction from the third rigid member to the fourth rigid member are smaller than a size of the print head when viewed along a direction from the first connector to the first discharge section.

DESCRIPTION OF EMBODIMENTS

Figure 1:
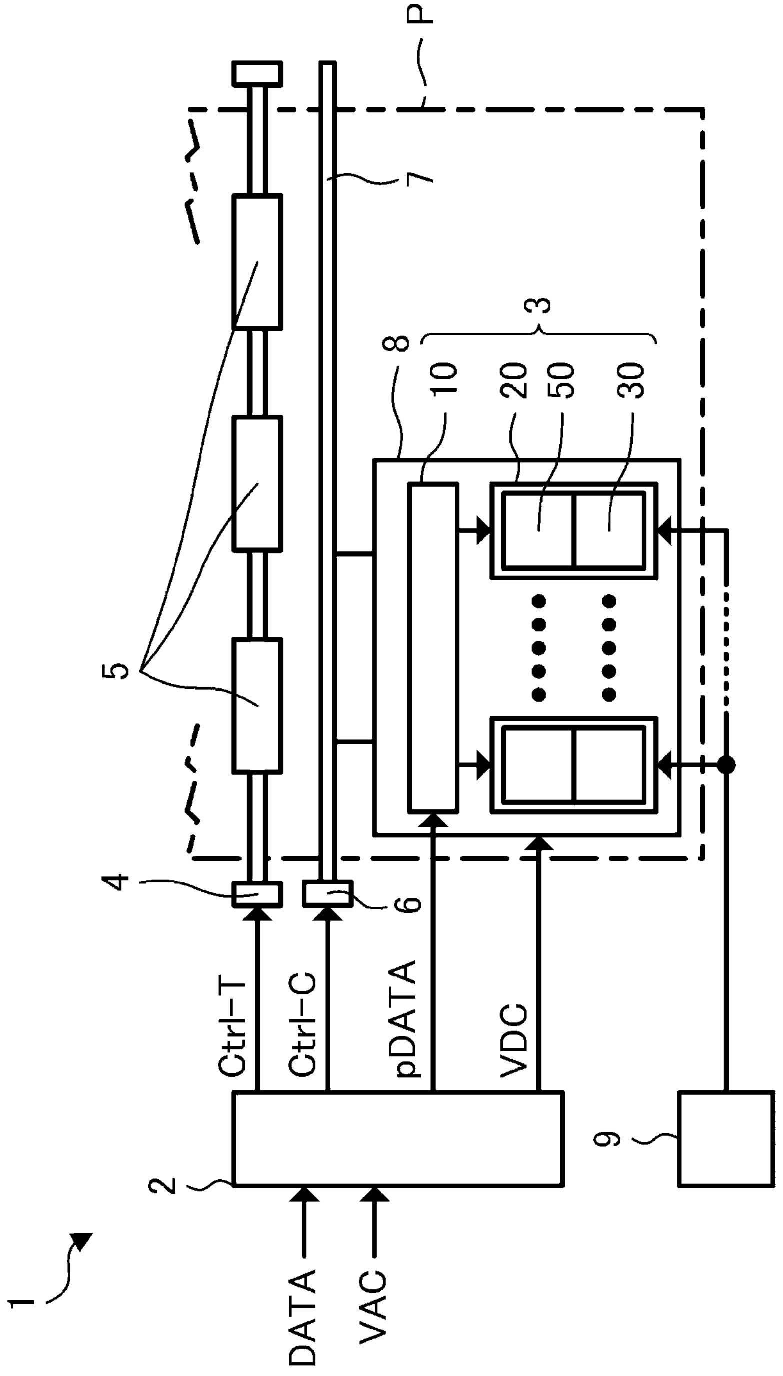
FIG. 1 is a diagram illustrating a schematic configuration of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the range of the claims. Moreover, not all of the configurations which will be described below are necessarily essential components of the present disclosure.

1. Functional Configuration of Liquid Discharge Apparatus

1.1 Functional Configuration of Liquid Discharge Apparatus

FIG. 1 is a view illustrating a schematic configuration of a liquid discharge apparatus 1. The liquid discharge apparatus 1 of the present embodiment is a so-called ink jet printer that forms a desired image on a front surface of a medium P by discharging an ink, which is an example of a liquid, to the transported medium P at a desired timing. Here, in the following description, the direction in which the medium P is transported may be referred to as a transport direction.

As illustrated in FIG. 1, the liquid discharge apparatus 1 includes a control unit 2, a head unit 3, a transport motor 4, a transport roller 5, a carriage motor 6, a carriage guide shaft 7, a carriage 8, and a liquid container 9.

The control unit 2 generates a control signal for controlling each element of the liquid discharge apparatus 1 based on image data DATA supplied from an external device such as a host computer (not illustrated) provided outside the liquid discharge apparatus 1, and outputs the control signal to the corresponding configuration. Further, the control unit 2 generates a voltage signal VDC used for a power supply voltage of each section of the liquid discharge apparatus 1 from a commercial voltage VAC of an AC voltage supplied to the liquid discharge apparatus 1, and supplies the voltage signal VDC to each section of the liquid discharge apparatus 1.

Specifically, the control unit 2 generates a transport control signal Ctrl-T as a control signal for controlling each element of the liquid discharge apparatus 1, and outputs the transport control signal Ctrl-T to the transport motor 4. The transport motor 4 is driven based on the input transport control signal Ctrl-T. The transport roller 5 is rotationally driven by the drive of the transport motor 4. Then, the medium P is transported along the transport direction by the driving force generated by the rotational drive of the transport roller 5. That is, the transport motor 4 and the transport roller 5 transport the medium P in response to the transport control signal Ctrl-T output by the control unit 2.

Further, the control unit 2 generates a carriage control signal Ctrl-C as a control signal for controlling each element of the liquid discharge apparatus 1, and outputs the carriage control signal Ctrl-C to the carriage motor 6. The carriage motor 6 is driven based on the input carriage control signal Ctrl-C. The driving force generated by driving the carriage motor 6 is transmitted to the carriage 8 supported by the carriage guide shaft 7 via a timing belt (not illustrated). The carriage guide shaft 7 extends along the direction intersecting the transport direction and supports the carriage 8. Then, the carriage 8 supported by the carriage guide shaft 7 by the driving force generated by the drive of the carriage motor 6 moves along the carriage guide shaft 7. That is, the carriage motor 6 and the carriage guide shaft 7 move the carriage 8 along the carriage guide shaft 7 in response to the carriage control signal Ctrl-C output by the control unit 2.

Further, the control unit 2 generates a print data signal pDATA as a control signal for controlling each element of the liquid discharge apparatus 1, and outputs the print data signal pDATA to the head unit 3. The head unit 3 has a discharge control module 10 and a plurality of liquid discharge modules 20. Further, each of the plurality of liquid discharge modules 20 has a drive circuit module 50 and a print head 30. That is, the head unit 3 has a plurality of sets of the drive circuit module 50 and the print head 30. The head unit 3 is mounted on the carriage 8 and moves as the carriage 8 moves along the carriage guide shaft 7.

The print data signal pDATA output by the control unit 2 is input to the discharge control module 10. The discharge control module 10 generates a control signal for controlling the operation of each of the plurality of liquid discharge modules 20 based on the input print data signal pDATA, and outputs the control signal to the corresponding liquid discharge module 20. The control signal output by the discharge control module 10 is input to the corresponding drive circuit module 50. The drive circuit module 50 is electrically coupled to the corresponding print head 30, and drives the print head 30 to discharge an amount of ink defined by the control signal at a timing defined by the input control signal.

As a result, the print head 30 discharges a predetermined amount of ink at a predetermined timing. That is, the head unit 3 discharges a predetermined amount of ink from the print head 30 at a predetermined timing in accordance with the print data signal pDATA output by the control unit 2.

The liquid container 9 stores ink discharged from the print head 30. The ink stored in the liquid container 9 is supplied to the print head 30 via a tube (not illustrated) or the like. As the liquid container 9, an ink cartridge, a bag-shaped ink pack made of a flexible film, an ink tank capable of replenishing ink, and the like can be used.

As described above, in the liquid discharge apparatus 1, the control unit 2 controls the transport of the medium P, the movement of the carriage 8, and the discharge timing of the ink from the print head 30 mounted on the carriage 8. As a result, the ink can land on the medium P at a desired position, and as a result, a desired image is formed on the medium P.

1.2 Functional Configuration of Head Unit

Figure 2A:
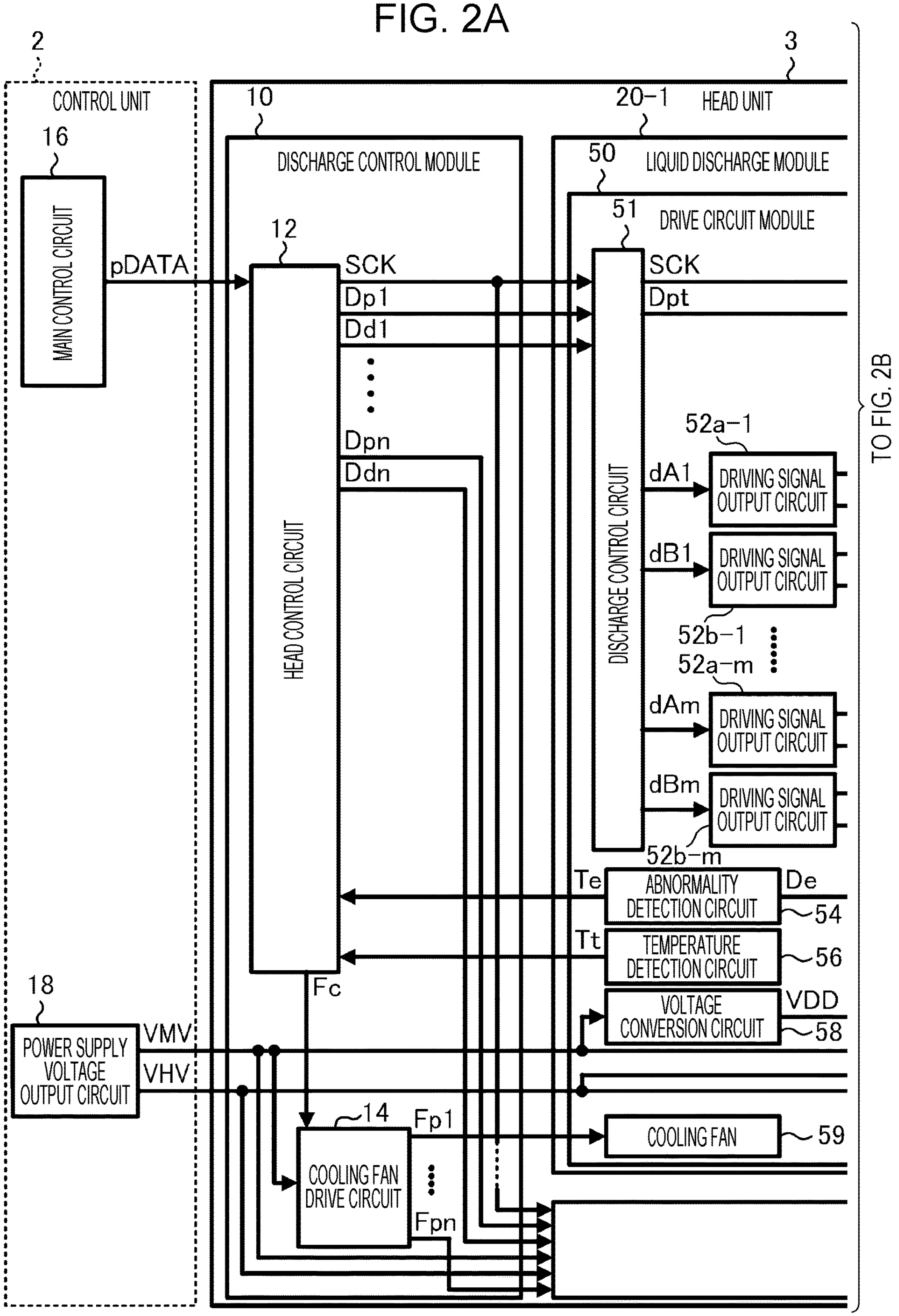
FIGS. 2A and 2B are diagrams illustrating an example of a functional configuration of a head unit.
Figure 2B:
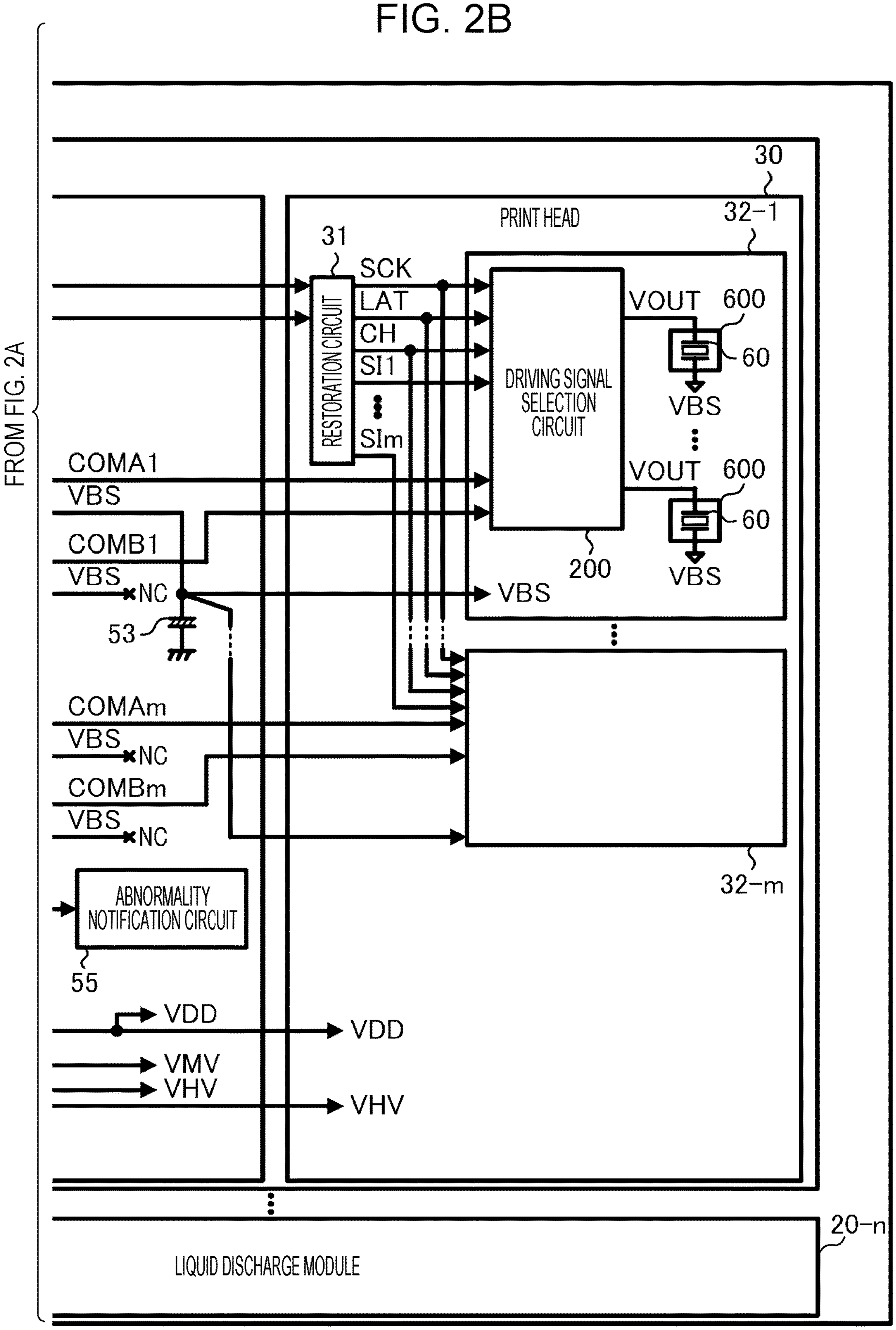

Next, the details of the functional configuration of the head unit 3 included in the liquid discharge apparatus 1 will be described. FIGS. 2A and 2B are diagrams illustrating an example of a functional configuration of the head unit 3. As illustrated in FIGS. 2A and 2B, the head unit 3 includes a discharge control module 10 and a plurality of liquid discharge modules 20. Here, the plurality of liquid discharge modules 20 included in the head unit 3 all have the same configuration, but when the plurality of liquid discharge modules 20 are distinguished, the plurality of liquid discharge modules 20 may be referred to as liquid discharge modules 20-1 to **20-*n*. That is, the head unit 3 illustrated in FIGS. 2A and 2B may be described as having n liquid discharge modules 20-1 to 20-*n* as the n liquid discharge modules 20**.

In addition, FIGS. 2A and 2B illustrate a main control circuit 16 and a power supply voltage output circuit 18, which are a part of the configuration included in the control unit 2, in addition to the configuration of the head unit 3. The main control circuit 16 included in the control unit 2 includes a processing circuit such as a central processing unit (CPU) and a field programmable gate array (FPGA), and a storage circuit such as a semiconductor memory. In addition, the main control circuit 16 performs predetermined signal processing on the image data DATA supplied from an external device such as a host computer (not illustrated) provided outside the liquid discharge apparatus 1, generates the print data signal pDATA, and outputs the print data signal pDATA to the discharge control module 10.

The power supply voltage output circuit 18 includes an AC/DC converter such as a flyback circuit and a DC/DC converter such as a step-down circuit or a booster circuit. The power supply voltage output circuit 18 generates a voltage signal VHV, which is a DC voltage signal having a voltage value of 42 V, and a voltage signal VMV, which is a DC voltage signal having a voltage value of 24 V, as the voltage signal VDC from the commercial voltage VAC input from the outside of the liquid discharge apparatus 1, and outputs the generated signals to the discharge control module 10. In addition, the voltage value of the voltage signal VHV and the voltage value of the voltage signal VMV are not limited to 42 V and 24 V. Further, the power supply voltage output circuit 18 may output a DC voltage signal having a different voltage value as the voltage signal VDC in place of or in addition to the voltage signals VHV and VMV.

The discharge control module 10 operates using the voltage signals VHV and VMV output by the power supply voltage output circuit 18 or the DC voltage signal generated from the voltage signals VHV and VMV as the power supply voltage. Then, the discharge control module 10 generates a control signal for controlling the operation of n liquid discharge modules 20 based on the print data signal pDATA output by the control unit 2, and outputs the control signal to the corresponding liquid discharge module 20.

The discharge control module 10 includes a head control circuit 12 and a cooling fan drive circuit 14. The print data signal pDATA is input to the head control circuit 12 included in the discharge control module 10. The head control circuit 12 generates and outputs a clock signal SCK that is commonly input to the n liquid discharge modules 20, differential print data signals Dp1 to Dpn corresponding to each of the n liquid discharge modules 20, and differential drive data signals Dd1 to Ddn corresponding to each of the n liquid discharge modules 20, based on the input print data signal pDATA.

Specifically, the print data signal pDATA is a differential signal generated based on the image data DATA, and includes the clock signal SCK, the differential print data signals Dp1 to Dpn, and the differential drive data signals Dd1 to Ddn in serial. The head control circuit 12 deserializes and restores the input print data signal pDATA to generate the clock signal SCK that is commonly input to the n liquid discharge modules 20, and the head control circuit 12 deserializes the input print data signal pDATA to generate the differential print data signals Dp1 to Dpn and the differential drive data signals Dd1 to Ddn corresponding to each of the n liquid discharge modules 20. Then, the head control circuit 12 outputs the generated clock signal SCK, the differential print data signals Dp1 to Dpn, and the differential drive data signals Dd1 to Ddn to the corresponding liquid discharge module 20.

Here, in the following description, the differential print data signal Dp1 and the differential drive data signal Dd1 will be described as signals corresponding to the liquid discharge module 20-1, and the differential print data signal Dpn and the differential drive data signal Ddn will be described as signals corresponding to the liquid discharge module **20-*n*. That is, it will be described that the clock signal SCK, the differential print data signal Dp1, and the differential drive data signal Dd1 are input to the liquid discharge module 20-1, and the clock signal SCK, the differential print data signal Dpn, and the differential drive data signal Ddn are input to the liquid discharge module 20-*n*. Further, it will be described that the clock signal SCK, the differential print data signal Dp, and the differential drive data signal Dd are input to the liquid discharge module 20**.

Further, the head control circuit 12 generates a fan control signal Fc that controls the operation of the cooling fan drive circuit 14, and outputs the fan control signal Fc to the cooling fan drive circuit 14. The voltage signal VMV is input to the cooling fan drive circuit 14 in addition to the fan control signal Fc. The cooling fan drive circuit 14 switches whether or not to output the voltage signal VMV as fan driving signals Fp1 to Fpn based on the input fan control signal Fc. That is, the cooling fan drive circuit 14 has n switch circuits for switching whether or not to output the voltage signal VMV as the fan driving signals Fp1 to Fpn, and switches the conduction state of each of the n switch circuits by the input fan control signal Fc. That is, the cooling fan drive circuit 14 switches whether or not to output the voltage signal VMV as the fan driving signals Fp1 to Fpn.

The fan driving signals Fp1 to Fpn output by the cooling fan drive circuit 14 are output to the corresponding liquid discharge module 20. In the following description, it will be described that the fan driving signal Fp1 corresponds to the liquid discharge module 20-1 and the fan driving signal Fpn corresponds to the liquid discharge module 20-*n*. That is, the fan driving signal Fp1 is input to the liquid discharge module 20-1, and the fan driving signal Fpn is input to the liquid discharge module 20-*n*. Further, it will be described that the fan driving signal Fp is input to the liquid discharge module 20.

In addition, the cooling fan drive circuit 14 may convert the voltage signal VMV to a predetermined voltage value based on the input fan control signal Fc, and output the converted signal to the fan driving signals Fp1 to Fpn.

Further, the discharge control module 10 propagates the voltage signals VHV and VMV supplied from the power supply voltage output circuit 18 and supplies the voltage signals VHV and VMV to each of the liquid discharge modules 20-1 to 20-*n*.

The clock signal SCK, the differential print data signal Dp1, the differential drive data signal Dd1, the fan driving signal Fp1, and the voltage signals VHV and VMV output by the discharge control module 10 are input to the liquid discharge module 20-1. The liquid discharge module 20-1 operates using the voltage signals VHV and VMV or the DC voltage generated from the voltage signals VHV and VMV as the power supply voltage, and discharges an amount of ink defined by the differential print data signal Dp1 and the differential drive data signal Dd1 to the medium P at the timing defined by the differential print data signal Dp1 and the differential drive data signal Dd1.

The liquid discharge module 20-1 includes the drive circuit module 50 and the print head 30. Further, the drive circuit module 50 includes a discharge control circuit 51, driving signal output circuits 52a-1 to 52a-m and 52b-1 to 52b-m, a capacitor 53, an abnormality detection circuit 54, an abnormality notification circuit 55, a temperature detection circuit 56, a voltage conversion circuit 58, and a cooling fan 59.

The clock signal SCK, the differential print data signal Dp1, and the differential drive data signal Dd1 are input to the discharge control circuit 51. The discharge control circuit 51 analyzes the input differential print data signal Dp1 and the differential drive data signal Dd1 to generate and output the differential print data signal Dpt for controlling the operation of the print head 30, reference driving signals dA1 to dAm which are the basis of the driving signals COMA1 to COMAm to be described later, and reference driving signals dB1 to dBm which are the basis of the driving signals COMB1 to COMBm to be described later. The discharge control circuit 51 includes the FPGA configured with a circuit for analyzing the input differential print data signal Dp1 and the differential drive data signal Dd1.

That is, in the drive circuit module 50, the FPGA having the discharge control circuit 51 mounted thereon, into which the differential print data signal Dp1 and the differential drive data signal Dd1 are input, and which outputs the differential print data signal Dpt for controlling the operation of the print head 30 and the reference driving signals dA1 to dAm and dB1 to dBm which are the basis of the driving signals COMA1 to COMAm and COMB1 to COMBm based on the input differential print data signal Dp1 and the differential drive data signal Dd1.

Specifically, the discharge control circuit 51 analyzes the input differential print data signal Dp1 based on the input clock signal SCK. Then, the discharge control circuit 51 generates the differential print data signal Dpt of the differential signal corresponding to the analysis result of the differential print data signal Dp1 and outputs the differential print data signal Dpt to the print head 30. At this time, the discharge control circuit 51 may output the differential print data signal Dp1 as the differential print data signal Dpt according to the analysis result of the differential print data signal Dp1, and may output the signal subjected to the predetermined signal processing to the differential print data signal Dp1 as the differential print data signal Dpt. Further, the discharge control circuit 51 may output a signal including predetermined information read from a storage circuit (not illustrated) according to the analysis result of the differential print data signal Dp1 as the differential print data signal Dpt.

Further, the discharge control circuit 51 restores and analyzes the input differential drive data signal Dd1 into a single-ended signal based on the input clock signal SCK. Then, the discharge control circuit 51 generates reference driving signals dA1 to dAm and dB1 to dBm according to the analysis result, and outputs the generated signals to the corresponding driving signal output circuits 52a-1 to 52a-m and 52b-1 to 52b-m. Here, the discharge control circuit 51 may read out information held in a storage circuit (not illustrated) based on the analysis result of the single-ended signal obtained by restoring the differential drive data signal Dd1, generate the reference driving signals dA1 to dAm and dB1 to dBm including the read information, and output the generated signals to the corresponding driving signal output circuits 52a-1 to 52a-m and 52b-1 to 52b-m. Further, the discharge control circuit 51 may generate a single-ended signal by restoring the differential drive data signal Dd1, and deserialize the single-ended signal to generate the reference driving signals dA1 to dAm and dB1 to dBm and output the generated signals to the corresponding driving signal output circuits 52a-1 to 52a-m and 52b-1 to 52b-m.

Here, it will be described that the reference driving signal dA1 output by the discharge control circuit 51 corresponds to the driving signal output circuit 52a-1, and the reference driving signal dAm output by the discharge control circuit 51 corresponds to the driving signal output circuit 52a-m. Similarly, it will be described that the reference driving signal dB1 output by the discharge control circuit 51 corresponds to the driving signal output circuit 52b-1, and the reference driving signal dBm output by the discharge control circuit 51 corresponds to the driving signal output circuit 52b-m. That is, the reference driving signal dA1 is input to the driving signal output circuit 52a-1, the reference driving signal dAm is input to the driving signal output circuit 52a-m, the reference driving signal dB1 is input to the driving signal output circuit 52b-1, and the reference driving signal dBm is input to the driving signal output circuit 52b-m.

The driving signal output circuit 52a-1 performs digital-analog conversion of the input reference driving signal dA1 and performs class D amplification to generate the driving signal COMA1 and output the driving signal COMA1 to the print head 30. The driving signal output circuit 52b-1 performs digital-analog conversion of the input reference driving signal dB1 and performs class D amplification to generate the driving signal COMB1 and output the driving signal COMB1 to the print head 30. Similarly, the driving signal output circuit 52a-m performs digital-analog conversion of the input reference driving signal dAm and performs class D amplification to generate the driving signal COMAm and output the driving signal COMAm to the print head 30, and the driving signal output circuit 52*b-m* performs digital-analog conversion of the input reference driving signal dBm and performs class D amplification to generate the driving signal COMBm and output the driving signal COMBm to the print head 30.

That is, each of the driving signal output circuits 52*a*-1 to 52*a-m* and 52*b*-1 to 52*b-m* performs digital-analog conversion of the input reference driving signals dA1 to dAm and dB1 to dBm and performs class D amplification to generate the driving signals COMA1 to COMAm and COMB1 to COMBm and output the generated signals to the print head 30. In other words, the driving signal output circuits 52*a*-1 to 52*a-m* and 52*b*-1 to 52*b-m* each include a class D amplifier circuit, the driving signal output circuits 52*a*-1 to 52*a-m* output the driving signals COMA1 to COMAm, and the driving signal output circuits 52*b*-1 to 52*b-m* output the driving signals COMB1 to COMBm. At this time, each of the reference driving signals dA1 to dAm and dB1 to dBm output by the discharge control circuit 51 is a signal which is the basis of the driving signals COMA1 to COMAm and COMB1 to COMBm output by each of the driving signal output circuits 52*a*-1 to 52*a-m* and 52*b*-1 to 52*b-m*, that is, a signal that defines the signal waveforms of the driving signals COMA1 to COMAm and COMB1 to COMBm.

Here, it is described that the driving signal output circuits 52*a*-1 to 52*a-m* and 52*b*-1 to 52*b-m* class-D-amplify the signal waveforms defined by the reference driving signals dA1 to dAm and dB1 to dBm to generate the driving signals COMA1 to COMAm and COMB1 to COMBm, but the driving signal output circuits 52*a*-1 to 52*a-m* and 52*b*-1 to 52*b-m* may class-A-amplify, class-B-amplify, and class-AB-amplify the signal waveforms defined by the reference driving signals dA1 to dAm and dB1 to dBm to generate the driving signals COMA1 to COMAm and COMB1 to COMBm. However, the driving signal output circuits 52*a*-1 to 52*a-m* and 52*b*-1 to 52*b-m* consume a large amount of power and therefore generate a large amount of heat. The driving signal output circuits 52*a*-1 to 52*a-m* and 52*b*-1 to 52*b-m* are required to generate the driving signals COMA1 to COMAm and COMB1 to COMBm with high efficiency from the viewpoint of reducing power consumption and suppressing heat generation amount.

From the viewpoint above, the driving signal output circuits 52*a*-1 to 52*a-m* and 52*b*-1 to 52*b-m* are preferably configured to include class D amplification that can amplify the signal waveforms defined by the reference driving signals dA1 to dAm and dB1 to dBm with high efficiency. The details of the configurations of the driving signal output circuits 52*a*-1 to 52*a-m* and 52*b*-1 to 52*b-m* including the class D amplification will be described later.

The driving signal output circuits 52*a*-1 to 52*a-m* and 52*b*-1 to 52*b-m* each generate and output the reference voltage signal VBS. At this time, the drive circuit module 50 stabilizes the voltage value of the reference voltage signal VBS output by the driving signal output circuit 52*a*-1 by the capacitor 53. That is, the drive circuit module 50 has a capacitor 53 for reducing fluctuations in the voltage value of the reference voltage signal VBS. After the voltage value of the reference voltage signal VBS is stabilized by the capacitor 53, the reference voltage signal VBS is branched and output to the print head 30, and the wiring through which the reference voltage signal VBS output by each of the driving signal output circuits 52*a*-2 to 52*a-m* and 52*b*-1 to 52*b-m* propagates is set to the open state. That is, the drive circuit module 50 outputs the reference voltage signal VBS output by the driving signal output circuit 52*a*-1 to the print head 30, and does not output the reference voltage signal VBS output by each of the driving signal output circuits 52*a*-2 to 52*a-m* and 52*b*-1 to 52*b-m* to the print head 30.

The reference voltage signal VBS functions as a reference potential for driving a piezoelectric element 60 (to be described later) of the print head 30. When the voltage value of the reference voltage signal VBS that functions as such a reference potential fluctuates, the drive characteristic of the piezoelectric element 60 changes. On the other hand, by limiting the reference voltage signal VBS supplied to the piezoelectric element 60 to only the reference voltage signal VBS output by the driving signal output circuit 52*a*-1, even when the voltage value of the reference voltage signal VBS output by each of the driving signal output circuits 52*a*-1 to 52*a-m* and 52*b*-1 to 52*b-m* varies due to circuit variations and the like, a concern that the voltage value of the reference voltage signal VBS supplied to the piezoelectric element 60 fluctuates is reduced. Thereby, the driving accuracy of the piezoelectric element 60 is improved.

The reference voltage signal VBS output from the drive circuit module 50 and the reference voltage signal VBS input to the print head 30 may be the reference voltage signal VBS output by any one of the driving signal output circuits 52*a*-1 to 52*a-m* and 52*b*-1 to 52*b-m*, and is not limited to the reference voltage signal VBS output by the driving signal output circuit 52*a*-1.

Here, the driving signal output circuits 52*a*-1 to 52*a-m* and 52*b*-1 to 52*b-m* all have the same configuration except that the input signal and the output signal are different. Therefore, in the following description, when it is not necessary to distinguish the driving signal output circuits 52*a*-1 to 52*a-m* and 52*b*-1 to 52*b-m* from each other, the driving signal output circuits 52*a*-1 to 52*a-m* and 52*b*-1 to 52*b-m* may be simply referred to as a driving signal output circuit 52. In this case, it will be described that a reference driving signal dO is input to the driving signal output circuit 52, and the driving signal output circuit 52 outputs the driving signal COM.

The temperature detection circuit 56 acquires the environmental temperature of the drive circuit module 50. Here, the environmental temperature of the drive circuit module 50 includes not the temperature of the component itself of the drive circuit module 50 but the space temperature of the drive circuit module 50 that changes as the temperature of the component rises. Then, the temperature detection circuit 56 generates a temperature information signal Tt including the temperature information corresponding to the acquired environmental temperature, and outputs the temperature information signal Tt to the head control circuit 12.

The head control circuit 12 estimates the temperature of the drive circuit module 50 based on the input temperature information signal Tt. The head control circuit 12 corrects the clock signal SCK, the differential print data signals Dp1 to Dpn, and the differential drive data signals Dd1 to Ddn according to the estimated temperature of the drive circuit module 50, and outputs the corrected clock signal SCK, the differential print data signals Dp1 to Dpn, and the differential drive data signals Dd1 to Ddn. That is, the head control circuit 12 controls the operations of the driving signal output circuits 52*a*-1 to 52*a-m* and 52*b*-1 to 52*b-m* and the print head 30 based on the temperature information signal Tt corresponding to the environmental temperature acquired by the temperature detection circuit 56.

Further, when the estimated temperature of the drive circuit module 50 is equal to or higher than a predetermined threshold value, the head control circuit 12 determines that a temperature abnormality occurred or that a temperature abnormality may occur in the drive circuit module 50. In this case, the head control circuit 12 may generate the clock signal SCK, the differential print data signals Dp1 to Dpn, and the differential drive data signals Dd1 to Ddn for stopping the operation of the drive circuit module 50, and output the generated signals to the drive circuit module 50. That is, the head control circuit 12 may stop the operations of the driving signal output circuits 52*a*-1 to 52*a*-*m* and 52*b*-1 to 52*b*-*m* and the print head 30 based on the temperature information signal Tt corresponding to the environmental temperature acquired by the temperature detection circuit 56.

Further, the head control circuit 12 may notify the user of the information corresponding to the estimated temperature of the drive circuit module 50, that is, the temperature information acquired by the temperature detection circuit 56, through a notification section (not illustrated) such as a display. That is, the head control circuit 12 may notify the user of information based on the temperature information signal Tt corresponding to the environmental temperature acquired by the temperature detection circuit 56.

As the temperature detection circuit 56 that detects the environmental temperature at the space temperature inside the drive circuit module 50, for example, a thermistor element or an IC temperature sensor element can be used. That is, the temperature information signal Tt output by the temperature detection circuit 56 may include temperature information indicating the temperature of the drive circuit module 50 itself, and may include a voltage value that changes according to the temperature of the drive circuit module 50 or a current value as the temperature information.

Further, the voltage signals VHV and VMV propagating through the discharge control module 10 are input to the drive circuit module 50. The voltage signal VHV propagates inside the drive circuit module 50, is supplied to various configurations of the drive circuit module 50, and is also supplied to the print head 30. The voltage signal VMV propagates inside the drive circuit module 50, is supplied to various configurations of the drive circuit module 50, and is also supplied to the voltage conversion circuit 58. The voltage conversion circuit 58 steps down the input voltage signal VMV to generate and output a voltage signal VDD. The voltage signal VDD output by the voltage conversion circuit 58 is used as a power supply voltage for various circuits included in the drive circuit module 50 and is also supplied to the print head 30. The voltage signal VDD is, for example, a DC voltage such as 5 V or 3.3 V.

The voltage signal VDD output by the voltage conversion circuit 58 is not limited to one, and the voltage conversion circuit 58 may output a plurality of voltage signals VDD having different voltage values. Further, the voltage signal VMV may be supplied to the print head 30 together with the voltage signals VHV and VDD.

The abnormality detection circuit 54 detects an abnormality that occurred in the drive circuit module 50, and generates an abnormality information signal Te and an abnormality notification signal De according to the detection result. The abnormality detection circuit 54 is a comparison device that compares whether or not the detection target is equal to or greater than a predetermined threshold value, and is configured to include, for example, a comparator.

The abnormality information signal Te output by the abnormality detection circuit 54 is input to the head control circuit 12. When the input abnormality information signal Te includes information indicating an abnormality of the drive circuit module 50, the head control circuit 12 generates the clock signal SCK for stopping the operation of the drive circuit module 50, the differential print data signals Dp1 to Dpn, and the differential drive data signals Dd1 to Ddn and outputs the generated signals to the drive circuit module 50. As a result, the operation of the drive circuit module 50 is stopped.

Further, the abnormality notification signal De output by the abnormality detection circuit 54 is input to the abnormality notification circuit 55. The abnormality notification circuit 55 includes a light emitting element such as a light emitting diode. Then, the abnormality notification circuit 55 notifies the user whether or not an abnormality occurred in the drive circuit module 50 by turning on, turning off, or blinking the light emitting element based on the input abnormality notification signal De.

Here, an example of the operations of the abnormality detection circuit 54 and the abnormality notification circuit 55 will be described.

For example, when the abnormality detection circuit 54 detects that the voltage value of the voltage signal VHV is lower than the normal value, the abnormality detection circuit 54 determines that the voltage value of the voltage signal VHV is not normal, generates the abnormality notification signal De for calling attention to the user, and outputs the abnormality notification signal De to the abnormality notification circuit 55. The abnormality notification circuit 55 causes the light emitting element to blink in order to notify that the voltage value of the voltage signal VHV decreased, based on the input abnormality notification signal De.

After that, when the voltage value of the voltage signal VHV further decreases and the abnormality detection circuit 54 detects that the voltage value of the voltage signal VHV is lower than a predetermined threshold value, the abnormality detection circuit 54 determines that the voltage value of the voltage signal VHV is abnormal, generates the abnormality notification signal De for notifying the user of the abnormality, and outputs the abnormality notification signal De to the abnormality notification circuit 55. The abnormality notification circuit 55 turns on the light emitting element to notify that an abnormality occurred in the voltage value of the voltage signal VHV based on the input abnormality notification signal De. At this time, the abnormality detection circuit 54 generates the abnormality information signal Te including abnormality information indicating that the drive circuit module 50 is abnormal and the voltage value of the voltage signal VHV is abnormal, and outputs the abnormality information signal Te to the head control circuit 12.

For example, when the abnormality detection circuit 54 detects that the voltage value of the voltage signal VDD used as the power supply voltage of the FPGA that configures the discharge control circuit 51 is lower than the normal value, the abnormality detection circuit 54 determines that the voltage value of the voltage signal VDD is not normal, generates the abnormality notification signal De for calling attention to the user, and outputs the abnormality notification signal De to the abnormality notification circuit 55. The abnormality notification circuit 55 causes the light emitting element to blink in order to notify that the voltage value of the voltage signal VDD decreased, based on the input abnormality notification signal De.

After that, when the voltage value of the voltage signal VDD further decreases and the abnormality detection circuit 54 detects that the voltage value of the voltage signal VDD is lower than a predetermined threshold value, the abnormality detection circuit 54 determines that the voltage value of the voltage signal VDD is abnormal, generates the abnormality notification signal De for notifying the user of the abnormality, and outputs the abnormality notification signal De to the abnormality notification circuit 55. The abnormality notification circuit 55 turns on the light emitting element to notify that an abnormality occurred in the voltage value of the voltage signal VDD based on the input abnormality notification signal De. At this time, the abnormality detection circuit 54 generates the abnormality information signal Te including abnormality information indicating that the drive circuit module 50 is abnormal and the voltage value of the voltage signal VDD is abnormal, and outputs the abnormality information signal Te to the head control circuit 12.

Here, the number of light emitting elements included in the abnormality notification circuit 55 is not limited to one, and for example, the light emitting element for notifying the presence or absence of an abnormality of the voltage signal VHV and the light emitting element for notifying the presence or absence of an abnormality of the voltage signal VDD may be individually provided. Further, when the abnormality notification circuit 55 has a plurality of light emitting elements, the user may be notified of the presence or absence of an abnormality in the drive circuit module 50 by combining turning-on, turning-off, and blinking of the plurality of light emitting elements. Further, in the above description, as an example, it is described that the abnormality detection circuit 54 detects the presence or absence of an abnormality in the voltage value of the voltage signal VHV and the presence or absence of an abnormality in the voltage value of the voltage signal VDD, as the detection of the presence or absence of an abnormality in the drive circuit module 50, but the abnormality detection circuit 54 may detect the presence or absence of heat generation abnormality of the drive circuit module 50 based on the temperature information signal Tt output by the temperature detection circuit 56 or may detect the presence or absence of voltage abnormality of the voltage signal VMV in place of or in addition to the detection of the presence or absence of an abnormality in the voltage values of the voltage signal VHV and the voltage signal VDD.

The fan driving signal Fp1 output by the cooling fan drive circuit 14 is input to the cooling fan 59. Then, the cooling fan 59 is driven by the input fan driving signal Fp1 to generate an air flow in the drive circuit module 50. The drive circuit module 50 is cooled by the air flow generated by the cooling fan 59. Here, the head control circuit 12 may output the fan control signal Fc based on the temperature information signal Tt output by the temperature detection circuit 56. As a result, the drive state of the cooling fan 59 is the result of temperature detection by the temperature detection circuit 56, and is controlled according to the temperature state of the drive circuit module 50 which is the cooling target. As a result, the concern that the power consumption increases due to the excessive driving of the cooling fan 59 is reduced, and accordingly, the power consumption of the liquid discharge apparatus 1 is reduced, and the concern that a temperature abnormality occurs in the drive circuit module 50 is also reduced.

The print head 30 includes a restoration circuit 31 and discharge modules 32-1 to 32-*m*. The restoration circuit 31 operates using the voltage signals VHV and VDD or the DC voltage generated from the voltage signals VHV and VDD as the power supply voltage. The restoration circuit 31 restores the differential print data signal Dpt of the differential signal output by the discharge control circuit 51 to a single-ended signal. Specifically, the clock signal SCK and the differential print data signal Dpt are input to the restoration circuit 31. The restoration circuit 31 restores the differential print data signal Dpt input based on the clock signal SCK to a single-ended signal, and deserializes the restored signal to generate the latch signal LAT, the change signal CH, and the print data signals SI1 to SIm. Then, the restoration circuit 31 outputs the clock signal SCK, the generated latch signal LAT, the change signal CH, and the print data signals SI1 to SIm to the corresponding discharge modules 32-1 to 32-*m*.

The discharge module 32-1 includes a driving signal selection circuit 200 and a plurality of discharge sections 600.

The latch signal LAT, the change signal CH, the print data signal SI1, the clock signal SCK, and the driving signals COMA1 and COMB1, which are output by the restoration circuit 31, are input to the driving signal selection circuit 200. The driving signal selection circuit 200 operates using the voltage signals VHV and VDD or the DC voltage generated from the voltage signals VHV and VDD as the power supply voltage, and accordingly, in each of the periods defined by the latch signal LAT and the change signal CH, based on the print data signal SI1, the driving signal selection circuit 200 selects or deselects the signal waveform included in the driving signal COMA1 or selects or deselects the signal waveform included in the driving signal COMB1 to generate and output the driving signal VOUT corresponding to each of the plurality of discharge sections 600. That is, when the discharge module 32-1 has p discharge sections 600, the driving signal selection circuit 200 generates p driving signals VOUT corresponding to each of the p discharge sections 600, and outputs the generate the p driving signals VOUT to the corresponding discharge sections 600.

Each of the plurality of discharge sections 600 includes the piezoelectric element 60. The corresponding driving signal VOUT output by the driving signal selection circuit 200 is supplied to one end of the piezoelectric element 60. In addition, the reference voltage signal VBS is commonly supplied to the other end of the plurality of piezoelectric elements 60 included in each of the plurality of discharge sections 600. The plurality of piezoelectric elements 60 included in each of the plurality of discharge sections 600 are displaced by the potential difference between the driving signal VOUT and the reference voltage signal VBS. Accordingly, the ink having an amount that corresponds to the displacement of the piezoelectric element 60 is discharged from the corresponding discharge section 600. The ink discharged from the discharge section 600 lands on the medium P, and accordingly, an image is formed on the medium P. In addition, the details of the operation of the driving signal selection circuit 200 that outputs the driving signal VOUT will be described later.

Here, the discharge modules 32-2 to 32-*m* included in the print head 30 have the same configuration as the discharge module 32-1 except that the input signals are different, and execute the same operation. Therefore, the detailed description of the discharge modules 32-2 to 32-*m* will be omitted. That is, each of the discharge modules 32-2 to 32-*m* includes the driving signal selection circuit 200 and the plurality of discharge sections 600. Then, the driving signal selection circuits 200 included in each of the discharge modules 32-2 to 32-*m* selects or deselects the signal waveforms included in the corresponding driving signals COMA2 to COMAm or selects or deselects the signal waveforms included in the corresponding driving signals COMB2 to COMBm based on the corresponding print data signals SI2 to SIm in each of the periods defined by the input latch signal LAT and the change signal CH to output the driving signal VOUT corresponding to each of the plurality of discharge sections 600.

As a result, an amount of ink corresponding to the potential difference between the input driving signal VOUT and the reference voltage signal VBS is discharged from each of the plurality of discharge sections 600 included in each of the discharge modules 32-2 to 32-*m*.

In other words, the print head 30 has discharge modules 32-1 to 32-*m*. The discharge module 32-1 includes the discharge section 600 having the piezoelectric element 60 that is displaced by receiving the driving signal VOUT based on the driving signals COMA1 and COMB1 and discharges an ink by the displacement of the piezoelectric element 60; and the driving signal selection circuit 200 that switches whether or not to supply the driving signals COMA1 and COMB1 to the piezoelectric element 60. The discharge module 32-*m* includes the discharge section 600 having the piezoelectric element 60 that is displaced by receiving the driving signal VOUT based on the driving signals COMAm and COMBm and discharges an ink by the displacement of the piezoelectric element 60; and the driving signal selection circuit 200 that switches whether or not to supply the driving signals COMAm and COMBm to the piezoelectric element 60.

Therefore, in the following description, when it is not necessary to distinguish the discharge modules 32-1 to 32-*m* from each other, the discharge modules 32-1 to 32-*m* may be simply referred to as a discharge module 32. Further, it may be described that the print data signal SI as the print data signals SI1 to SIm, the driving signal COMA as the driving signals COMA1 to COMAm, and the driving signal COMB as the driving signals COMB1 to COMBm are input to the discharge module 32. That is, the driving signal selection circuits 200 included in each of the discharge modules 32 selects or deselects the signal waveform included in the driving signal COMA or selects or deselects the signal waveform included in the driving signal COMB based on the print data signal SI in each of the periods defined by the latch signal LAT and the change signal CH to output the driving signal VOUT corresponding to each of the plurality of discharge sections 600.

As described above, the liquid discharge module 20-1 includes the drive circuit module 50 and the print head 30, and operates based on the clock signal SCK, the differential print data signal Dp1, the differential drive data signal Dd1, the fan driving signal Fp1, and the voltage signals VHV and VMV output by the discharge control module 10 to discharge an amount of ink defined by the differential print data signal Dp1 and the differential drive data signal Dd1 to the medium P at the timing defined by the differential print data signal Dp1 and the differential drive data signal Dd1.

Here, the liquid discharge modules 20-2 to 20-*n* have the same configuration as the liquid discharge module 20-1 except that the input signals are different, and execute the same operations. Therefore, the detailed description of the liquid discharge modules 20-2 to 20-*n* will be omitted. That is, each of the liquid discharge modules 20-2 to 20-*n* includes the drive circuit module 50 and the print head 30, and operates based on the clock signal SCK, the corresponding differential print data signals Dp2 to Dpn, the corresponding differential drive data signals Dd2 to Ddn, the corresponding fan driving signals Fp2 to Fpn, and the voltage signals VHV and VMV output by the discharge control module 10 to discharge an amount of ink defined by the corresponding differential print data signals Dp2 to Dpn and the corresponding differential drive data signals Dd2 to Ddn to the medium P at the timing defined by the corresponding differential print data signals Dp2 to Dpn and the corresponding differential drive data signals Dd2 to Ddn.

As described above, the liquid discharge apparatus 1 includes the print head 30 that discharges an ink, the drive circuit module 50 that is electrically coupled to the print head 30, and the control unit 2 and the head control circuit 12 that controls the operations of the print head 30 and the drive circuit module 50. The head unit 3, which includes the liquid discharge apparatus 1 and includes the discharge control module 10, the print head 30, and the drive circuit module 50, drives the voltage signals VHV and VMV input from the control unit 2 as power supply voltages, and discharges the ink at a timing based on the print data signal pDATA to form an image corresponding to the print data signal pDATA and an image corresponding to the image data DATA on the medium P.

1.3 Functional Configuration of Driving Signal Output Circuit

Figure 3:
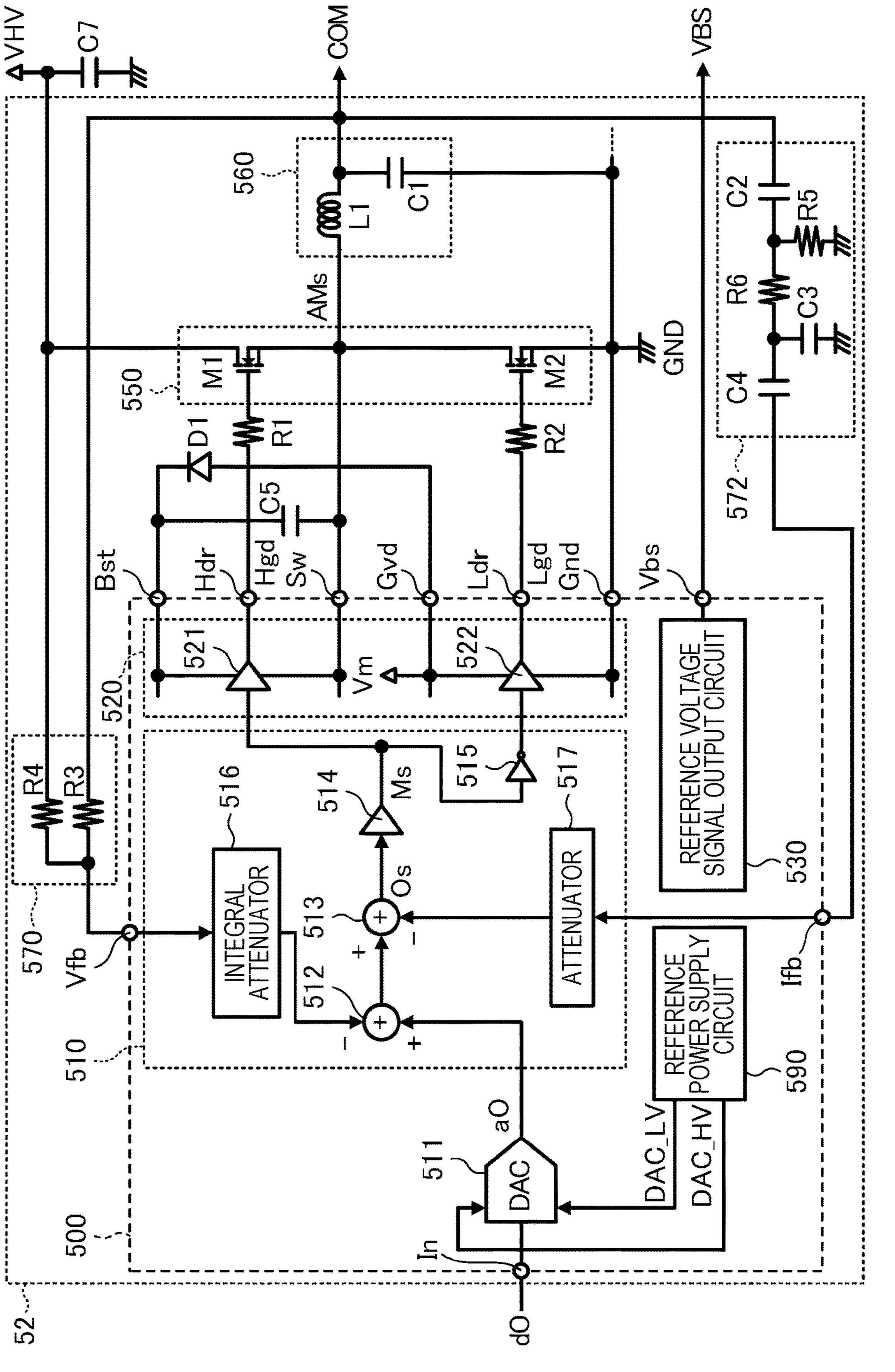
FIG. 3 is a diagram illustrating a configuration of a driving signal output circuit.

Next, the configuration and operation of the driving signal output circuit 52 that outputs the driving signal COM will be described. FIG. 3 is a view illustrating a configuration of the driving signal output circuit 52. The driving signal output circuit 52 includes an integrated circuit 500, an amplifier circuit 550, a demodulator circuit 560, feedback circuits 570 and 572, and other electronic components.

The integrated circuit 500 includes a plurality of terminals including a terminal Id, a terminal Bst, a terminal Hdr, a terminal Sw, a terminal Gvd, a terminal Ldr, a terminal Gnd, a terminal Vbs, a terminal Vfb, and a terminal Ifb. The integrated circuit 500 is electrically coupled to an externally provided substrate (not illustrated) via the plurality of terminals. In addition, the integrated circuit 500 includes a digital to analog converter (DAC) 511, a modulator circuit 510, a gate drive circuit 520, and a reference power supply circuit 590.

The reference power supply circuit 590 generates a voltage signal DAC_HV and a voltage signal DAC_LV and supplies the voltage signals DAC_HV and DAC_LV to the DAC 511. In addition, the digital reference driving signal dO that defines the signal waveform of the driving signal COM is input to the DAC 511. The DAC 511 converts the input reference driving signal dO into a reference driving signal aO that is an analog signal of the voltage value between the voltage value of the voltage signal DAC_HV and the voltage value of the voltage signal DAC_LV, and outputs the reference driving signal aO to the modulator circuit 510. That is, the maximum value of the voltage amplitude of the reference driving signal aO is defined by the voltage signal DAC_HV, and the minimum value is defined by the voltage signal DAC_LV. The signal obtained by amplifying the reference driving signal aO output by the DAC 511 corresponds to the driving signal COM. That is, the reference driving signal aO corresponds to a target signal before amplification of the driving signal COM, and the reference driving signals dO and aO are signals defining the signal waveforms of the driving signal COM.

The modulator circuit 510 generates a modulation signal Ms obtained by modulating the reference driving signal aO, and outputs the modulation signal Ms to the gate drive circuit 520. The modulator circuit 510 includes adders 512 and 513, a comparator 514, an inverter 515, an integral attenuator 516, and an attenuator 517.

The integral attenuator 516 attenuates and integrates the driving signal COM input via the terminal Vfb and outputs the driving signal COM to the input end on the − side of the adder 512. The reference driving signal aO is input to the input end on the + side of the adder 512. The adder 512 outputs the voltage obtained by subtracting and integrating the voltage input to the input end on the – side from the voltage input to the input end on the + side, to the input end on the + side of the adder 513.

The attenuator 517 outputs a voltage obtained by attenuating the high frequency component of the driving signal COM input via the terminal Ifb to the input end on the – side of the adder 513. The voltage output from the adder 512 is input to the input end on the + side of the adder 513. The adder 513 generates a voltage signal Os obtained by subtracting the voltage input to the input end on the – side from the voltage input to the input end on the + side, and outputs the voltage signal Os to the comparator 514.

The comparator 514 outputs the modulation signal Ms obtained by pulse-modulating the voltage signal Os input from the adder 513. Specifically, the comparator 514 generates and outputs the modulation signal Ms that is an H level when the voltage value of the voltage signal Os input from the adder 513 is equal to or greater than a predetermined threshold value Vth1 when the voltage value is increased, and that is an L level when the voltage value of the voltage signal Os falls below a predetermined threshold value Vth2 when the voltage value is lowered. Here, the threshold values Vth1 and Vth2 are set in the relationship of threshold value Vth1 threshold value Vth2.

The modulation signal Ms output by the comparator 514 is input to a gate driver 521 included in the gate drive circuit 520, and is also input to a gate driver 522 included in the gate drive circuit 520 via the inverter 515. That is, a signal having a relationship in which the logic levels are exclusive is input to the gate driver 521 and the gate driver 522. Here, the relationship in which the logic levels are exclusive includes that the logic levels of the signals input to the gate driver 521 and the gate driver 522 do not simultaneously be the H level. Therefore, the modulator circuit 510 may include a timing control circuit for controlling the timing of the modulation signal Ms input to the gate driver 521 in place of or in addition to the inverter 515 and the signal in which the logic level of the modulation signal Ms input to the gate driver 522 is inverted.

The gate drive circuit 520 includes the gate driver 521 and the gate driver 522. The gate driver 521 level-shifts the modulation signal Ms output from the comparator 514 to generate an amplification control signal Hgd and output the amplification control signal Hgd from the terminal Hdr.

Specifically, the voltage is supplied to the higher side of the power supply voltage of the gate driver 521 via the terminal Bst, and the voltage is supplied to the lower side via the terminal Sw. The terminal Bst is coupled to one end of a capacitor C5 and the cathode of the diode D1 for preventing a reverse flow. The terminal Sw is coupled to the other end of the capacitor C5. Further, the anode of the diode D1 is coupled to the terminal Gvd. A voltage signal Vm, which is a DC voltage of, for example, 7.5 V, output by a power supply circuit (not illustrated) is supplied to the terminal Gvd. That is, the voltage signal Vm is supplied to the anode of the diode D1. Therefore, the potential difference between the terminal Bst and the terminal Sw is approximately equal to the voltage value of the voltage signal Vm. As a result, the gate driver 521 generates the amplification control signal Hgd having a voltage value larger than that of the terminal Sw by the voltage value of the voltage signal Vm according to the input modulation signal Ms, and outputs the amplification control signal Hgd from the terminal Hdr.

The gate driver 522 operates on the lower potential side than that of the gate driver 521. The gate driver 522 level-shifts the signal in which the logic level of the modulation signal Ms output from the comparator 514 is inverted by the inverter 515 to generate the amplification control signal Lgd and output the amplification control signal Lgd from the terminal Ldr.

Specifically, the voltage signal Vm is supplied to the higher side of the power supply voltage of the gate driver 522, and a ground potential GND is supplied to the lower side via the terminal Gnd. The gate driver 522 outputs the amplification control signal Lgd having a voltage value larger than that of the terminal Gnd by the voltage value of the voltage signal Vm from the terminal Ldr according to the signal in which the logic level of the input modulation signal Ms is inverted. Here, the ground potential GND is a reference potential of the driving signal output circuit 52, and is, for example, 0 V.

The amplifier circuit 550 includes a transistor M1 and a transistor M2.

The transistor M1 is a surface mount-type field effect transistor (FET), and a voltage signal VHV is supplied to the drain of the transistor M1 as a power supply voltage for amplification of the amplifier circuit 550. In addition, the gate of the transistor M1 is electrically coupled to one end of a resistor R1 and the other end of the resistor R1 is electrically coupled to the terminal Hdr of the integrated circuit 500. That is, the amplification control signal Hgd is input to the gate of the transistor M1. In addition, the source of the transistor M1 is electrically coupled to the terminal Sw of the integrated circuit 500.

The transistor M2 is the surface mount-type FET, and the drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplification control signal Lgd is input to the gate of the transistor M2. In addition, the ground potential GND is supplied to the source of the transistor M2.

When the drain and the source of the transistor M1 are controlled to be non-conductive and the drain and the source of the transistor M2 are controlled to be conductive, the potential of the node to which the terminal Sw is coupled is the ground potential GND. Therefore, the voltage signal Vm is supplied to the terminal Bst. On the other hand, when the drain and the source of the transistor M1 are controlled to be conductive and the drain and the source of the transistor M2 are controlled to be non-conductive, the potential of the node to which the terminal Sw is coupled is the voltage value of the voltage signal VHV. Therefore, a voltage having a potential of the sum of the voltage value of the voltage signal VHV and the voltage value of the voltage signal Vm is supplied to the terminal Bst. That is, using the capacitor C5 as a floating power supply, the potential of the terminal Sw changes to the ground potential GND or the voltage value of the voltage signal VHV according to the operations of the transistor M1 and the transistor M2, and accordingly, the gate driver 521 that drives the transistor M1 generates the amplification control signal Hgd where the L level is the voltage value of the voltage signal VHV and the H level is the voltage value of the sum of the voltage value of the voltage signal VHV and the voltage value of the voltage signal Vm and output the amplification control signal Hgd to the gate of the transistor M1.

On the other hand, the gate driver 522 that drives the transistor M2 generates the amplification control signal Lgd of the voltage value where the L level is the ground potential GND and the H level is the voltage value of the voltage signal Vm, regardless of the operations of the transistor M1 and the transistor M2 and outputs the amplification control signal Lgd to the gate of the transistor M2.

The amplifier circuit 550 configured as described above generates an amplified modulation signal AMs obtained by amplifying the modulation signal Ms based on the voltage signal VHV at a coupling point between the source of the transistor M1 and the drain of the transistor M2. The amplifier circuit 550 outputs the generated amplified modulation signal AMs to the demodulator circuit 560.

Here, a capacitor C7 is provided in the propagation path through which the voltage signal VHV input to the amplifier circuit 550 propagates. Specifically, one end of the capacitor C7 is a propagation path through which the voltage signal VHV propagates, and is electrically coupled to the drain of the transistor M1, and the ground potential GND is supplied to the other end of the capacitor C7. As a result, the concern that the voltage value of the voltage signal VHV input to the amplifier circuit 550 fluctuates is reduced, the concern that noise is superimposed on the voltage signal VHV is reduced, and as a result, the waveform accuracy of the amplified modulation signals AMs output by the amplifier circuit 550 is improved. Therefore, an electrolytic capacitor having a high withstand voltage and a large capacity is used. The capacitor C7 may be provided to correspond to one driving signal output circuit 52, or may be provided to correspond to the plurality of driving signal output circuits 52.

The demodulator circuit 560 demodulates the amplified modulation signal AMS output by the amplifier circuit 550 to generate the driving signal COM and output the driving signal COM from the driving signal output circuit 52. The demodulator circuit 560 includes an inductor L1 and a capacitor C1. One end of the inductor L1 is coupled to one end of the capacitor C1. The amplified modulation signal AMs is input to the other end of the inductor L1. In addition, the ground potential GND is supplied to the other end of the capacitor C1. That is, in the demodulator circuit 560, the inductor L1 and the capacitor C1 configure a low pass filter. The demodulator circuit 560 demodulates the amplified modulation signal AMs by smoothing the amplified modulation signal AMs with the low pass filter, and outputs the demodulated signal as the driving signal COM. That is, the driving signal output circuit 52 outputs the driving signal COM from one end of the inductor L1 included in the demodulator circuit 560 and one end of the capacitor C1.

The feedback circuit 570 includes a resistor R3 and a resistor R4. The driving signal COM is supplied to one end of the resistor R3, and the other end is coupled to the terminal Vfb and one end of the resistor R4. The voltage signal VHV is supplied to the other end of the resistor R4. Accordingly, the driving signal COM that passes through the feedback circuit 570 is fed back to the terminal Vfb by the voltage value of the voltage signal VHV in a pulled-up state.

The feedback circuit 572 includes capacitors C2, C3, and C4 and resistors R5 and R6. The driving signal COM is input to one end of the capacitor C2, and the other end is coupled to one end of the resistor R5 and one end of the resistor R6. The ground potential GND is supplied to the other end of the resistor R5. As a result, the capacitor C2 and the resistor R5 function as a high pass filter. In addition, the other end of the resistor R6 is coupled to one end of the capacitor C4 and one end of the capacitor C3. The ground potential GND is supplied to the other end of the capacitor C3. As a result, the resistor R6 and the capacitor C3 function as a low pass filter. That is, the feedback circuit 572 includes a high pass filter and a low pass filter, and functions as a band pass filter through which a signal in a predetermined frequency range included in the driving signal COM passes.

The other end of the capacitor C4 is coupled to the terminal Ifb of the integrated circuit 500. Accordingly, a signal, in which the DC component is cut among the high frequency components of the driving signal COM that passed through the feedback circuit 572 that functions as a band pass filter, is fed back to the terminal Ifb.

The driving signal COM is a signal obtained by smoothing the amplified modulation signal AMs based on the reference driving signal dO by the demodulator circuit 560. In addition, the driving signal COM is integrated and subtracted via the terminal Vfb, and then fed back to the adder 512. Accordingly, the driving signal output circuit 52 self-oscillates at a frequency determined by the feedback delay and the feedback transfer function. However, the feedback path via the terminal Vfb has a large delay amount. Therefore, it may not be possible to raise the frequency of self-oscillation to such an extent that the accuracy of the driving signal COM can be sufficiently secured only by feedback via the terminal Vfb. Therefore, by providing a path for feeding back the high frequency component of the driving signal COM via the terminal Ifb separately from the path via the terminal Vfb, the delay in the entire circuit is reduced. As a result, the frequency of the voltage signal Os can be raised to such an extent that the accuracy of the driving signal COM can be sufficiently secured as compared with the case where the path via the terminal Ifb does not exist.

Further, the integrated circuit 500 includes a reference voltage signal output circuit 530. The reference voltage signal output circuit 530 outputs the reference voltage signal VBS. The reference voltage signal output circuit 530 is generated by, for example, stepping down or boosting the voltage signal Vm based on the reference potential, using the band gap reference voltage generated in the integrated circuit 500 as the reference potential. Then, the reference voltage signal output circuit 530 outputs the generated reference voltage signal VBS from the driving signal output circuit 52 via the terminal Vbs.

As described above, the driving signal output circuit 52 generates the driving signal COM by performing digital/analog conversion of the input reference driving signal dO and then class-D-amplifying the analog signal, outputs the generated driving signal COM, and generates and outputs the reference voltage signal VBS. The reference voltage signal output circuit 530 that generates the reference voltage signal VBS may have a configuration different from that of the driving signal output circuit 52, but has the same configuration as the driving signal output circuit 52 and is incorporated in one integrated circuit 500. Accordingly, the circuit size of the driving signal output circuit 52 and the drive circuit module 50 including the driving signal output circuit 52 can be reduced.

That is, the driving signal output circuit 52 included in the liquid discharge apparatus 1 of the present embodiment, that is, each of the driving signal output circuits 52*a*-1 to 52*a*-4 and 52*b*-1 to 52*b*-4 includes the integrated circuit 500, the transistors M1 and M2, and the inductor L1. Then, the driving signal output circuits 52*a*-*m* and 52*b*-*m* output the driving signals COMAm and COMBm that displace the piezoelectric element 60 in order to discharge the ink from the discharge module 32-*m* of the print head 30, to the print head 30.

Further, the reference voltage signal VBS supplied to the other end of the piezoelectric element 60 included in each of the discharge modules 32-1 to 32-*m* is output from the integrated circuit 500 included in the driving signal output circuit 52*a*-1. That is, the driving signal output circuit 52*a*-1 includes the reference voltage signal output circuit 530 that outputs the reference voltage signal VBS to the print head 30, and at least a part of the reference voltage signal output circuit 530 is included in the integrated circuit 500 in the driving signal output circuit 52*a*-1.

1.4 Functional Configuration of Driving Signal Selection Circuit

Next, the configuration and operation of the driving signal selection circuit 200 will be described. In describing the configuration and operation of the driving signal selection circuit 200, first, an example of the signal waveforms of the driving signals COMA and COMB input to the driving signal selection circuit 200, and an example of the signal waveform of the driving signal VOUT output from the driving signal selection circuit 200 are described.

Figure 4:
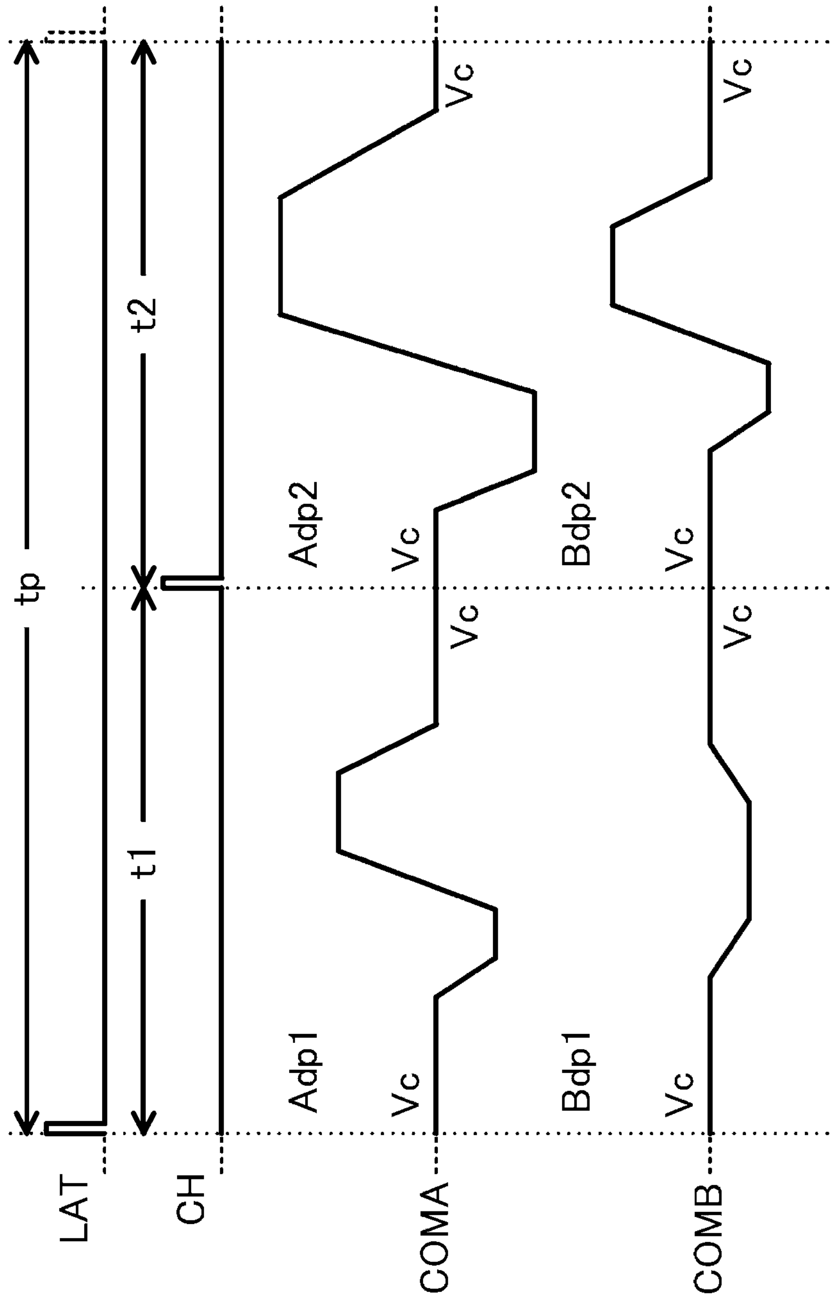
FIG. 4 is a diagram illustrating an example of signal waveforms of driving signals.

FIG. 4 is a view illustrating an example of the signal waveforms of the driving signals COMA and COMB. As illustrated in FIG. 4, the driving signal COMA has a signal waveform in which a trapezoidal waveform Adp1 arranged in a period t1 from the rise of the latch signal LAT to the rise of the change signal CH, and a trapezoidal waveform Adp2 arranged in a period t2 from the rise of the change signal CH to the rise of the latch signal LAT are continuous to each other. Further, the trapezoidal waveform Adp1 is a signal waveform for discharging a predetermined amount of ink from the discharge section 600 when supplied to the piezoelectric element 60 included in the discharge section 600, and the trapezoidal waveform Adp2 is a signal waveform for discharging an amount of ink larger than a predetermined amount from the discharge section 600 when supplied to the piezoelectric element 60 included in the discharge section 600. Here, in the following description, when the trapezoidal waveform Adp1 is supplied to the piezoelectric element 60 included in the discharge section 600, the amount of ink discharged from the discharge section 600 is referred to as a small amount, and when the trapezoidal waveform Adp2 is supplied to the piezoelectric element 60 included in the discharge section 600, the amount of ink discharged from the discharge section 600 is referred to as a medium amount.

As illustrated in FIG. 4, the driving signal COMB has a signal waveform in which a trapezoidal waveform Bdp1 arranged in the period t1 and a trapezoidal waveform Bdp2 arranged in the period t2 are continuous to each other. Further, the trapezoidal waveform Bdp1 is a signal waveform for not discharging the ink from the discharge section 600 when supplied to the piezoelectric element 60 included in the discharge section 600, and the trapezoidal waveform Bdp2 is a signal waveform for discharging a small amount of ink from the discharge section 600 when supplied to the piezoelectric element 60 included in the discharge section 600. Here, the trapezoidal waveform Bdp1 is a signal waveform for preventing an increase in ink viscosity by vibrating the ink in the vicinity of the nozzle opening portion included in the discharge section 600 to such an extent that the ink is not discharged. In the following description, when the trapezoidal waveform Bdp1 is supplied to the piezoelectric element 60 included in the discharge section 600, an operation of vibrating the ink in the vicinity of the nozzle opening portion may be referred to as micro-vibration.

Here, as illustrated in FIG. 4, the voltage values at the start timing and end timing of each of the trapezoidal waveforms Adp1, Adp2, Bdp1, and Bdp2 are all common to a voltage Vc. In other words, each of the trapezoidal waveforms Adp1, Adp2, Bdp1, and Bdp2 starts at the voltage Vc and ends at the voltage Vc. Then, a cycle tp including the period t1 and the period t2 corresponds to a printing cycle for forming new dots on the medium P.

Although FIG. 4 illustrates a case where the trapezoidal waveform Adp1 and the trapezoidal waveform Bdp2 have the same signal waveform, the trapezoidal waveform Adp1 and the trapezoidal waveform Bdp2 may have different signal waveforms. In addition, it is described that a small amount of ink is discharged from the common discharge section 600 when the trapezoidal waveform Adp1 is supplied to the piezoelectric element 60 included in the discharge section 600 and when the trapezoidal waveform Bdp2 is supplied to the piezoelectric element 60 included in the discharge section 600, but the present disclosure is not limited thereto. In other words, the signal waveforms of the driving signals COMA and COMB are not limited to the signal waveforms illustrated in FIG. 4, and combinations of various signal waveforms may be used depending on the nature of the ink discharged from the discharge section 600, the material of the medium P on which the discharged ink lands, and the like.

Further, in FIG. 4, a case where the timing at which the trapezoidal waveform Adp1 and the trapezoidal waveform Adp2 included in the driving signal COMA are switched, and the timing at which the trapezoidal waveform Bdp1 and the trapezoidal waveform Bdp2 included in the driving signal COMB are switched are defined by one change signal CH is exemplified. However, the change signal CH that defines the timing at which the trapezoidal waveform Adp1 and the trapezoidal waveform Adp2 included in the driving signal COMA are switched, and the change signal CH that defines the timing at which the trapezoidal waveform Bdp1 and the trapezoidal waveform Bdp2 included in the driving signal COMB are switched, may be different signals.

Figure 5:
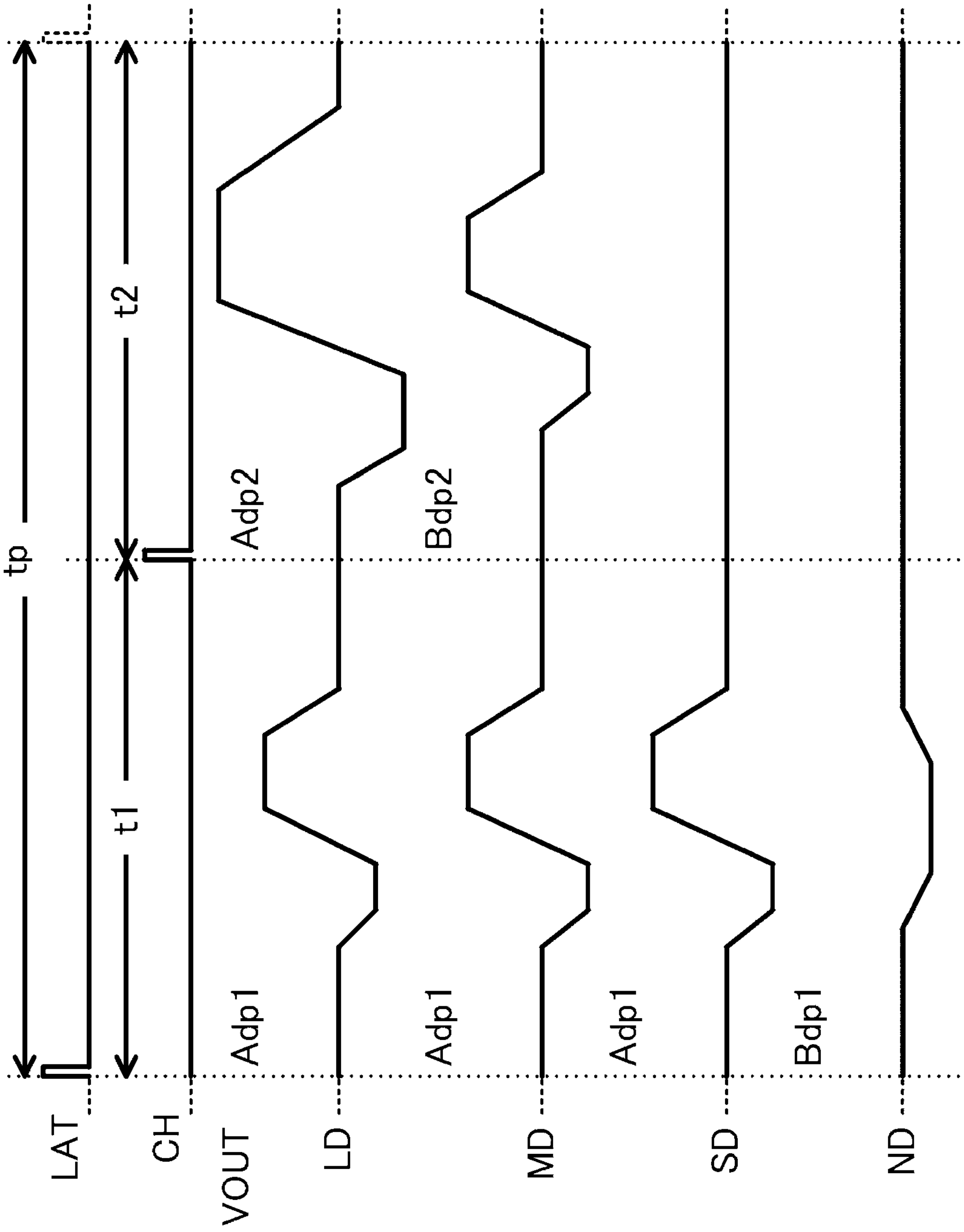
FIG. 5 is a diagram illustrating an example of a signal waveform of a driving signal.

FIG. 5 is a view illustrating an example of the signal waveform of the driving signal VOUT when the size of the dots formed on the medium P is any of a large dot LD, a medium dot MD, a small dot SD, and non-recording ND.

As illustrated in FIG. 5, the driving signal VOUT when the large dot LD is formed on the medium P is a signal waveform in which the trapezoidal waveform Adp1 arranged in the period t1 in the cycle tp and the trapezoidal waveform Adp2 arranged in the period t2 in the cycle tp are continuous to each other. When the driving signal VOUT is supplied to the piezoelectric element 60 included in the discharge section 600, a small amount of ink and a medium amount of ink are discharged from the corresponding discharge section 600. Therefore, each ink lands on the medium P and coalesces to form the large dot LD on the medium P in the cycle tp.

The driving signal VOUT when the medium dot MD is formed on the medium P is a signal waveform in which the trapezoidal waveform Adp1 arranged in the period t1 in the cycle tp and the trapezoidal waveform Bdp2 arranged in the period t2 in the cycle tp are continuous to each other. When the driving signal VOUT is supplied to the piezoelectric element 60 included in the discharge section 600, a small amount of ink is discharged two times from the corresponding discharge section 600. Therefore, each ink lands on the medium P and coalesces to form the medium dot MD on the medium P in the cycle tp.

The driving signal VOUT when the small dot SD is formed on the medium P is a signal waveform in which the trapezoidal waveform Adp1 arranged in the period t1 in the cycle tp and a constant signal waveform arranged in the period t2 in the cycle tp at the voltage Vc are continuous to each other. When the driving signal VOUT is supplied to the piezoelectric element 60 included in the discharge section 600, a small amount of ink is discharged one time from the corresponding discharge section 600. Therefore, the ink lands on the medium P to form the small dot SD on the medium P in the cycle tp.

The driving signal VOUT that corresponds to the non-recording ND that does not form dots on the medium P is a signal waveform in which the trapezoidal waveform Bdp1 arranged in the period t1 in the cycle tp and a constant signal waveform arranged in the period t2 in the cycle tp at the voltage Vc are continuous to each other. When the driving signal VOUT is supplied to the piezoelectric element 60 included in the discharge section 600, the ink in the vicinity of the nozzle opening portion of the corresponding discharge section 600 micro-vibrates only, and no ink is discharged from the discharge section 600. Therefore, dots are not formed on the medium P in the cycle tp.

Here, in the constant signal waveform at the voltage Vc in the driving signal VOUT, when none of the trapezoidal waveforms Adp1, Adp2, Bdp1, and Bdp2 is selected as the driving signal VOUT, the voltage Vc immediately before the trapezoidal waveforms Adp1, Adp2, Bdp1, and Bdp2 corresponds to the voltage value held by the capacitive component of the piezoelectric element 60 included in the discharge section 600. In other words, when none of the trapezoidal waveforms Adp1, Adp2, Bdp1, and Bdp2 is selected as the driving signal VOUT, the voltage Vc supplied immediately before is supplied to the piezoelectric element 60 included in the discharge section 600 as the driving signal VOUT.

Here, as illustrated in FIG. 5, the driving signal selection circuit 200 selects or deselects the trapezoidal waveforms Adp1 and Adp2 included in the driving signal COMA and the trapezoidal waveforms Bdp1 and Bdp2 included in the driving signal COMB to generate the driving signal VOUT individually corresponding to each of the plurality of discharge sections 600 and output the driving signal VOUT to the piezoelectric element 60 included in the corresponding discharge section 600.

Figure 6:
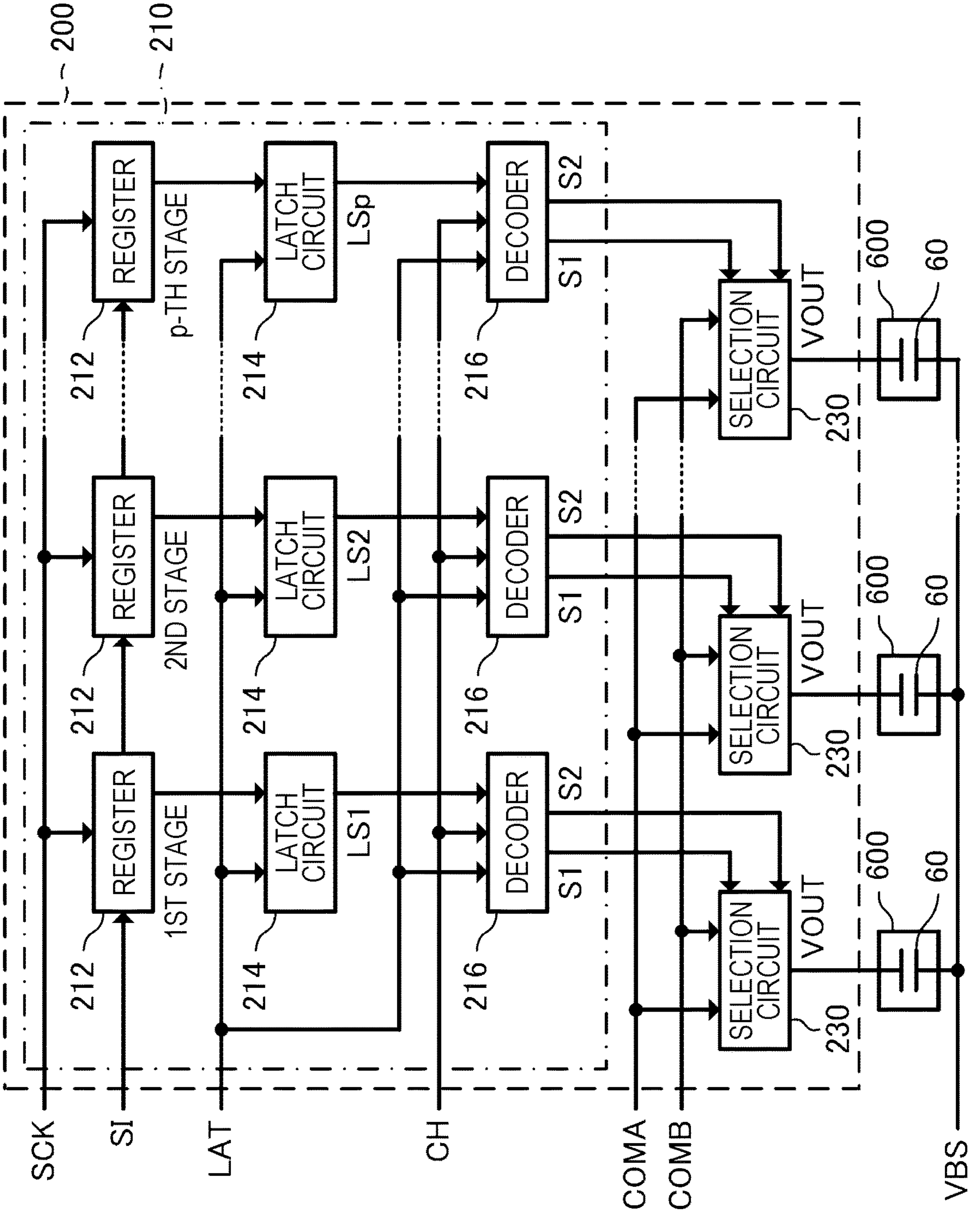
FIG. 6 is a diagram illustrating a functional configuration of a driving signal selection circuit.

FIG. 6 is a diagram illustrating a functional configuration of the driving signal selection circuit 200. As illustrated in FIG. 6, the driving signal selection circuit 200 includes a selection control circuit 210 and a plurality of selection circuits 230. FIG. 6 illustrates the plurality of discharge sections 600 to which the driving signal VOUT output from the driving signal selection circuit 200 is supplied. In the following description, the discharge module 32 including the driving signal selection circuit 200 and the plurality of discharge sections 600 will be described as having p discharge sections 600 as the plurality of discharge sections 600.

The print data signal SI, the clock signal SCK, the latch signal LAT, and the change signal CH are input to the selection control circuit 210. In the selection control circuit 210, sets of a register 212, a latch circuit 214, and a decoder 216 are provided corresponding to each of the p discharge sections 600. In other words, the selection control circuit 210 includes at least the same number of sets of the register 212, the latch circuit 214, and the decoder 216 as that of the p discharge sections 600.

The print data signal SI is a signal synchronized with the clock signal SCK, which is a signal having a total of 2p bits serially including 2-bit print data [SIH, SIL] for selecting one of the large dot LD, the medium dot MD, the small dot SD, and the non-recording ND with respect to each of the p discharge sections 600. The print data signal SI is held in the register 212 for each print data [SIH, SIL] included in the print data signal SI, corresponding to the p discharge sections 600.

Specifically, in the selection control circuit 210, the registers 212 are vertically coupled to each other to configure a p-stage shift register. Then, the print data [SIH, SIL] serially input as the print data signal SI is sequentially transferred to the register 212 in the subsequent stage according to the clock signal SCK. Then, when the supply of the clock signal SCK is stopped, the print data [SIH, SIL] corresponding to each of the p discharge sections 600 is held in the register 212 corresponding to each of the p discharge sections 600. In the following description, in order to distinguish the p registers 212 that configure the shift register, the registers 212 may be referred to as 1st stage, 2nd stage, . . . , p-th stage from the upstream to the downstream where the print data signal SI propagates.

Each of the p latch circuits 214 is provided corresponding to the p registers 212. Each of the latch circuits 214 latches the print data [SIH, SIL] held in each of the p registers 212 all at once at the rise of the latch signal LAT, and outputs the print data [SIH, SIL] to the corresponding decoder 216.

Figures 7, 8:
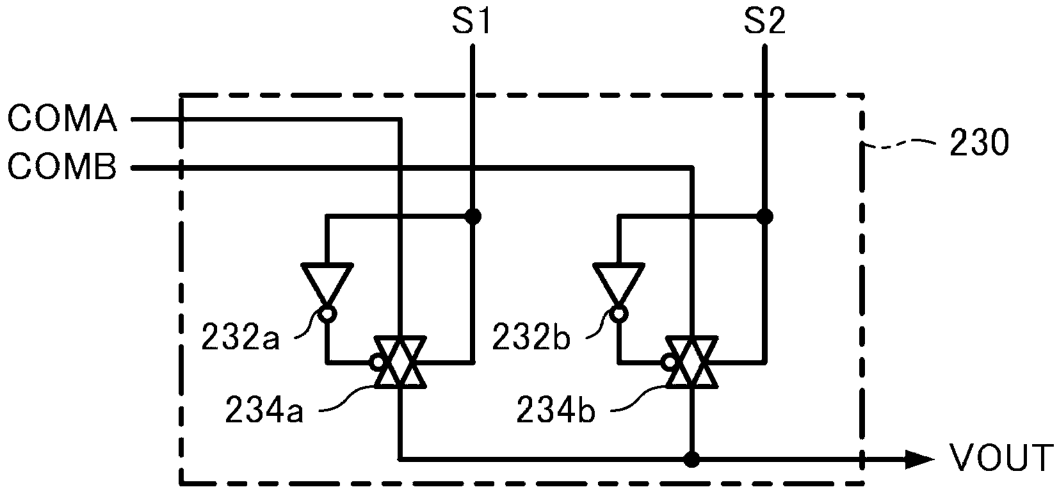
FIG. 7 is a table illustrating an example of decoding contents in a decoder.
FIG. 8 is a diagram illustrating a configuration of a selection circuit.

FIG. 7 is a table illustrating an example of the decoding contents in the decoder 216. The decoder 216 generates and outputs selection signals S1 and S2 by decoding the print data [SIH, SIL] latched by the latch circuit 214 with the contents illustrated in FIG. 7. For example, when the input print data [SIH, SIL] is [1, 0], the decoder 216 outputs logic levels of the selection signal S1 to the selection circuit 230 as the H and L levels in the periods t1 and t2, and outputs logic levels of the selection signal S2 to the selection circuit 230 as L and H levels in the periods t1 and t2.

The selection circuit 230 is provided corresponding to each of the p discharge sections 600. In other words, the driving signal selection circuit 200 has p selection circuits 230 that are at least the same in number as the p discharge sections 600. FIG. 8 is a view illustrating a configuration of the selection circuit 230 that corresponds to one discharge section 600. As illustrated in FIG. 8, the selection circuit 230 has inverters 232*a* and 232*b*, which are NOT circuits, and transfer gates 234*a* and 234*b*.

While the selection signal S1 is input to a positive control end which is not marked with a circle at the transfer gate 234*a*, the selection signal S1 is logically inverted by the inverter 232*a* and is input to a negative control end marked with a circle at the transfer gate 234*a*. The driving signal COMA is supplied to the input end of the transfer gate 234*a*. While the selection signal S2 is input to the positive control end which is not marked with a circle at the transfer gate 234*b*, the selection signal S2 is logically inverted by the inverter 232*b* and is input to the negative control end marked with a circle at the transfer gate 234*b*. The driving signal COMB is supplied to the input end of the transfer gate 234*b*. Then, the output end of the transfer gate 234*a* and the output end of the transfer gate 234*b* are commonly coupled. A signal at the coupling end to which the output end of the transfer gate 234*a* and the output end of the transfer gate 234*b* are commonly coupled is output as the driving signal VOUT.

Specifically, the input end and the output end of the transfer gate 234*a* are made conductive when the selection signal S1 is the H level, and the input end and the output end of the transfer gate 234*a* are made non-conductive when the selection signal S1 is the L level. In addition, the input end and the output end of the transfer gate 234*b* are made conductive when the selection signal S2 is the H level, and the input end and the output end of the transfer gate 234*b* are made non-conductive when the selection signal S2 is the L level. That is, the selection circuit 230 switches the conduction state between the input ends and the output ends of the transfer gates 234*a* and 234*b* based on the selection signals S1 and S2, to select or deselect the signal waveforms of the driving signals COMA and COMB supplied to the input ends of the transfer gates 234*a* and 234*b*, and output the driving signal VOUT to the coupling end at which the output end of the transfer gate 234*a* and the output end of the transfer gate 234*b* are commonly coupled.

Figure 9:
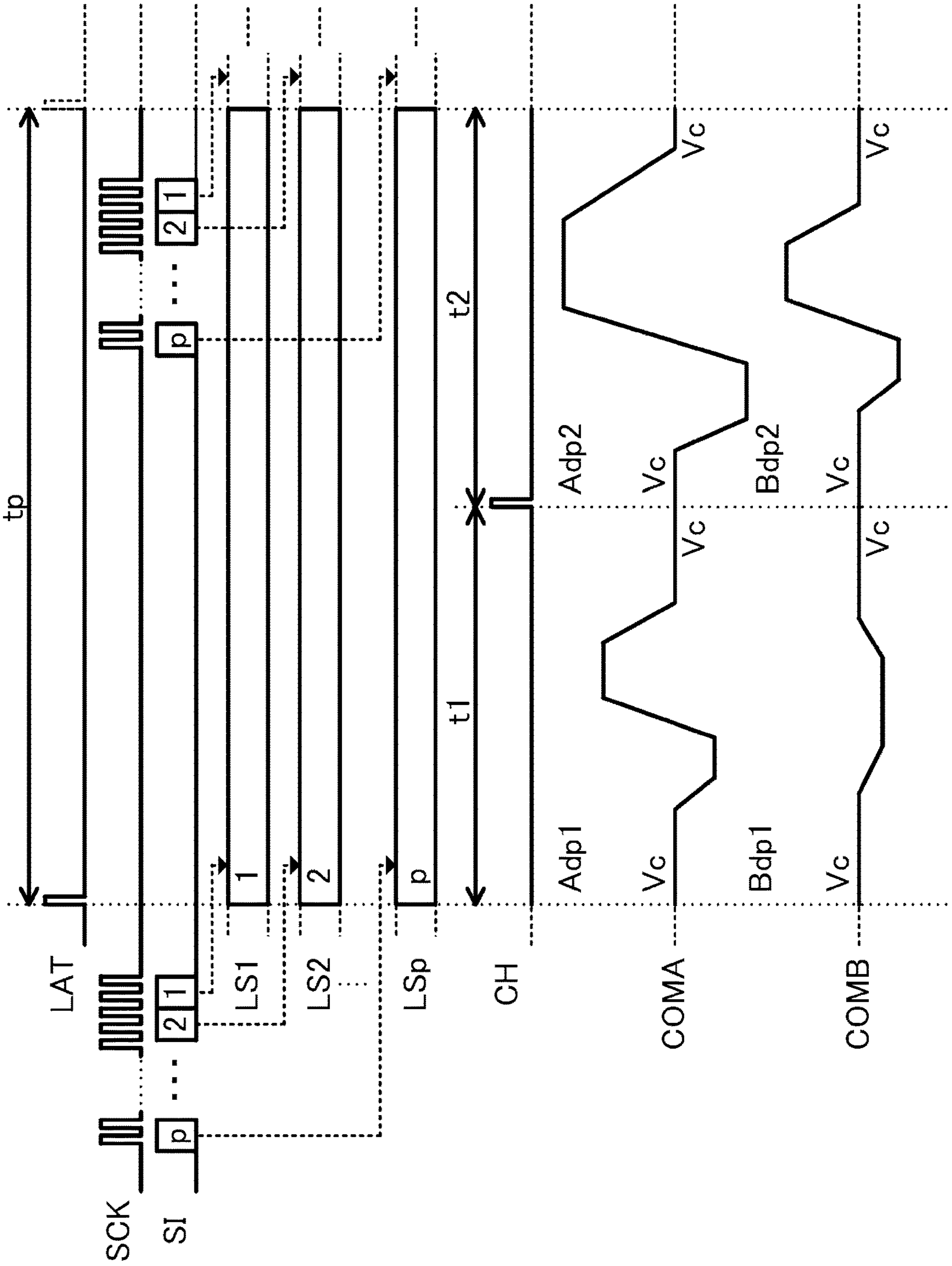
FIG. 9 is a diagram for describing an operation of the driving signal selection circuit.

The operation of the driving signal selection circuit 200 will be described with reference to FIG. 9. FIG. 9 is a diagram for describing the operation of the driving signal selection circuit 200. The print data [SIH, SIL] included in the print data signal SI is serially input in synchronization with the clock signal SCK. Then, the print data [SIH, SIL] is sequentially transferred by the register 212 that configures the shift register corresponding to the p discharge sections 600 in synchronization with the clock signal SCK. After that, when the supply of the clock signal SCK is stopped, the print data [SIH, SIL] are held in each of the registers 212 corresponding to each of the p discharge sections 600. The print data [SIH, SIL] included in the print data signal SI is input in the order corresponding to the discharge sections 600 at the p-th stage, . . . , 2nd stage, and 1st stage of the register 212 that configures the shift register.

When the latch signal LAT rises, each of the latch circuits 214 latches the print data [SIH, SIL] held in the register 212 all at once. In addition, in FIG. 9, LS1, LS2, . . . , and LSp indicate the print data [SIH, SIL] latched by the latch circuits 214 that correspond to the registers 212 at the 1st stage, 2nd stage, . . . , and p-th stage.

The decoder 216 outputs the logic levels of the selection signals S1 and S2 in each of the periods t1 and t2 with the contents illustrated in FIG. 7, according to the size of the dot defined by the latched print data [SIH, SIL].

Specifically, when the input print data [SIH, SIL] is [1, 1], the decoder 216 sets the logic level of the selection signal S1 to the H and H levels in the periods t1 and t2, and sets the logic level of the selection signal S2 to the L and L levels in the periods t1 and t2. In this case, the selection circuit 230 selects the trapezoidal waveform Adp1 in the period t1 and selects the trapezoidal waveform Adp2 in the period t2. As a result, at the output end of the selection circuit 230, the driving signal VOUT that corresponds to the large dot LD illustrated in FIG. 5 is generated.

In addition, when the input print data [SIH, SIL] is [1, 0], the decoder 216 sets the logic level of the selection signal S1 to the H and L levels in the periods t1 and t2, and sets the logic level of the selection signal S2 to the L and H levels in the periods t1 and t2. In this case, the selection circuit 230 selects the trapezoidal waveform Adp1 in the period t1 and selects the trapezoidal waveform Bdp2 in the period t2. As a result, at the output end of the selection circuit 230, the driving signal VOUT that corresponds to the medium dot MD illustrated in FIG. 5 is generated.

In addition, when the input print data [SIH, SIL] is [0, 1], the decoder 216 sets the logic level of the selection signal S1 to the H and L levels in the periods t1 and t2, and sets the logic level of the selection signal S2 to the L and L levels in the periods t1 and t2. In this case, the selection circuit 230 selects the trapezoidal waveform Adp1 in the period t1 and selects none of the trapezoidal waveforms Adp2 and Bdp2 in the period t2. As a result, at the output end of the selection circuit 230, the driving signal VOUT that corresponds to the small dot SD illustrated in FIG. 5 is generated.

In addition, when the input print data [SIH, SIL] is [0, 0], the decoder 216 sets the logic level of the selection signal S1 to the L and L levels in the periods t1 and t2, and sets the logic level of the selection signal S2 to the H and L levels in the periods t1 and t2. In this case, the selection circuit 230 selects the trapezoidal waveform Bdp1 in the period t1 and selects none of the trapezoidal waveforms Adp2 and Bdp2 in the period t2. As a result, at the output end of the selection circuit 230, the driving signal VOUT that corresponds to the non-recording ND illustrated in FIG. 5 is generated.

As described above, the driving signal selection circuit 200 selects the signal waveforms of the driving signal COMA and the driving signal COMB based on the print data signal SI, the clock signal SCK, the latch signal LAT, and the change signal CH, to generate and output the driving signal VOUT.

2. Structure of Head Unit

2.1 Structure of Head Unit

Figure 10:
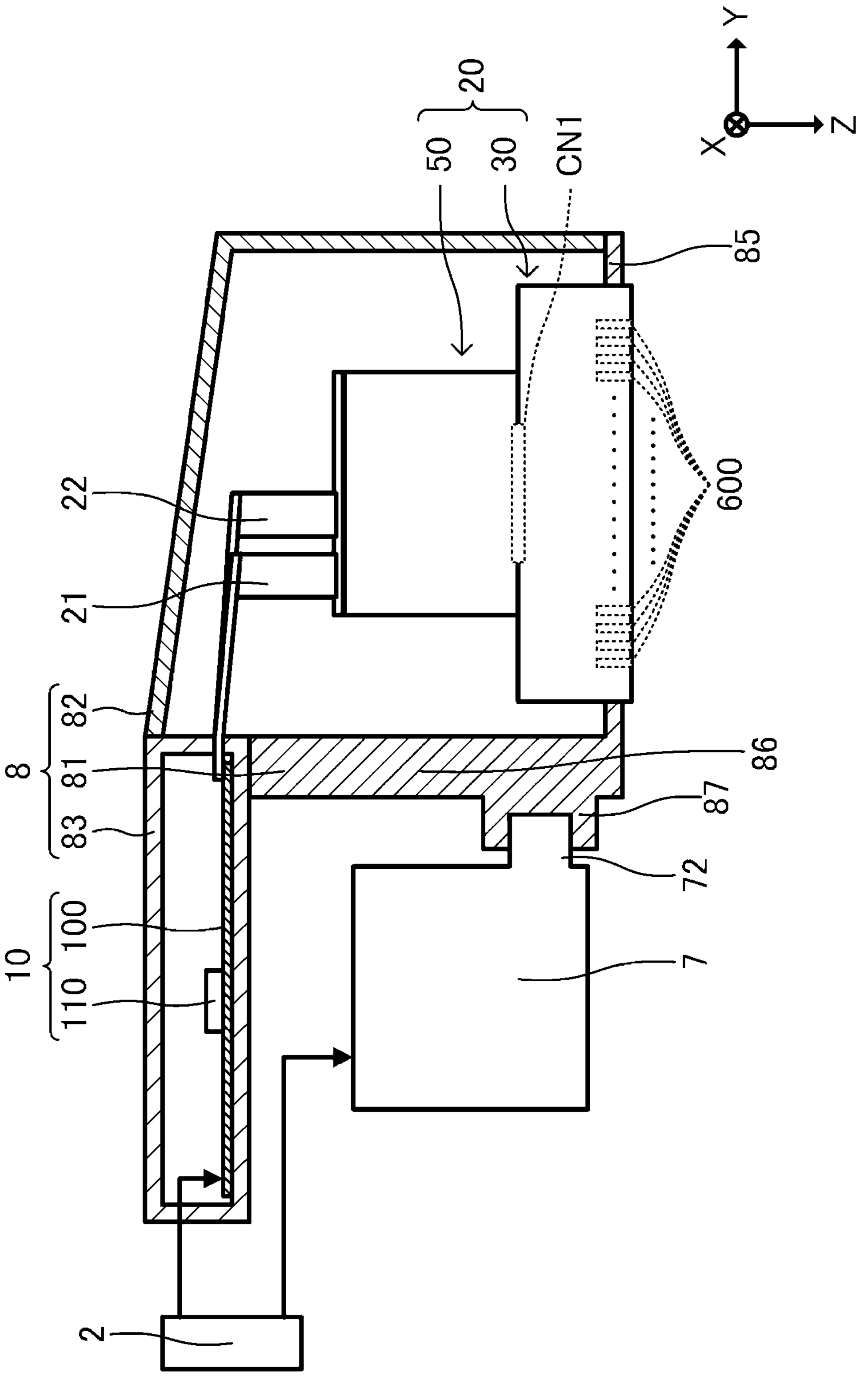
FIG. 10 is a side view illustrating a structure of a carriage in which the head unit is mounted.
Figure 11:
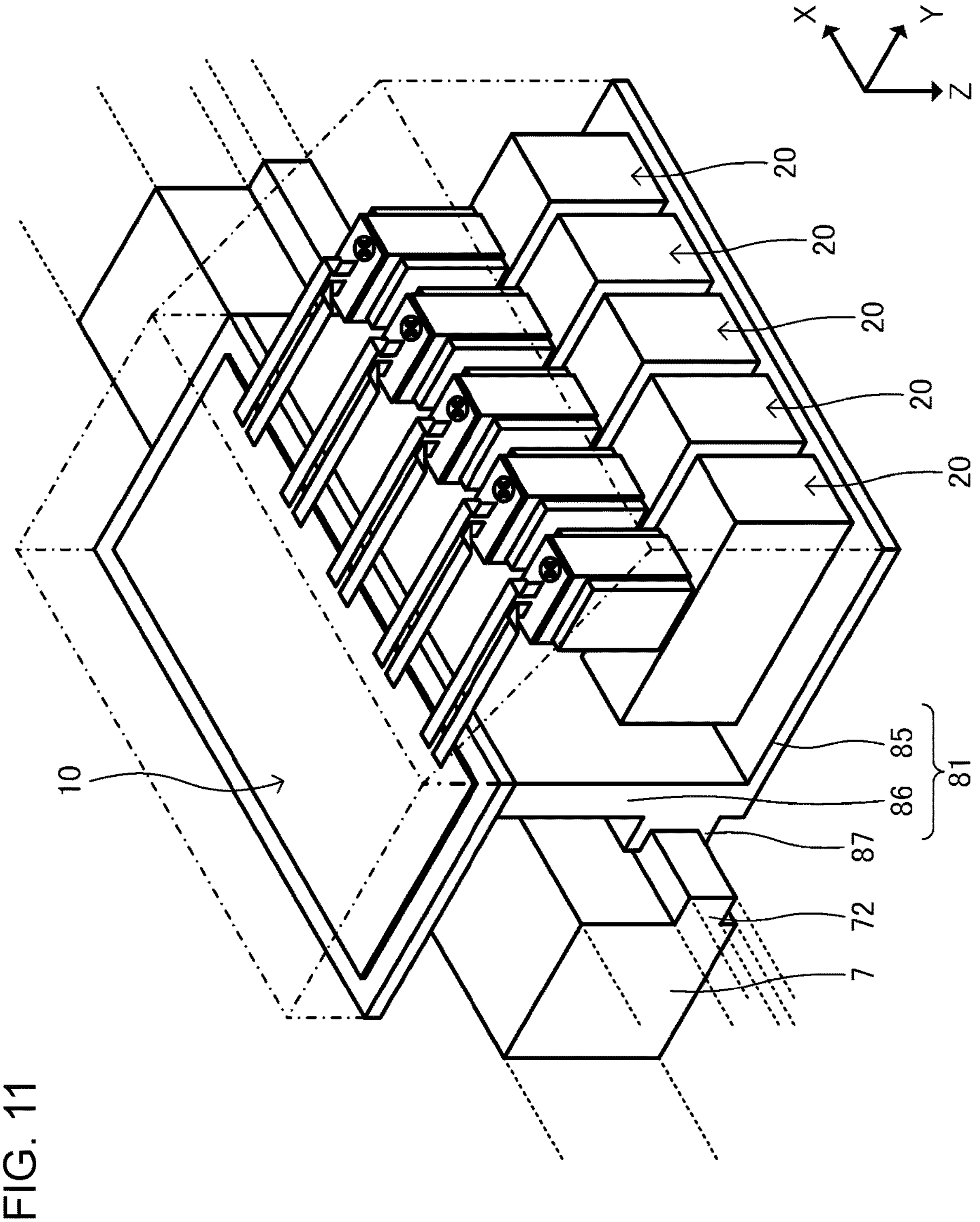
FIG. 11 is a perspective view illustrating a peripheral structure of the carriage in which the head unit is mounted.

Next, the structure of the head unit 3 in the liquid discharge apparatus 1 will be described. FIG. 10 is a side view illustrating a structure of the carriage 8 in which the head unit 3 is mounted. FIG. 11 is a perspective view illustrating a peripheral structure of the carriage 8 in which the head unit 3 is mounted. Here, in the following description, the X axis, the Y axis, and the Z axis that are orthogonal to each other will be illustrated and described. Further, in the following description, the starting point side of the arrow along the X axis in the drawing may be referred to as the −X side, and the tip end side thereof may be referred to as the +X side. The starting point side of the arrow along the Y axis in the drawing may be referred to as the −Y side, and the tip end side thereof may be referred to as the +Y side. The starting point side of the arrow along the Z axis in the drawing may be referred to as the −Z side, and the tip end side thereof may be referred to as the +Z side. Further, in the following description, a plane composed of the X axis and the Y axis may be referred to as an XY plane, a plane composed of the X axis and the Z axis may be referred to as an XZ plane, and a plane composed of the Y axis and the Z axis may be referred to as a YZ plane.

As illustrated in FIGS. 10 and 11, the carriage 8 includes a carriage main body 81, a carriage cover 82, and an accommodation case 83. The carriage main body 81 includes a placement section 85 and a fixing section 86. The placement section 85 is a plate-shaped member extending along the XY plane, and the fixing section 86 is a plate-shaped member that extends along the YZ plane from the end portion of the placement section 85 on the −Y side toward the −Z side. That is, the carriage main body 81 has an L-shaped cross section when viewed along the X axis. The carriage cover 82 is positioned on the −Z side of the carriage main body 81 and is detachably attached to the carriage main body 81. At this time, the carriage main body 81 and the carriage cover 82 form a closed space. The accommodation case 83 has a substantially rectangular shape including an accommodation space that can accommodate various configurations inside, and on the −Y side of the carriage main body 81, the end portion of the accommodation case 83 on the +Y side is fixed to the end portion of the fixing section 86 on the −Z side.

Further, a carriage support section 87 is formed on a surface on the −Y side of the fixing section 86 included in the carriage main body 81. A guide rail 72 formed on the +Y side of the carriage guide shaft 7 is fitted to the carriage support section 87, and accordingly, the carriage support section 87 is movably supported by the carriage guide shaft 7. As a result, the carriage 8 can move along the carriage guide shaft 7.

In the internal space of the carriage 8 configured as described above, and in the closed space formed by the carriage main body 81 and the carriage cover 82 and the accommodation space formed inside the accommodation case 83, the discharge control module 10, a plurality of liquid discharge modules 20, a plurality of FFC cables 21 corresponding to the plurality of liquid discharge modules 20, and an FFC cable 22 are accommodated. Here, the liquid discharge apparatus 1 of the present embodiment will be described as including five liquid discharge modules 20. That is, five liquid discharge modules 20, five FFC cables 21, and five FFC cables 22 are accommodated in the internal space of the carriage 8 of the present embodiment. The number of liquid discharge modules 20 included in the liquid discharge apparatus 1 is not limited to five.

The discharge control module 10 is accommodated in the accommodation space formed inside the accommodation case 83. The discharge control module 10 includes a control circuit substrate 100 and an integrated circuit 110 mounted on the control circuit substrate 100. In addition, the integrated circuit 110 configures a part or all of the above-described head control circuit 12.

The five FFC cables 21 and the five FFC cables 22 are provided corresponding to the five liquid discharge modules 20. Specifically, one end of each of the five FFC cables 21 and one end of each of the five FFC cables 22 are electrically coupled to the control circuit substrate 100. Further, the other end of each of the five FFC cables 21 and the other end of each of the five FFC cables 22 are electrically coupled to the corresponding liquid discharge module 20. That is, the other end of the FFC cable 21 and the other end of the FFC cable 22 are electrically coupled to each of the five liquid discharge modules 20. As such FFC cables 21 and 22, for example, a flexible flat cable (FFC) can be used.

The five liquid discharge modules 20 include the drive circuit module 50 and the print head 30, and are accommodated in the closed space formed by the carriage main body 81 and the carriage cover 82. The five liquid discharge modules 20 are mounted on the placement sections 85 at equal intervals along the X axis.

The other end of the FFC cable 21 and the other end of the FFC cable 22 are electrically coupled to the drive circuit module 50 on the −Z side of the drive circuit module 50 included in the corresponding liquid discharge module 20. Further, the print head 30 is positioned on the +Z side of the drive circuit module 50. The print heads 30 are mounted on the placement sections 85 at equal intervals along the X axis. At this time, the plurality of discharge sections 600 included in the print head 30 are exposed from the −Z side surface of the placement section 85. As a result, the ink discharged from the plurality of discharge sections 600 included in the print head 30 is obstructed by the carriage 8 and is discharged to the medium P.

Further, in the liquid discharge module 20, the print head 30 and the drive circuit module 50 are electrically coupled by a connector CN1. As the connector CN1, it is preferable to use a board-to-board (BtoB) connector.

The BtoB connector can electrically couple a configuration in which one of the two connectors is provided and a configuration in which the other of the two connectors is provided to each other by directly fitting the two connectors without using a cable. Therefore, without adding a new configuration, a configuration in which one of the two connectors is provided and a configuration in which the other of the two connectors is provided can be electrically coupled to each other, and the relative arrangement relationship between the configurations can be determined.

Specifically, when the BtoB connector is used as the connector CN1 that electrically couples the print head 30 and the drive circuit module 50, the relative arrangement relationship between the print head 30 and the drive circuit module 50 is fixed. Therefore, the carriage 8 may secure a region for fixing at least one of the print head 30 and the drive circuit module 50. That is, the mounting area of the print head 30 and the drive circuit module 50 on the carriage 8 can be reduced. As a result, the print head 30 and the drive circuit module 50 can be arranged at a high density, and the size of the carriage 8 can be reduced. Further, by electrically coupling the print head 30 and the drive circuit module 50 using the BtoB connector as the connector CN1, the influence of the impedance that can occur in the cable is eliminated, and as a result, the accuracy of signals propagated between the print head 30 and the drive circuit module 50 is improved. Therefore, the discharge accuracy of the ink discharged from the print head 30 is improved.

The print data signal pDATA and the voltage signals VHV and VMV output by the control unit 2 propagate through a cable (not illustrated) to the head unit 3 configured as described above, and are input to the discharge control module 10. The discharge control module 10 generates the clock signal SCK, the differential print data signal Dp, and the differential drive data signal Dd corresponding to each of the five liquid discharge modules 20 based on the input print data signal pDATA, the voltage signals VHV and VMV, and the like, and generates the fan driving signal Fp corresponding to the liquid discharge module 20. The discharge control module 10 outputs the generated clock signal SCK, the differential print data signal Dp, the differential drive data signal Dd, the fan driving signal Fp, and the voltage signals VHV and VMV to the FFC cables 21 and 22.

The clock signal SCK, the differential print data signal Dp, the differential drive data signal Dd, and the fan driving signal Fp output by the discharge control module 10, and the voltage signals VHV and VMV propagate through the FFC cables 21 and 22 and are input to the drive circuit module 50 included in the liquid discharge module 20. The drive circuit module 50 operates based on the input clock signal SCK, the differential print data signal Dp, and the differential drive data signal Dd, and the voltage signals VHV and VMV, to generate the clock signal SCK, the differential print data signal Dpt, and the plurality of driving signals COM for controlling the operation of the print head 30, and supply the generated signals to the print head 30 via the connector CN1. As a result, the ink is discharged from the discharge section 600 included in the print head 30.

2.2 Structure of Liquid Discharge Module

2.2.1 Schematic Structure of Liquid Discharge Module

Figure 12:
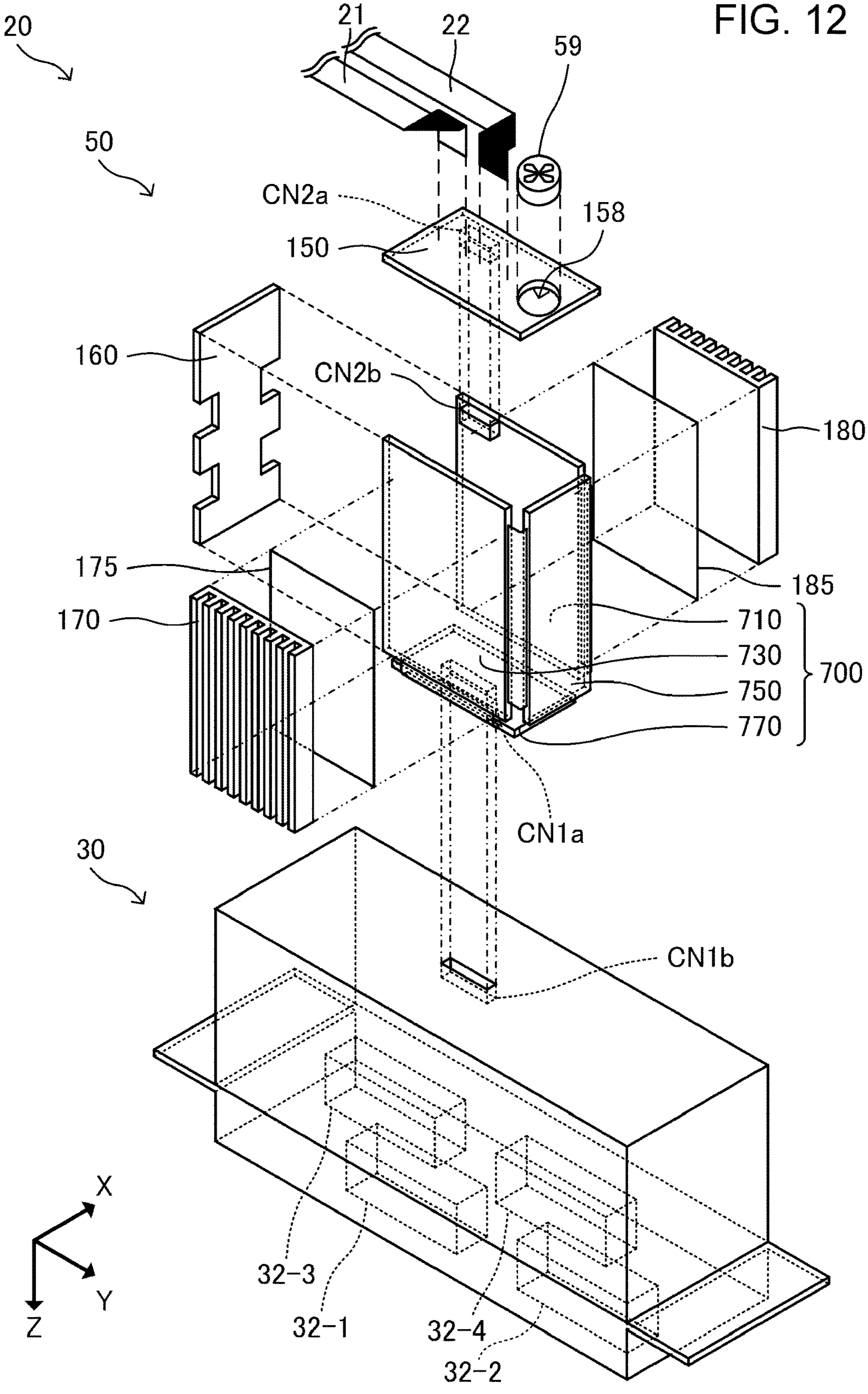
FIG. 12 is an exploded perspective view illustrating an example of a structure of a liquid discharge module.

Next, a specific example of the structure of the liquid discharge module 20 included in the head unit 3 will be described. FIG. 12 is an exploded perspective view illustrating an example of a structure of the liquid discharge module 20. As illustrated in FIG. 12, the liquid discharge module 20 includes the print head 30 that discharges a liquid, and the drive circuit module 50 that is electrically coupled to the print head 30. Here, it is described that the print head 30 of the present embodiment includes the discharge modules 32-1 to 32-4 as the four discharge modules 32, but the number of discharge modules 32 included in the print head 30 is not limited to four. The positional relationship between the discharge modules 32-1 to 32-4 is not limited to the positional relationship illustrated in FIG. 12.

As illustrated in FIG. 12, the drive circuit module 50 includes a relay substrate 150, a drive circuit substrate 700, an opening plate 160, heat sinks 170 and 180, and heat conductive members 175 and 185.

The relay substrate 150 is a plate-shaped member extending along the XY plane. The other ends of the FFC cables 21 and 22 are electrically coupled to the surface of the relay substrate 150 on the −Z side. A connector CN2*a* is provided on the surface of the relay substrate 150 on the +Z side. Further, on the relay substrate 150, a through-hole 158 that penetrates the relay substrate 150 in the direction along the Z axis is formed. The cooling fan 59 is attached to the through-hole 158. That is, the cooling fan 59 is fixed to the relay substrate 150 to generate an air flow in the direction along the Z axis.

The drive circuit substrate 700 is positioned on the +Z side of the relay substrate 150 and includes rigid wiring members 710, 730, 750, and 770. The rigid wiring members 710, 730, 750, and 770 included in the drive circuit substrate 700 are electrically coupled to each other. In the rigid wiring members 710, 730, 750, and 770 included in the drive circuit substrate 700, various circuits such as the above-described discharge control circuit 51, the driving signal output circuit 52, the capacitor 53, the abnormality detection circuit 54, the abnormality notification circuit 55, the temperature detection circuit 56, and the voltage conversion circuit 58, and the connectors CN1*a* and CN2*b* are mounted.

The rigid wiring member 710 is a plate-shaped member extending along the YZ plane, and the end portion on the −Z side is positioned along the end portion on the +X side of the relay substrate 150. The rigid wiring member 730 is a plate-shaped member extending along the YZ plane, and the end portion on the −Z side is positioned along the end portion of the relay substrate 150 on the −X side. That is, the rigid wiring member 710 is positioned on the +X side of the rigid wiring member 730, and the rigid wiring member 710 and the rigid wiring member 730 are positioned facing each other along the X axis.

Further, the rigid wiring member 750 is a plate-shaped member extending along the XZ plane, the end portion on the −Z side is positioned along the end portion of the relay substrate 150 on the +Y side, the end portion on the +X side is positioned along the end portion of the rigid wiring member 710 on the +Y side, and the end portion on the −X side is positioned along the end portion of the rigid wiring member 730 on the +Y side. That is, the rigid wiring member 750 is positioned to intersect both the rigid wiring member 710 and the rigid wiring member 730.

The rigid wiring member 770 is a plate-shaped member extending along the XY plane, the end portion on the +X side is positioned along the end portion on the +Z side of the rigid wiring member 710, the end portion on the −X side is positioned along the end portion of the rigid wiring member 730 on the +Z side, and the end portion on the +Y side is positioned along the end portion of the rigid wiring member 750 on the +Z side. That is, the rigid wiring member 770 is positioned to intersect the rigid wiring member 710, the rigid wiring member 730, and the rigid wiring member 750.

As described above, in the drive circuit substrate 700, the rigid wiring member 710 and the rigid wiring member 730 are positioned facing each other in the direction along the X axis, and the rigid wiring members 750 and 770 are positioned to cover at least a part of the space generated between the rigid wiring member 710 and the rigid wiring member 730.

The connector CN2*b* is a surface of the rigid wiring member 710 on the −X side, and is provided along the end portion of the rigid wiring member 710 on the −Z side. That is, the connector CN2*b* is provided in the vicinity of the relay substrate 150. The connector CN2*b* is fitted to the connector CN2*a* provided on surface of the relay substrate 150 on the +Z side to electrically couple the drive circuit substrate 700 including the rigid wiring member 710, and the relay substrate 150. That is, the connector CN2*a* and the connector CN2*b* configure the BtoB connector that electrically couples the drive circuit substrate 700 and the relay substrate 150 by being directly fitted to each other. In the following description, the BtoB connector including the connector CN2*a* and the connector CN2*b* may be referred to as a connector CN2.

The connector CN1*a* is provided on the surface of the rigid wiring member 770 on the +Z side. The drive circuit substrate 700 is electrically coupled to the print head 30 via the connector CN1*a*. That is, the connector CN1*a* corresponds to one of the connectors CN1 which are BtoB connectors that electrically couple the drive circuit substrate 700 and the print head 30.

The heat sink 170 is positioned on the −X side of the rigid wiring member 730 and is attached to the rigid wiring member 730 via the heat conductive member 175. The heat sink 170 and the heat conductive member 175 absorb the heat generated in the rigid wiring member 730 and release the heat into the atmosphere. As a result, the heat sink 170 cools various circuits provided on the rigid wiring member 730. As the heat sink 170, a metal such as copper, a copper alloy, aluminum, and an aluminum alloy is used from the viewpoints of heat conductivity performance, processability of the material, availability of the material, and the like. In addition, as the heat conductive member 175, a gel sheet or a rubber sheet containing, for example, silicone or acrylic resin and having thermal conductivity, which is a substance with flame retardant and electrical insulating properties, is used from the viewpoint of improving the heat absorption efficiency of the heat sink 170 by increasing the adhesion between the heat sink 170 and the rigid wiring member 730 and ensuring the insulation performance between the heat sink 170 and the rigid wiring member 730, which are metal.

The heat sink 180 is positioned on the +X side of the rigid wiring member 710 and is attached to the rigid wiring member 710 via the heat conductive member 185. The heat sink 180 and the heat conductive member 185 absorb the heat generated in the rigid wiring member 710 and release the heat into the atmosphere. As a result, the heat sink 180 cools various circuits provided on the rigid wiring member 710. As the heat sink 180, a metal such as copper, a copper alloy, aluminum, and an aluminum alloy is used from the viewpoints of heat conductivity performance, processability of the material, availability of the material, and the like. In addition, as the heat conductive member 185, a gel sheet or a rubber sheet containing, for example, silicone or acrylic resin and having thermal conductivity, which is a substance with flame retardant and electrical insulating properties, is used from the viewpoint of improving the heat absorption efficiency of the heat sink 180 by increasing the adhesion between the heat sink 180 and the rigid wiring member 710 and ensuring the insulation performance between the heat sink 180 and the rigid wiring member 710, which are metal.

The opening plate 160 is a plate-shaped member extending along the XZ plane, the end portion on the +X side is positioned along the end portion of the rigid wiring member 710 on the −Y side, the end portion on the −X side is positioned along the end portion of the rigid wiring member 730 on the −Y side, the end portion on the +Z side is positioned along the end portion of the rigid wiring member 770 on the −Y side, and the end portion on the −Z side is positioned along the end portion of the relay substrate 150 on the −Y side. That is, the opening plate 160 is positioned to cover at least a part of the space generated between the rigid wiring member 710 and the rigid wiring member 730 positioned facing each other along the X axis.

The print head 30 is positioned on the +Z side of the drive circuit module 50 and has the discharge modules 32-1 to 32-4 and the connector CN1*b*. The discharge modules 32-1 to 32-4 are positioned on the +Z side of the print head 30, and at least a part thereof is provided to be exposed from the surface of the print head 30 on the +Z side. At this time, of the four discharge modules 32, the discharge modules 32-1 and 32-2 are positioned side by side such that the discharge module 32-1 is on the −Y side and the discharge module 32-2 is on the +Y side along the Y axis. Of the four discharge modules 32, the discharge modules 32-3 and 32-4 are positioned side by side such that the discharge module 32-3 is on the −Y side and the discharge modules 32-4 is on the +Y side along the Y axis on the +X side of the discharge modules 32-1 and 32-2 described above. That is, the discharge modules 32-1 and 32-2 of the four discharge modules 32 are positioned side by side along the end portion of the print head 30 on the −X side, and the discharge modules 32-3 and 32-4 of the four discharge modules 32 are positioned side by side along the end portion of the print head 30 on the +X side.

The connector CN1*b* is positioned on the −Z side of the print head 30, and is provided such that at least a part thereof is exposed from the surface of the print head 30 on the −Z side. The connector CN1*a* included in the drive circuit module 50 is fitted to the connector CN1*b*. As a result, the drive circuit substrate 700 and the print head 30 are electrically coupled. That is, the connector CN1*b* corresponds to the other of the connector CN1 which is a BtoB connector that electrically couples the drive circuit substrate 700 and the print head 30, and the connector CN1*a* and the connector CN1*b* configure the connector CN1 which is a BtoB connector.

2.2.2 Structure of Print Head

Figure 13:
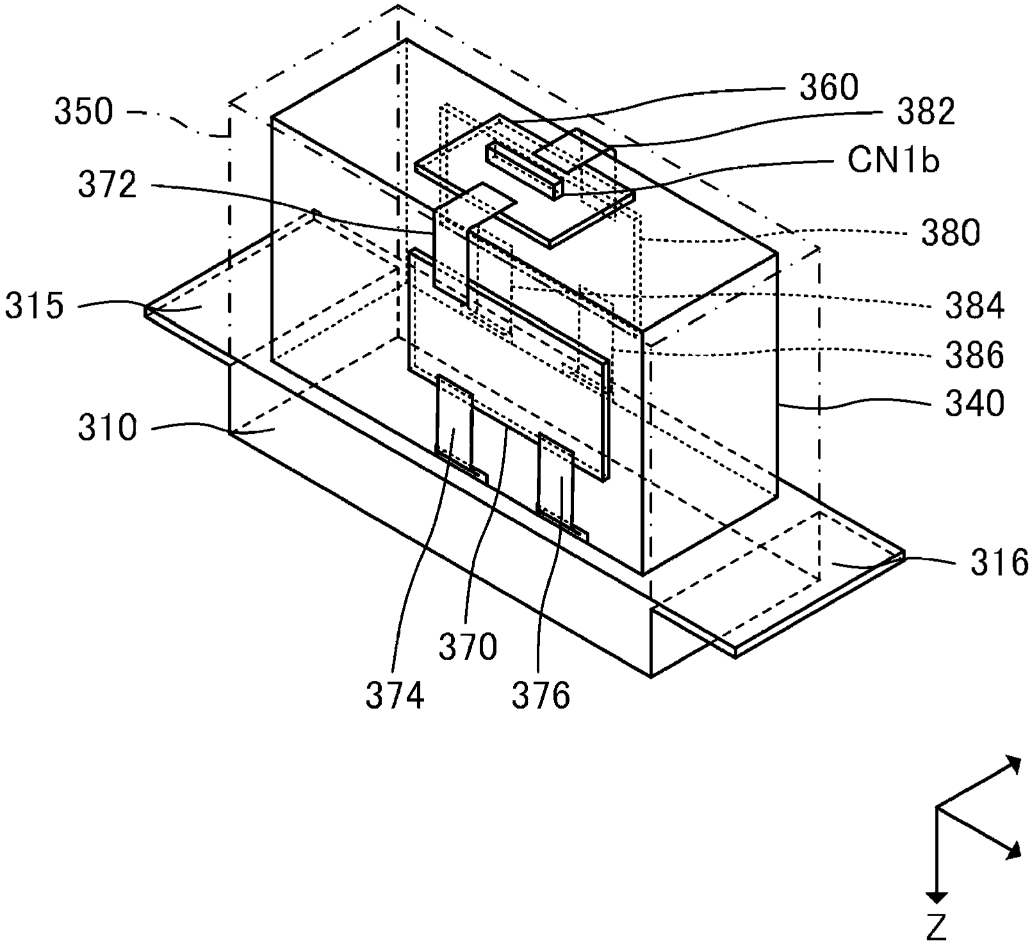
FIG. 13 is a perspective view illustrating an example of an internal structure of a print head.

A more specific structure of the liquid discharge module 20 configured as described above will be described. First, a specific structure of the print head 30 included in the liquid discharge module 20 will be described. FIG. 13 is a perspective view illustrating an example of an internal structure of the print head 30. In FIG. 13, the head cover 350 included in the print head 30 is illustrated by a broken line, and the internal configuration of the head cover 350 is illustrated by a solid line. That is, FIG. 13 illustrates a state where the head cover 350 included in the print head 30 is removed.

As illustrated in FIG. 13, the print head 30 has a head holder 310 and the head cover 350. A flange 315 is provided at the end portion of the head holder 310 on the −Y side, and a flange 316 is provided at the end portion of the head holder 310 on the +Y side. The head holder 310 is exposed from the +Z side of the placement section 85 of the carriage main body 81. At this time, the print head 30 is supported by the carriage main body 81 in a state where the flanges 315 and 316 are supported by the placement section 85 and the plurality of discharge sections 600 are exposed from the −Z side surface of the placement section 85. The flanges 315 and 316 may be fixed to the placement section 85 by a screw or the like (not illustrated).

The head cover 350 is positioned on the −Z side of the head holder 310 and has an accommodation space inside. The head cover 350 functions as a protection member that protects various configurations of the print head 30 from ink mist and impact by accommodating various configurations of the print head 30 in the accommodation space.

A flow path member 340, a head substrate 360, head relay substrates 370 and 380, and FPC 372, 374, 376, 382, 384, and 386 are accommodated in the accommodation space of the head cover 350.

In the flow path member 340, an ink flow path (not illustrated) for supplying the ink supplied from the liquid container 9 to the plurality of discharge sections 600 is formed. The head substrate 360 is positioned on the −Z side of the flow path member 340 and extends along the XY plane. The connector CN1*b* is provided on the surface of the head substrate 360 on the −Z side. At least a part of the connector CN1*b* is exposed to the outside of the print head 30 by inserting a through-hole (not illustrated) formed in the head cover 350.

The head relay substrate 370 is positioned on the −X side of the flow path member 340 and extends along the YZ plane. The head relay substrate 370 is electrically coupled to the head substrate 360 via the FPC 372. Further, one end of the FPC 374 and one end of the FPC 376 are coupled to the head relay substrate 370. The other end of the FPC 374 is electrically coupled to the discharge module 32-1 and the other end of the FPC 376 is electrically coupled to the discharge module 32-2.

The head relay substrate 380 is positioned on the +X side of the flow path member 340 and extends along the YZ plane. The head relay substrate 380 is electrically coupled to the head substrate 360 via the FPC 382. Further, one end of the FPC 384 and one end of the FPC 386 are coupled to the head relay substrate 380. The other end of the FPC 384 is electrically coupled to the discharge module 32-3, and the other end of the FPC 386 is electrically coupled to the discharge module 32-4.

Various signals output by the drive circuit module 50 are input to the print head 30 configured as described above via the connector CN1*b*. The signal input via the connector CN1*b* is branched by the head substrate 360 and the head relay substrates 370 and 380, and then supplied to each of the discharge modules 32-1 to 32-4. Here, the restoration circuit 31 included in the print head 30 is provided on, for example, the head substrate 360.

Figure 14:
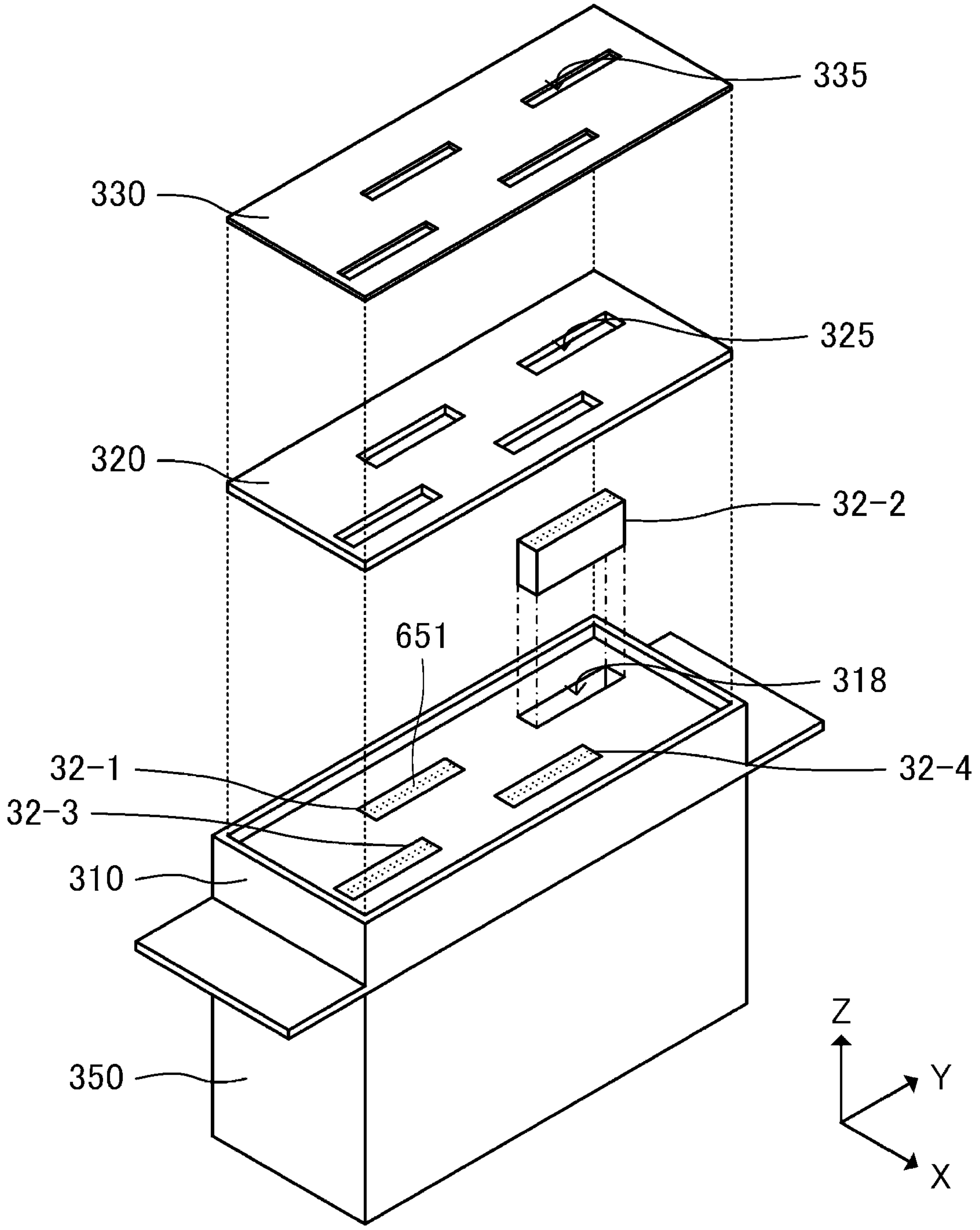
FIG. 14 is an exploded perspective view of the print head.

FIG. 14 is an exploded perspective view of the print head 30 when the print head 30 is viewed from the +Z side along the Z axis. As illustrated in FIG. 14, the head holder 310 of the print head 30 is provided with a reinforcing plate 320, a fixing plate 330, and the discharge modules 32-1 to 32-4.

The head holder 310 is made of a conductive material, such as metal having a higher strength than that of the reinforcing plate 320. On the surface of the head holder 310 on the +Z side, four accommodation sections 318 for accommodating each of the discharge modules 32-1 to 32-4 are provided.

The four accommodation sections 318 have a recessed shape that opens on the +Z side, and individually accommodate the discharge modules 32-1 to 32-4 fixed by the fixing plate 330. At this time, the opening of the accommodation section 318 is sealed by the fixing plate 330. In other words, the discharge modules 32-1 to 32-4 are individually accommodated on the inside of a space formed by the accommodation section 318 and the fixing plate 330. The accommodation section 318 may be individually provided corresponding to each of the discharge modules 32-1 to 32-4, and may have a shape for collectively accommodating the discharge modules 32-1 to 32-4.

The reinforcing plate 320 and the fixing plate 330 are laminated in this order from the −Z side to the +Z side along the Z axis on the surface of the head holder 310 provided with the accommodation section 318.

The fixing plate 330 is configured of a plate-shaped member formed of a conductive material, such as metal. Further, on the fixing plate 330, an opening 335, through which a nozzle 651 included in the plurality of discharge sections 600 included in each of the discharge modules 32-1 to 32-4 is exposed, is provided penetrating along the Z axis. The openings 335 are individually provided corresponding to each of the discharge modules 32-1 to 32-4.

The reinforcing plate 320 is preferably made of a material having a higher strength than that of the fixing plate 330. On the reinforcing plate 320, an opening 325 corresponding to each of the discharge modules 32-1 to 32-4 joined to the fixing plate 330 and having an inner diameter larger than the outer periphery of each of the discharge modules 32-1 to 32-4 is provided to penetrate along the Z axis. Each of the discharge modules 32-1 to 32-4 through which the opening 325 of the reinforcing plate 320 is inserted is joined to the fixing plate 330.

Further, the discharge modules 32-1 to 32-4 included in the print head 30 are arranged in a staggered manner on the surface of the head holder 310 on the +Z side. In each of the discharge modules 32-1 to 32-4, two rows of nozzles 651 included in the discharge section 600 for discharging ink are provided along the X axis in a state of being arranged side by side along the Y axis.

Figure 15:
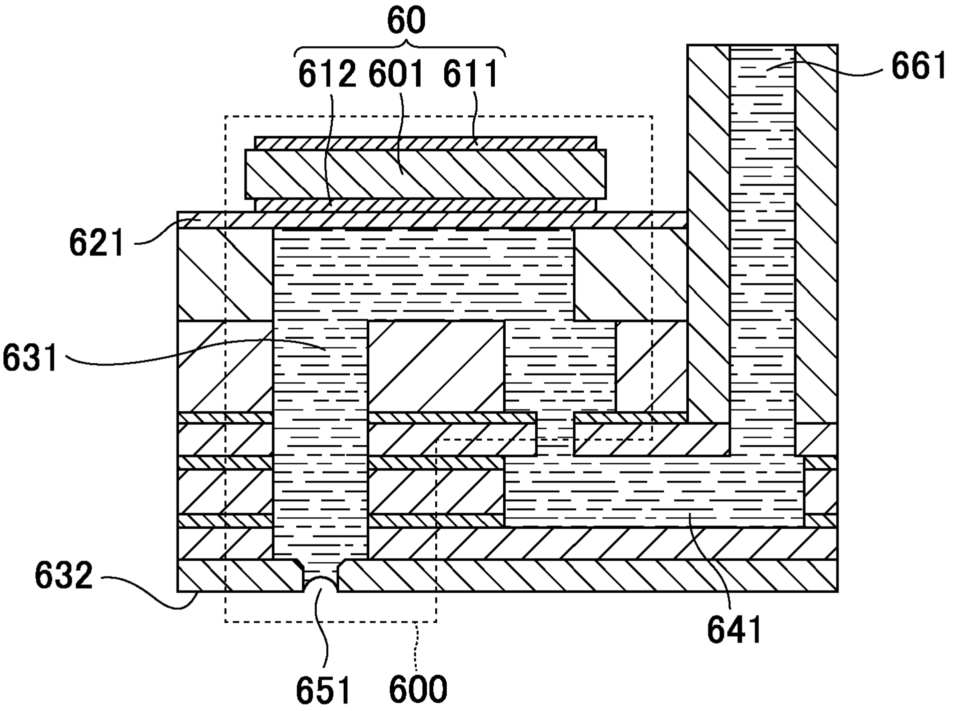
FIG. 15 is a view illustrating an example of a configuration of a discharge section of a discharge module.

Here, the structure of the discharge section 600 including the nozzle 651 will be described. FIG. 15 is a view illustrating an example of a configuration of the discharge section 600 of the discharge module 32. FIG. 15 illustrates a nozzle plate 632, a reservoir 641, and a supply port 661 in addition to the discharge section 600.

As illustrated in FIG. 15, the discharge section 600 includes the piezoelectric element 60, a vibrating plate 621, a cavity 631, and the nozzle 651. The piezoelectric element 60 includes a piezoelectric body 601 and electrodes 611 and 612. The piezoelectric element 60 is configured such that the electrodes 611 and 612 are positioned to interpose the piezoelectric body 601. The piezoelectric element 60 is driven such that the center part is displaced in the up-down direction according to the potential difference between the voltage supplied to the electrode 611 and the voltage supplied to the electrode 612. Specifically, the driving signal VOUT based on the driving signal COM is supplied to the electrode 611, and the reference voltage signal VBS is supplied to the electrode 612. When the voltage value of the driving signal VOUT supplied to the electrode 611 changes, the potential difference between the driving signal VOUT supplied to the electrode 611 and the reference voltage signal VBS supplied to the electrode 612 changes, and the piezoelectric element 60 is driven such that the center part is displaced in the up-down direction.

The vibrating plate 621 is positioned below the piezoelectric element 60 in FIG. 15. In other words, the piezoelectric element 60 is formed on the upper surface of the vibrating plate 621 in FIG. 15. The vibrating plate 621 is displaced in the up-down direction as the piezoelectric element 60 is driven in the up-down direction.

The cavity 631 is positioned below the vibrating plate 621 in FIG. 15. Ink is supplied to the cavity 631 from the reservoir 641. Ink stored in a liquid container 9 is introduced into the reservoir 641 via the supply port 661. In other words, the inside of the cavity 631 is filled with the ink stored in the liquid container 9. The internal volume of the cavity 631 expands or contracts as the vibrating plate 621 is displaced in the up-down direction. That is, the vibrating plate 621 functions as a diaphragm that changes the internal volume of the cavity 631, and the cavity 631 functions as a pressure chamber of which the internal pressure changes as the vibrating plate 621 is displaced in the up-down direction.

The nozzle 651 is an opening provided on the nozzle plate 632 and communicates with the cavity 631. When the internal volume of the cavity 631 changes, the ink filled the inside of the cavity 631 is discharged from the nozzle 651 according to the change in the internal volume.

In the discharge section 600 configured as described above, when the piezoelectric element 60 is driven to bend in the upward direction, the vibrating plate 621 is displaced in the upward direction. Accordingly, the internal volume of the cavity 631 expands, and as a result, the ink stored in the reservoir 641 is drawn into the cavity 631. On the other hand, when the piezoelectric element 60 is driven to bend in the downward direction, the vibrating plate 621 is displaced in the downward direction. Accordingly, the internal volume of the cavity 631 contracts, and as a result, the ink having an amount corresponding to the degree of contraction of the internal volume of the cavity 631 is discharged from the nozzles 651. That is, an amount of ink corresponding to the voltage value of the driving signal VOUT is discharged from each of the plurality of discharge sections 600 included in the discharge module 32 of the print head 30.

The piezoelectric element 60 may be driven by being supplied with the driving signal VOUT corresponding to the driving signal COM, and may not be limited to the structure illustrated in FIG. 15 as long as ink can be discharged from the nozzles 651 when the piezoelectric element 60 is driven.

As described above, the print head 30 includes the discharge modules 32-1 to 32-4 and the connector CN1*b* that is electrically coupled to the drive circuit module 50. The discharge module 32-1 includes the discharge section 600 having the piezoelectric element 60 that receives and displaces the driving signal VOUT where the voltage value based on the driving signals COMA1 and COMB1 supplied to the electrode 611 changes, and the reference voltage signal VBS where the voltage value supplied to the electrode 612 is constant, and discharges a liquid by the displacement of the piezoelectric element 60. The discharge module 32-2 includes the discharge section 600 having the piezoelectric element 60 that receives and displaces the driving signal VOUT where the voltage value based on the driving signals COMA2 and COMB2 supplied to the electrode 611 changes, and the reference voltage signal VBS where the voltage value supplied to the electrode 612 is constant, and discharges a liquid by the displacement of the piezoelectric element 60. The discharge module 32-3 includes the discharge section 600 having the piezoelectric element 60 that receives and displaces the driving signal VOUT where the voltage value based on the driving signals COMA3 and COMB3 supplied to the electrode 611 changes, and the reference voltage signal VBS where the voltage value supplied to the electrode 612 is constant, and discharges a liquid by the displacement of the piezoelectric element 60. The discharge module 32-4 includes the discharge section 600 having the piezoelectric element 60 that receives and displaces the driving signal VOUT where the voltage value based on the driving signals COMA4 and COMB4 supplied to the electrode 611 changes, and the reference voltage signal VBS where the voltage value supplied to the electrode 612 is constant, and discharges a liquid by the displacement of the piezoelectric element 60.

2.2.3 Structure of Drive Circuit Module Included in Liquid Discharge Module

Next, the structure of the drive circuit module 50 included in the liquid discharge module 20 will be described. As illustrated in FIG. 12, the drive circuit module 50 includes the relay substrate 150, the drive circuit substrate 700, the opening plate 160, the heat sinks 170 and 180, and the heat conductive members 175 and 185.

2.2.3.1 Structure of Drive Circuit Substrate

Figure 16:
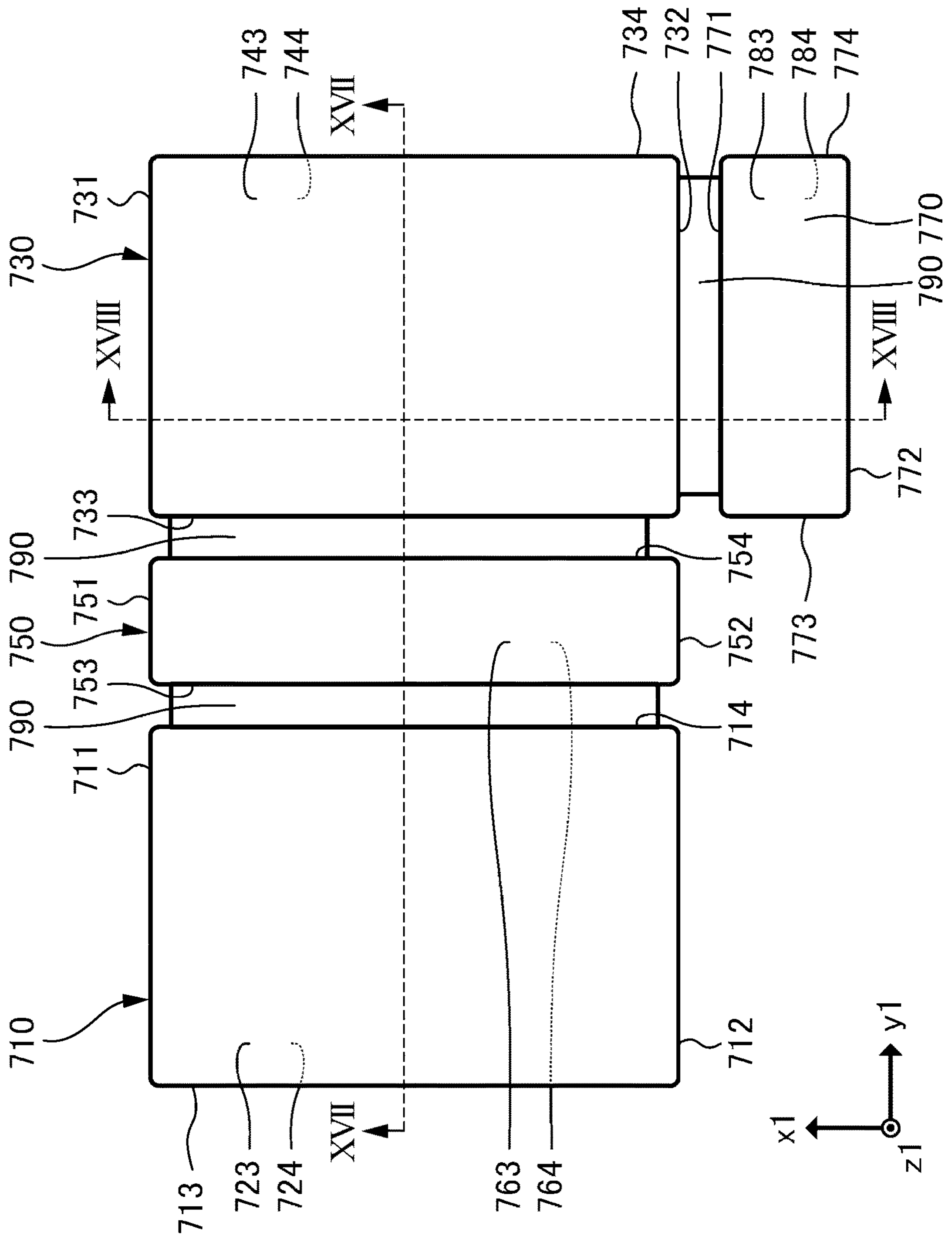
FIG. 16 is a view illustrating a planar structure of a drive circuit substrate.

First, the structure of the drive circuit substrate 700 will be described. FIG. 16 is a view illustrating a planar structure of the drive circuit substrate 700. Here, in the following description, the x1 axis, the y1 axis, and the z1 axis, which are axes independent of the above-described X axis, the Y axis, and the Z axis and are orthogonal to each other, will be illustrated and described. Further, in the following description, the starting point side of the arrow along the x1 axis in the drawing may be referred to as the −x1 side, and the tip end side thereof may be referred to as the +x1 side. The starting point side of the arrow along the y1 axis in the drawing may be referred to as the −y1 side, and the tip end side thereof may be referred to as the +y1 side. The starting point side of the arrow along the z1 axis in the drawing may be referred to as the −z1 side, and the tip end side thereof may be referred to as the +z1 side. Further, the plane composed of the x1 axis and the y1 axis may be referred to as the x1y1 plane, the plane composed of the x1 axis and z1 axis may be referred to as the x1z1 plane, and the plane composed of the y1 axis and the z1 axis may be referred to as the y1z1 plane.

As described above, the drive circuit substrate 700 has rigid wiring members 710, 730, 750, and 770. The rigid wiring members 710, 730, and 750 are positioned side by side in the order of the rigid wiring member 710, the rigid wiring member 750, and the rigid wiring member 730 along the y1 axis from the −y1 side to the +y1 side. Further, the rigid wiring member 770 is positioned on the −x1 side of the rigid wiring members 710, 750, and 730 positioned side by side, specifically, on the −x1 side of the rigid wiring member 730.

The rigid wiring member 710 includes a surface 723 on the +z1 side, a surface 724 on the −z1 side, sides 711 and 712, and sides 713 and 714 longer than the sides 711 and 712. In a state where the sides 711 and 712 extend along the y1 axis and face each other in the direction along the x1 axis, the side 711 is positioned on the +x1 side and the side 712 is positioned on the −x1 side. Further, in a state where the sides 713 and 714 intersect both the sides 711 and 712, extend along the x1 axis, and face each other in the direction along the y1 axis, the side 713 is positioned on the −y1 side, and the side 714 is positioned on the +y1 side. That is, the rigid wiring member 710 includes the side 711 and the side 712 positioned facing each other, the side 713 and the side 714 intersecting the side 711 and the side 712 and positioned facing each other, and the surface 723. In other words, the rigid wiring member 710 is a substantially rectangular plate-shaped member that includes the surface 723, the surface 724 opposite to the surface 723, and the side 711, and extends along the x1y1 plane.

The rigid wiring member 730 includes a surface 743 on the +z1 side, a surface 744 on the −z1 side, sides 731 and 732, and sides 733 and 734 longer than the sides 731 and 732, and is positioned on the +y1 side of the rigid wiring member 710. In a state where the sides 731 and 732 extend along the y1 axis and face each other in the direction along the x1 axis, the side 731 is positioned on the +x1 side and the side 732 is positioned on the −x1 side. Further, in a state where the sides 733 and 734 intersect both the sides 731 and 732, extend along the x1 axis, and face each other in the direction along the y1 axis, the side 733 is positioned on the −y1 side, and the side 734 is positioned on the +y1 side. That is, the rigid wiring member 730 includes the side 731 and the side 732 positioned facing each other, the side 733 and the side 734 intersecting the side 731 and the side 732 and positioned facing each other, and the surface 743. In other words, the rigid wiring member 730 is a substantially rectangular plate-shaped member that includes the surface 743, the surface 744 opposite to the surface 743, and the side 731, and extends along the x1y1 plane.

The rigid wiring member 750 includes a surface 763 on the +z1 side, a surface 764 on the −z1 side, sides 751 and 752, and sides 753 and 754 longer than the sides 751 and 752, and is positioned between the rigid wiring member 710 and the rigid wiring member 730 in the direction along the y1 axis. In a state where the sides 751 and 752 extend along the y1 axis and face each other in the direction along the x1 axis, the side 751 is positioned on the +x1 side and the side 752 is positioned on the −x1 side. Further, in a state where the sides 753 and 754 intersect both the sides 751 and 752, extend along the x1 axis, and face each other in the direction along the y1 axis, the side 753 is positioned on the −y1 side, and the side 754 is positioned on the +y1 side. That is, the rigid wiring member 750 includes the side 751 and the side 752 positioned facing each other, the side 753 and the side 754 intersecting the side 751 and the side 752 and positioned facing each other, and the surface 763. In other words, the rigid wiring member 750 is a substantially rectangular plate-shaped member that includes the surface 763, the surface 764 opposite to the surface 763, and the side 751, and extends along the x1y1 plane.

The rigid wiring member 770 includes a surface 783 on the +z1 side, a surface 784 on the −z1 side, sides 771 and 772, and sides 773 and 774 shorter than the sides 771 and 772, and is positioned on the −x1 side of the rigid wiring member 730 in the direction along the x1 axis. In a state where the sides 771 and 772 extend along the y1 axis and face each other in the direction along the x1 axis, the side 771 is positioned on the +x1 side and the side 772 is positioned on the −x1 side. Further, in a state where the sides 773 and 774 intersect both the sides 771 and 772, extend along the x1 axis, and face each other in the direction along the y1 axis, the side 773 is positioned on the −y1 side, and the side 774 is positioned on the +y1 side. That is, the rigid wiring member 770 includes the side 771 and the side 772 positioned facing each other, the side 773 and the side 774 intersecting the side 771 and the side 772 and positioned facing each other, and the surface 783. In other words, the rigid wiring member 770 is a substantially rectangular plate-shaped member that includes the surface 783, the surface 784 opposite to the surface 783, and the side 771, and extends along the x1y1 plane.

Each of such rigid wiring members 710, 730, 750, and 770 configures a so-called multi-layer rigid substrate including a base material in which a plurality of hard composite materials such as glass and epoxy are laminated in the direction along the z1 axis, and a plurality of wiring layers in which a wiring pattern positioned between the layers of the base material and propagating various signals are formed.

Here, as illustrated in FIG. 16, in the drive circuit substrate 700, the side 711, the side 731, and the side 751 are positioned substantially linearly along the y1 axis, and the side 712, the side 732, and the side 752 are positioned substantially linearly along the y1 axis. That is, the lengths of the sides 713 and 714 included in the rigid wiring member 710 along the x1 axis, the lengths of the sides 733 and 734 included in the rigid wiring member 730 along the x1 axis, and the lengths of the sides 753 and 754 included in the rigid wiring member 750 along the x1 axis are substantially equal. Further, the lengths of the sides 711 and 712 in the direction along the y1 axis and the lengths of the sides 731 and 732 in the direction along the y1 axis are substantially equal. The lengths of the sides 751 and 752 in the direction along the y1 axis are shorter than the lengths of the sides 711 and 712 in the direction along the y1 axis and the lengths of the sides 731 and 732 included in the rigid wiring member 730 in the direction along the y1 axis. That is, the size of the rigid wiring member 710 when the drive circuit substrate 700 is viewed along the z1 axis is substantially equal to the size of the rigid wiring member 730 when the drive circuit substrate 700 is viewed along the z1 axis. The size of the rigid wiring member 750 when the drive circuit substrate 700 is viewed along the z1 axis is smaller than the size of the rigid wiring member 710 when the drive circuit substrate 700 is viewed along the z1 axis, and the size of the rigid wiring member 730 when the drive circuit substrate 700 is viewed along the z1 axis.

Further, in the drive circuit substrate 700, the side 733 and the side 773 are positioned substantially linearly along the x1 axis, and the side 734 and the side 774 are positioned substantially linearly along the x1 axis. That is, the lengths of the sides 731 and 732 included in the rigid wiring member 730 along the y1 axis and the lengths of the sides 771 and 772 included in the rigid wiring member 770 along the y1 axis are substantially equal. Further, the lengths of the sides 773 and 774 in the direction along the x1 axis are shorter than the lengths of the sides 733 and 734 in the direction along the x1 axis, and are substantially equal to the lengths of the sides 751 and 752 in the direction along the y1 axis. That is, the size of the rigid wiring member 770 when the drive circuit substrate 700 is viewed along the z1 axis is smaller than the sizes of the rigid wiring members 710, 730, and 750. That is, the size of the rigid wiring member 770 when the drive circuit substrate 700 is viewed along the z1 axis is smaller than the size of the rigid wiring member 710 when the drive circuit substrate 700 is viewed along the z1 axis, and is smaller than the size of the rigid wiring member 730 when the drive circuit substrate 700 is viewed along the z1 axis.

The rigid wiring members 710, 730, 750, and 770 configured as described above are electrically coupled to each other by a flexible wiring member 790. That is, the rigid wiring members 710, 730, 750, and 770 are electrically coupled to each other. Therefore, the arrangement of the rigid wiring members 710, 730, 750, and 770 and the flexible wiring member 790 that electrically couples the rigid wiring members 710, 730, 750, and 770 will be described.

Figure 17:
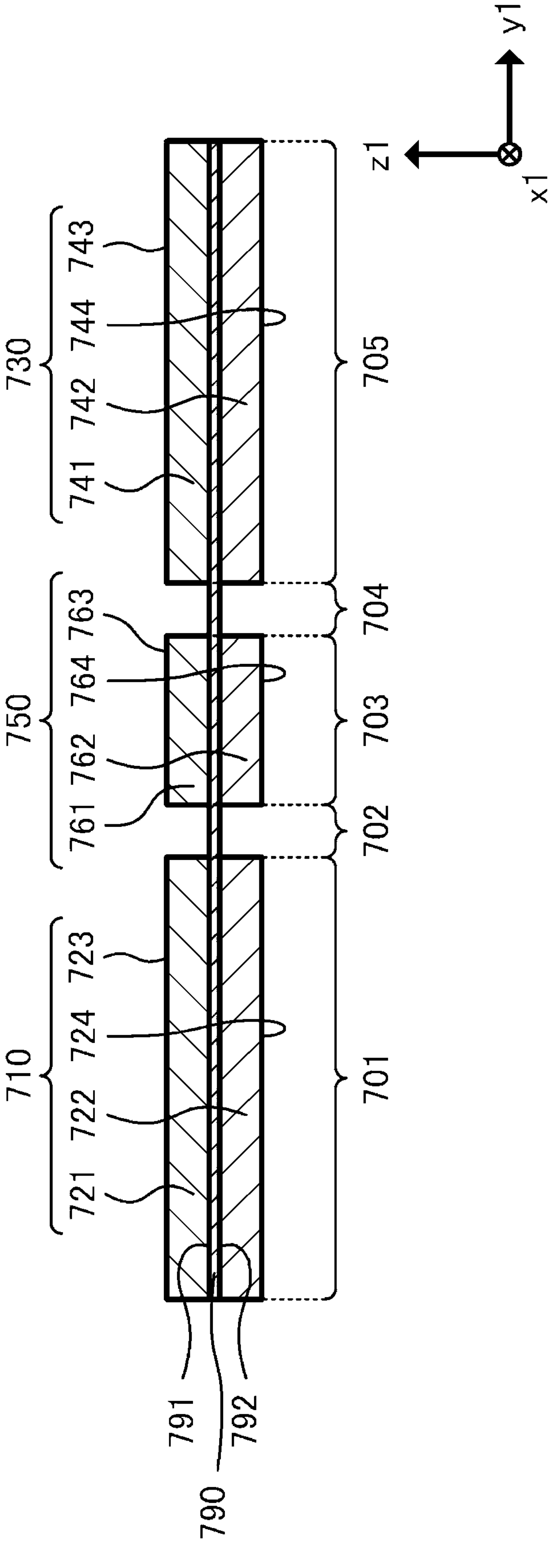
FIG. 17 is a cross-sectional view when the drive circuit substrate is cut along the line XVII-XVII illustrated in FIG. 16.
Figure 18:
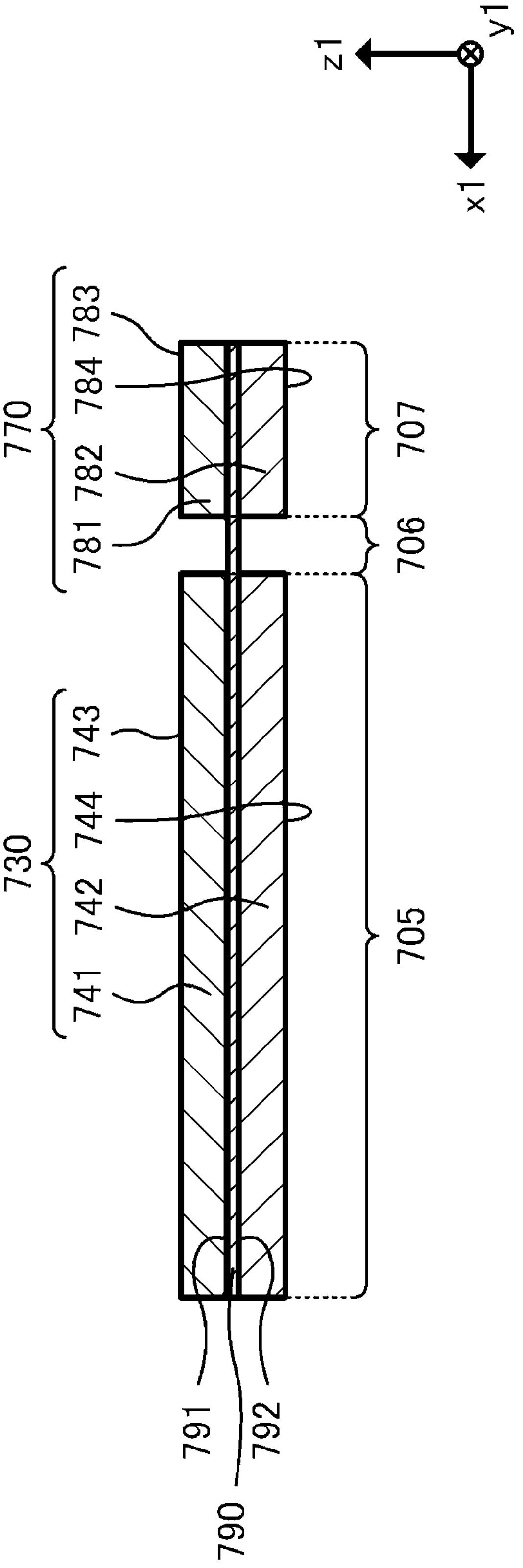
FIG. 18 is a cross-sectional view when the drive circuit substrate is cut along the line XVIII-XVIII illustrated in FIG. 16.

FIG. 17 is a cross-sectional view when the drive circuit substrate 700 is cut along the line XVII-XVII illustrated in FIG. 16. FIG. 18 is a cross-sectional view when the drive circuit substrate 700 is cut along the line XVIII-XVIII illustrated in FIG. 16.

Here, in the following description, the flexible wiring member 790 will be divided into seven regions 701 to 707 as illustrated in FIGS. 17 and 18 for the description. Further, as illustrated in FIGS. 17 and 18, the flexible wiring member 790 includes a surface 791 on the +z1 side and a surface 792 on the −z1 side. That is, the flexible wiring member 790 will be described as including the surface 791, the surface 792 opposite to the surface 791, and the regions 701 to 707.

As illustrated in FIG. 17, the regions 701 to 705 of the flexible wiring member 790 are positioned side by side along the y1 axis from the −y1 side to the +y1 side in the order of the region 701, the region 702, the region 703, the region 704, and the region 705. That is, the region 702 is positioned between the region 701 and the region 703, the region 704 is positioned between the region 703 and the region 705, and therefore the region 702, 703, and 704 is positioned between the region 701 and the region 705.

The rigid member 721 which is a part of the rigid wiring member 710 is laminated on the surface 791 of the region 701, and the rigid member 722 which is a different part of the rigid wiring member 710 is laminated on the surface 792 of the region 701. That is, the rigid wiring member 710 includes the rigid member 721 and the rigid member 722. The rigid member 721 includes the surface 723 corresponding to the front surface of the rigid wiring member 710 on the +z1 side. The rigid member 721 is laminated on the surface 791 of the region 701 of the flexible wiring member 790 such that the surface 723 extends along the surface 791 of the flexible wiring member 790. Further, the rigid member 722 includes the surface 724 corresponding to the front surface of the rigid wiring member 710 on the −z1 side. The rigid member 722 is laminated on the surface 792 of the region 701 of the flexible wiring member 790 such that the surface 724 extends along the surface 792 of the flexible wiring member 790.

The rigid member 761 which is a part of the rigid wiring member 750 is laminated on the surface 791 of the region 703, and the rigid member 762 which is a different part of the rigid wiring member 750 is laminated on the surface 792 of the region 703. That is, the rigid wiring member 750 includes the rigid member 761 and the rigid member 762. The rigid member 761 includes the surface 763 corresponding to the front surface of the rigid wiring member 750 on the +z1 side. The rigid member 761 is laminated on the surface 791 of the region 703 of the flexible wiring member 790 such that the surface 763 extends along the surface 791 of the flexible wiring member 790. The rigid member 762 includes the surface 764 corresponding to the front surface of the rigid wiring member 750 on the −z1 side. The rigid member 762 is laminated on the surface 792 of the region 703 of the flexible wiring member 790 such that the surface 764 extends along the surface 792 of the flexible wiring member 790.

The rigid member 741 which is a part of the rigid wiring member 730 is laminated on the surface 791 of the region 705, and the rigid member 742 which is a different part of the rigid wiring member 730 is laminated on the surface 792 of the region 705. That is, the rigid wiring member 730 includes the rigid member 741 and the rigid member 742. The rigid member 741 includes the surface 743 corresponding to the front surface of the rigid wiring member 730 on the +z1 side. The rigid member 741 is laminated on the surface 791 of the region 705 of the flexible wiring member 790 such that the surface 743 extends along the surface 791 of the flexible wiring member 790. The rigid member 742 includes the surface 744 corresponding to the front surface of the rigid wiring member 730 on the −z1 side. The rigid member 742 is laminated on the surface 792 of the region 705 of the flexible wiring member 790 such that the surface 744 extends along the surface 792 of the flexible wiring member 790.

A hard composite material such as glass or epoxy is not provided in the region 702 and the region 704. That is, the region 702 is a region positioned between the rigid wiring member 710 and the rigid wiring member 750 for separating the rigid wiring member 710 and the rigid wiring member 750. The region 704 is a region positioned between the rigid wiring member 750 and the rigid wiring member 730 for separating the rigid wiring member 750 and the rigid wiring member 730.

Further, as illustrated in FIG. 18, the regions 705 to 707 of the flexible wiring member 790 are positioned side by side along the x1 axis from the +x1 side to the −x1 side in the order of the region 705, the region 706, and the region 707. That is, the region 706 is positioned between the regions 705 and the region 707, and between the regions 701, 702, 703, 704, and 705 and the region 707.

The rigid member 781 which is a part of the rigid wiring member 770 is laminated on the surface 791 of the region 707, and the rigid member 782 which is a different part of the rigid wiring member 770 is laminated on the surface 792 of the region 707. That is, the rigid wiring member 770 includes the rigid member 781 and the rigid member 782. The rigid member 781 includes the surface 783 corresponding to the front surface of the rigid wiring member 770 on the +z1 side. The rigid member 781 is laminated on the surface 791 of the region 707 of the flexible wiring member 790 such that the surface 783 extends along the surface 791 of the flexible wiring member 790. The rigid member 782 includes the surface 784 corresponding to the front surface of the rigid wiring member 770 on the −z1 side. The rigid member 782 is laminated on the surface 792 of the region 707 of the flexible wiring member 790 such that the surface 784 extends along the surface 792 of the flexible wiring member 790.

Similar to the regions 702 and 704, the region 706 is not provided with a hard composite material such as glass or epoxy. That is, the region 706 is a region positioned between the rigid wiring member 730 and the rigid wiring member 770 for separating the rigid wiring member 730 and the rigid wiring member 770.

In the drive circuit substrate 700 configured as described above, the flexible wiring member 790 configures at least one of the wiring layers of each of the rigid wiring members 710, 730, 750, and 770. As a result, the flexible wiring member 790 electrically couples each of the rigid wiring members 710, 730, 750, and 770, and propagates the signals generated by each of the rigid wiring members 710, 730, 750, and 770. That is, the flexible wiring member 790 includes at least one layer among the plurality of wiring layers included in the rigid wiring member 710, at least one layer among the plurality of wiring layers included in the rigid wiring member 730, at least one layer among the plurality of wiring layers included in the rigid wiring member 750, and at least one layer among the plurality of wiring layers included in the rigid wiring member 770, and accordingly each of the rigid wiring members 710, 730, 750, and 770 are electrically coupled. The flexible wiring member 790 is a so-called flexible substrate having flexibility, which includes one or a plurality of wiring layers in which wiring patterns through which various signals propagate are formed on a base material in which one or a plurality of plastic films, polyimides, and the like are laminated.

That is, the drive circuit substrate 700 is a so-called rigid flexible substrate including, as a plurality of rigid substrates, a plurality of rigid substrates, which are rigid wiring members 710, 730, 750, and 770, and includes the rigid members 721, 722, 741, 742, 761, 762, 781, and 782; and the flexible wiring member 790 as a flexible substrate more flexible than the rigid wiring members 710, 730, 750, and 770.

In the liquid discharge apparatus 1 of the present embodiment, the drive circuit substrate 700 described above has a substantially box shape and is electrically coupled to the print head 30. As a result, the mounting area of the drive circuit substrate 700 in the liquid discharge apparatus 1 is reduced, the drive circuit substrates 700 can be densely arranged, and as a result, the size of the liquid discharge apparatus 1 is reduced.

Figure 19:
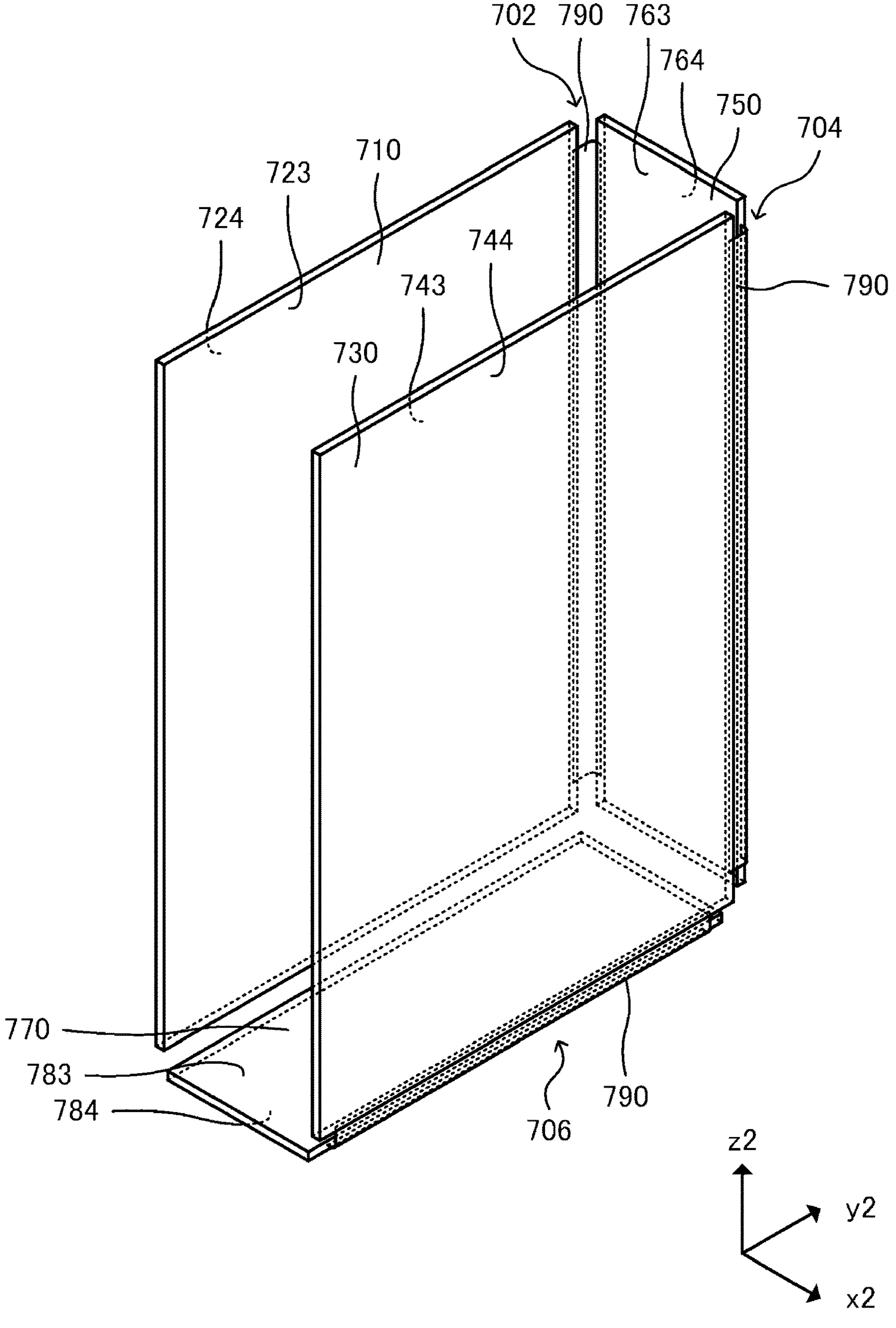
FIG. 19 is a view illustrating an example of a structure of the drive circuit substrate having a substantially box shape.

FIG. 19 is a view illustrating an example of a structure of the drive circuit substrate 700 having a substantially box shape. As illustrated in FIG. 19, in the drive circuit substrate 700, when the flexible wiring member 790 is bent, each of the rigid wiring members 710, 730, 750, and 770 configures one surface of the drive circuit substrate 700 having a substantially box shape.

Specifically, the region 702 of the flexible wiring member 790 is bent at a substantially right angle such that the surface 723 of the rigid wiring member 710 and the surface 763 of the rigid wiring member 750 configure the inner surface of the drive circuit substrate 700 having a substantially box shape, and the surface 724 of the rigid wiring member 710 and the surface 764 of the rigid wiring member 750 configure the outer surface of the drive circuit substrate 700 having a substantially box shape. Further, the region 704 of the flexible wiring member 790 is bent at a substantially right angle such that the surface 763 of the rigid wiring member 750 and the surface 743 of the rigid wiring member 730 configure the inner surface of the drive circuit substrate 700 having a substantially box shape, and the surface 764 of the rigid wiring member 750 and the surface 744 of the rigid wiring member 730 configure the outer surface of the drive circuit substrate 700 having a substantially box shape. Further, the region 706 of the flexible wiring member 790 is bent at a substantially right angle such that the surface 743 of the rigid wiring member 730 and the surface 783 of the rigid wiring member 770 configure the inner surface of the drive circuit substrate 700 having a substantially box shape, and the surface 744 of the rigid wiring member 730 and the surface 784 of the rigid wiring member 770 configure the outer surface of the drive circuit substrate 700 having a substantially box shape.

That is, in the drive circuit substrate 700 having a substantially box shape in the liquid discharge apparatus 1 of the present embodiment, the surface 723 of the rigid wiring member 710, the surface 763 of the rigid wiring member 750, the surface 743 of the rigid wiring member 730, and the surface 783 of the rigid wiring member 770 configure the inner surface of the substantially box shape, and the surface 724 of the rigid wiring member 710, the surface 764 of the rigid wiring member 750, the surface 744 of the rigid wiring member 730, and the surface 784 of the rigid wiring member 770 configure the outer surface of the substantially box shape. At this time, the rigid wiring member 710 and the rigid wiring member 730 are positioned such that the surface 723 of the rigid wiring member 710 and the surface 743 of the rigid wiring member 730 face each other when the flexible wiring member 790 is bent in the regions 702 and 704. The rigid wiring member 750 is positioned such that the normal direction of the surface 763 of the rigid wiring member 750 intersects both the normal direction of the surface 723 of the rigid wiring member 710 and the normal direction of the surface 743 of the rigid wiring member 730 when the flexible wiring member 790 is bent in the regions 702 and 704. The rigid wiring member 770 is positioned such that the normal direction of the surface 783 of the rigid wiring member 770 intersects both the normal direction of the surface 723 of the rigid wiring member 710 and the normal direction of the surface 743 of the rigid wiring member 730 when the flexible wiring member 790 is bent in the region 706.

That is, the rigid member 721 and the rigid member 741 are positioned such that the surface 723 of the rigid member 721 and the surface 743 of the rigid member 741 face each other when the flexible wiring member 790 is bent in the regions 702 and 704. The rigid member 761 is positioned such that the normal direction of the surface 763 of the rigid member 761 intersects both the normal direction of the surface 723 of the rigid member 721 and the normal direction of the surface 743 of the rigid member 741 when the flexible wiring member 790 is bent in the regions 702 and 704. The rigid member 781 is positioned such that the normal direction of the surface 783 of the rigid member 781 intersects both the normal direction of the surface 723 of the rigid member 721 and the normal direction of the surface 743 of the rigid member 741 when the flexible wiring member 790 is bent in the region 706.

It should be noted that the fact that the drive circuit substrate 700 has a substantially box shape is not limited to a case where all the surfaces of the substantially box shape are configured with a rigid substrate of the rigid flexible substrate. That is, the shape formed by the drive circuit substrate 700 may be regarded as a box shape, and one or a plurality of surfaces may be open as illustrated in FIG. 19.

Here, in the following description, the drive circuit substrate 700 having a substantially box shape is used for the description, the x2 axis, the y2 axis, and the z2 axis which are axes independent of the above-described the x1 axis, the y1 axis, and the z1 axis and are orthogonal to each other will be illustrated and described. Further, in the following description, the starting point side of the arrow along the x2 axis in the drawing may be referred to as the −x2 side, and the tip end side thereof may be referred to as the +x2 side. The starting point side of the arrow along the y2 axis in the drawing may be referred to as the −y2 side, and the tip end side thereof may be referred to as the +y2 side. The starting point side of the arrow along the z2 axis in the drawing may be referred to as the −z2 side, and the tip end side thereof may be referred to as the +z2 side. The plane composed of the x2 axis and the y2 axis may be referred to as the x2y2 plane. The plane composed of the x2 axis and z2 axis may be referred to as the x2z2 plane. The plane composed of the y2 axis and the z2 axis may be referred to as the y2z2 plane. Here, in the drive circuit substrate 700 having a substantially box shape, the surface 723 of the rigid member 721 and the surface 743 of the rigid member 741 are positioned facing each other along the x2 axis, the normal direction of the surface 723 of the rigid member 721 is the direction from the −x2 side to the +x2 side along the x2 axis, the normal direction of the surface 743 of the rigid member 741 is the direction from the +x2 side to the −x2 side along the x2 axis, the normal direction of the surface 763 of the rigid member 761 is the direction from the +y2 side to the −y2 side along the y2 axis, and the normal direction of the surface 783 of the rigid member 781 is the direction from the −z2 side to the +z2 side along the z2 axis.

Further, in the following description, the drive circuit substrate 700 in an expanded state as illustrated in FIGS. 16, 17, and 18 may be referred to as the drive circuit substrate 700 in an expanded state, and the drive circuit substrate 700 assembled in a substantially box shape as illustrated in FIG. 19 may be referred to as the drive circuit substrate 700 in an assembled state.

2.2.3.2 Component Arrangement on Drive Circuit Substrate

Figure 20:
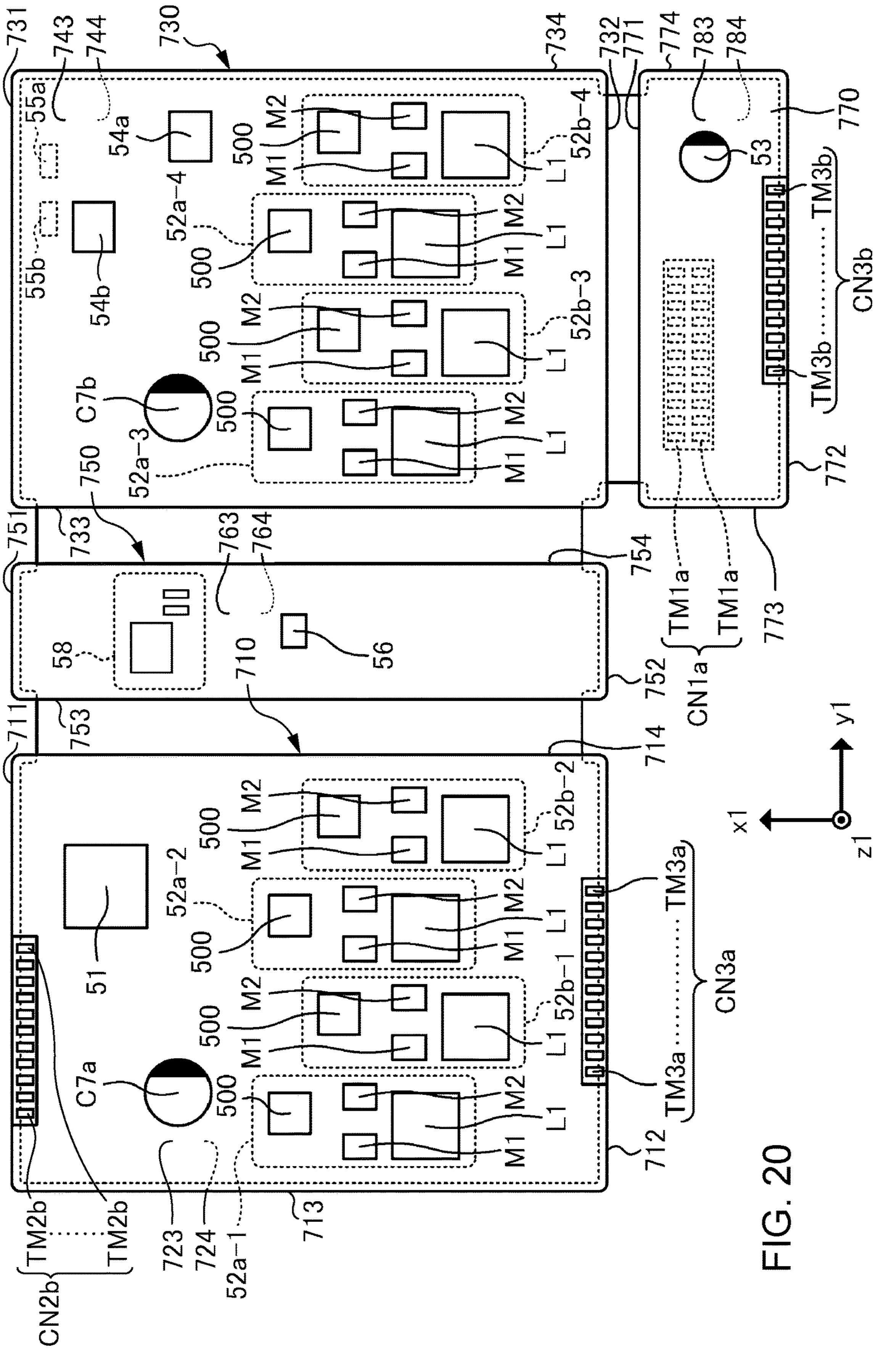
FIG. 20 is a diagram illustrating an example of component arrangement in the drive circuit substrate in an expanded state.

Next, component arrangement of electronic components that configure various circuits on the drive circuit substrate 700 will be described. FIG. 20 is a diagram illustrating an example of component arrangement in the drive circuit substrate 700 in an expanded state.

As illustrated in FIG. 20, the rigid wiring member 710 includes a plurality of circuit components including the driving signal output circuits 52*a*-1, 52*b*-1, 52*a*-2, and 52*b*-2, the discharge control circuit 51 configured with the FPGA, a capacitor C7*a*, and the connectors CN2*b* and CN3*a*.

The driving signal output circuit 52*a*-1 includes the integrated circuit 500, the transistors M1 and M2, and the inductor L1, and is provided on the surface 723 of the rigid wiring member 710 of the drive circuit substrate 700. At this time, the transistors M1 and M2 included in the driving signal output circuit 52*a*-1 are positioned side by side in the order of the transistor M1 and the transistor M2 along the direction from the side 713 to the side 714, the integrated circuit 500 included in the driving signal output circuit 52*a*-1 is positioned on the side 711 side of the transistors M1 and M2 positioned side by side, and the inductor L1 included in the driving signal output circuit 52*a*-1 is positioned on the side 712 side of the transistors M1 and M2 positioned side by side.

The driving signal output circuit 52*b*-1 includes the integrated circuit 500, the transistors M1 and M2, and the inductor L1, and is provided on the side 714 side of the driving signal output circuit 52*a*-1 on the surface 723 of the rigid wiring member 710 of the drive circuit substrate 700. At this time, the transistors M1 and M2 included in the driving signal output circuit 52*b*-1 are positioned side by side in the order of the transistor M1 and the transistor M2 along the direction from the side 713 to the side 714, the integrated circuit 500 included in the driving signal output circuit 52*b*-1 is positioned on the side 711 side of the transistors M1 and M2 positioned side by side, and the inductor L1 included in the driving signal output circuit 52*b*-1 is positioned on the side 712 side of the transistors M1 and M2 positioned side by side.

The driving signal output circuit 52*a*-2 includes the integrated circuit 500, the transistors M1 and M2, and the inductor L1, and is provided on the side 714 side of the driving signal output circuit 52*b*-1 on the surface 723 of the rigid wiring member 710 of the drive circuit substrate 700. At this time, the transistors M1 and M2 included in the driving signal output circuit 52*a*-2 are positioned side by side in the order of the transistor M1 and the transistor M2 along the direction from the side 713 to the side 714, the integrated circuit 500 included in the driving signal output circuit 52*a*-2 is positioned on the side 711 side of the transistors M1 and M2 positioned side by side, and the inductor L1 included in the driving signal output circuit 52*a*-2 is positioned on the side 712 side of the transistors M1 and M2 positioned side by side.

The driving signal output circuit 52*b*-2 includes the integrated circuit 500, the transistors M1 and M2, and the inductor L1, and is provided on the side 714 side of the driving signal output circuit 52*a*-2 on the surface 723 of the rigid wiring member 710 of the drive circuit substrate 700. At this time, the transistors M1 and M2 included in the driving signal output circuit 52*b*-2 are positioned side by side in the order of the transistor M1 and the transistor M2 along the direction from the side 713 to the side 714, the integrated circuit 500 included in the driving signal output circuit 52*b*-2 is positioned on the side 711 side of the transistors M1 and M2 positioned side by side, and the inductor L1 included in the driving signal output circuit 52*b*-2 is positioned on the side 712 side of the transistors M1 and M2 positioned side by side.

That is, the integrated circuit 500, the transistors M1 and M2, and the inductor L1 included in the driving signal output circuit 52*a*-1 are provided on the surface 723 to be arranged in the order of the integrated circuit 500, the transistors M1 and M2, and the inductor L1 along the direction from the side 711 to the side 712. The integrated circuit 500, the transistors M1 and M2, and the inductor L1 included in the driving signal output circuit 52*b*-1 are provided on the surface 723 to be arranged in the order of the integrated circuit 500, the transistors M1 and M2, and the inductor L1 along the direction from the side 711 to the side 712. The integrated circuit 500, the transistors M1 and M2, and the inductor L1 included in the driving signal output circuit 52*a*-2 are provided on the surface 723 to be arranged in the order of the integrated circuit 500, the transistors M1 and M2, and the inductor L1 along the direction from the side 711 to the side 712. The integrated circuit 500, the transistors M1 and M2, and the inductor L1 included in the driving signal output circuit 52*b*-2 are provided on the surface 723 to be arranged in the order of the integrated circuit 500, the transistors M1 and M2, and the inductor L1 along the direction from the side 711 to the side 712.

The driving signal output circuits 52*a*-1, 52*a*-2, 52*b*-1, and 52*b*-2 are positioned to be directed from the side 713 to the side 714 on the surface 723 of the rigid wiring member 710 of the drive circuit substrate 700, and to be arranged adjacent to each other in the order of the driving signal output circuit 52*a*-1, the driving signal output circuit 52*b*-1, the driving signal output circuit 52*a*-2, and the driving signal output circuit 52*b*-2.

In this case, all the electronic components that configure the driving signal output circuits 52*a*-1, 52*a*-2, 52*b*-1, and 52*b*-2 are provided on the surface 723 of the rigid wiring member 710. In this case, the electronic components that configure the driving signal output circuits 52*a*-1, 52*a*-2, 52*b*-1, and 52*b*-2 are not provided on the surface 724 of the rigid wiring member 710.

Further, the driving signal output circuits 52*a*-1, 52*b*-1, 52*a*-2, and 52*b*-2 are arranged in a staggered manner from the side 713 to the side 714. Specifically, in the direction from the side 711 to the side 712, the driving signal output circuit 52*a*-1 and the driving signal output circuit 52*a*-2 are arranged at substantially the same position, the driving signal output circuit 52*b*-1 and the driving signal output circuit 52*b*-2 are arranged at substantially the same position, the driving signal output circuit 52*a*-1 and the driving signal output circuits 52*b*-1 and 52*b*-2 are arranged at different positions, and the driving signal output circuit 52*a*-2 and the driving signal output circuits 52*b*-1 and 52*b*-2 are arranged at different positions.

Specifically, the driving signal output circuit 52*a*-1 is arranged overlapping with at least a part of the driving signal output circuit 52*b*-1, at least a part of the driving signal output circuit 52*a*-2, and at least a part of the driving signal output circuit 52*b*-2, when viewed along the direction from the side 713 to the side 714. The integrated circuit 500 included in the driving signal output circuit 52*a*-1 is arranged not overlapping with the integrated circuit 500 included in the driving signal output circuit 52*b*-1 and the integrated circuit 500 included in the driving signal output circuit 52*b*-2, but overlapping with at least a part of the integrated circuit 500 included in the driving signal output circuit 52*a*-2, when viewed along the direction from the side 713 to the side 714.

In this case, when the transistors M1 and M2 included in the driving signal output circuit 52*a*-1 may be arranged not overlapping with the transistors M1 and M2 included in the driving signal output circuit 52*b*-1 and the transistors M1 and M2 included in the driving signal output circuit 52*b*-2, but overlapping with at least a part of the transistors M1 and M2 included in the driving signal output circuit 52*a*-2, when viewed along the direction from the side 713 to the side 714. Further, when the inductor L1 included in the driving signal output circuit 52*a*-1 may be arranged not overlapping with the inductor L1 included in the driving signal output circuit 52*b*-1 and the inductor L1 included in the driving signal output circuit 52*b*-2, but overlapping with at least a part of the inductor L1 included in the driving signal output circuit 52*a*-2, when viewed along the direction from the side 713 to the side 714.

Similarly, the driving signal output circuit 52*b*-1 is arranged overlapping with at least a part of the driving signal output circuit 52*a*-1, at least a part of the driving signal output circuit 52*a*-2, and at least a part of the driving signal output circuit 52*b*-2, when viewed along the direction from the side 713 to the side 714. The integrated circuit 500 included in the driving signal output circuit 52*b*-1 is arranged not overlapping with the integrated circuit 500 included in the driving signal output circuit 52*a*-1 and the integrated circuit 500 included in the driving signal output circuit 52*a*-2, but overlapping with at least a part of the integrated circuit 500 included in the driving signal output circuit 52*b*-2, when viewed along the direction from the side 713 to the side 714.

In this case, when the transistors M1 and M2 included in the driving signal output circuit 52*b*-1 may be arranged not overlapping with the transistors M1 and M2 included in the driving signal output circuit 52*a*-1 and the transistors M1 and M2 included in the driving signal output circuit 52*a*-2, but overlapping with at least a part of the transistors M1 and M2 included in the driving signal output circuit 52*b*-2, when viewed along the direction from the side 713 to the side 714. Further, when the inductor L1 included in the driving signal output circuit 52*b*-1 may be arranged not overlapping with the inductor L1 included in the driving signal output circuit 52*a*-1 and the inductor L1 included in the driving signal output circuit 52*a*-2, but overlapping with at least a part of the inductor L1 included in the driving signal output circuit 52*b*-2, when viewed along the direction from the side 713 to the side 714.

Here, the fact that the driving signal output circuit 52*a*-1, the driving signal output circuit 52*b*-1, the driving signal output circuit 52*a*-2, and the driving signal output circuit 52*b*-2 are arranged overlapping with each other at least partially when viewed along the direction from the side 713 to the side 714, means that at least one of the electronic components included in the driving signal output circuit 52*a*-1, at least one of the electronic components included in the driving signal output circuit 52*b*-1, at least one of the electronic components included in the driving signal output circuit 52*a*-2, and at least one of the electronic components included in the driving signal output circuit 52*b*-2 overlap with each other when viewed along the direction from the side 713 to the side 714. For example, a case where at least one of the integrated circuit 500, the transistors M1 and M2, and the inductor L1 included in the driving signal output circuit 52*a*-1, at least one of the integrated circuit 500, the transistors M1 and M2, and the inductor L1 included in the driving signal output circuit 52*b*-1, at least one of the integrated circuit 500, the transistors M1 and M2, and the inductor L1 included in the driving signal output circuit 52*a*-2, and at least one of the integrated circuit 500, the transistors M1 and M2, and the inductor L1 included in the driving signal output circuit 52*b*-2 overlap with each other when viewed along the direction from the side 713 to the side 714, is included.

The capacitor C7*a* is positioned on the side 711 side of the driving signal output circuits 52*a*-1, 52*b*-1, 52*a*-2, and 52*b*-2 provided side by side from the side 713 to the side 714 on the surface 723 of the rigid wiring member 710. The capacitor C7*a* corresponds to the above-described capacitor C7 corresponding to the driving signal output circuits 52*a*-1, 52*b*-1, 52*a*-2, and 52*b*-2, the concern that the voltage value of the voltage signal VHV supplied to each of the driving signal output circuits 52*a*-1, 52*b*-1, 52*a*-2, and 52*b*-2 fluctuates is reduced, and the concern that noise is superimposed on the voltage signal VHV is reduced.

The discharge control circuit 51 configured by the FPGA is positioned on the side 711 side of the driving signal output circuits 52*a*-1, 52*b*-1, 52*a*-2, and 52*b*-2 provided side by side from the side 713 to the side 714 and on the side 714 side of the capacitor C7*a*, on the surface 723 of the rigid wiring member 710.

The connector CN2*b* includes a plurality of terminals TM2*b*, and is positioned on the side 711 side of the capacitor C7*a* provided on the surface 723 of the rigid wiring member 710 and the discharge control circuit 51. At this time, the connector CN2*b* is positioned such that the plurality of terminals TM2*b* are arranged in parallel along the side 711 of the rigid wiring member 710.

The connector CN3*a* includes a plurality of terminals TM3*a*, and is positioned on the side 712 side of the capacitor C7*a* provided on the surface 723 of the rigid wiring member 710 and the discharge control circuit 51. At this time, the connector CN3*a* is positioned such that the plurality of terminals TM3*a* are arranged in parallel along the side 712 of the rigid wiring member 710.

The rigid wiring member 730 includes driving signal output circuits 52*a*-3, 52*b*-3, 52*a*-4, and 52*b*-4, a capacitor C7*b*, abnormality detection circuits 54*a* and 54*b* as an abnormality detection circuit 54, and abnormality notification circuits 55*a* and 55*b* as an abnormality notification circuit 55.

The driving signal output circuit 52*a*-3 includes the integrated circuit 500, the transistors M1 and M2, and the inductor L1, and is provided on the surface 743 of the rigid wiring member 730 of the drive circuit substrate 700. At this time, the transistors M1 and M2 included in the driving signal output circuit 52*a*-3 are positioned side by side in the order of the transistor M1 and the transistor M2 along the direction from the side 733 to the side 734, the integrated circuit 500 included in the driving signal output circuit 52*a*-3 is positioned on the side 731 side of the transistors M1 and M2 positioned side by side, and the inductor L1 included in the driving signal output circuit 52*a*-3 is positioned on the side 732 side of the transistors M1 and M2 positioned side by side.

The driving signal output circuit 52*b*-3 includes the integrated circuit 500, the transistors M1 and M2, and the inductor L1, and is provided on the side 734 side of the driving signal output circuit 52*a*-3 on the surface 743 of the rigid wiring member 730 of the drive circuit substrate 700. At this time, the transistors M1 and M2 included in the driving signal output circuit 52*b*-3 are positioned side by side in the order of the transistor M1 and the transistor M2 along the direction from the side 733 to the side 734, the integrated circuit 500 included in the driving signal output circuit 52*b*-3 is positioned on the side 731 side of the transistors M1 and M2 positioned side by side, and the inductor L1 included in the driving signal output circuit 52*b*-3 is positioned on the side 732 side of the transistors M1 and M2 positioned side by side.

The driving signal output circuit 52*a*-4 includes the integrated circuit 500, the transistors M1 and M2, and the inductor L1, and is provided on the side 734 side of the driving signal output circuit 52*b*-1 on the surface 743 of the rigid wiring member 730 of the drive circuit substrate 700. At this time, the transistors M1 and M2 included in the driving signal output circuit 52*a*-4 are positioned side by side in the order of the transistor M1 and the transistor M2 along the direction from the side 733 to the side 734, the integrated circuit 500 included in the driving signal output circuit 52*a*-4 is positioned on the side 731 side of the transistors M1 and M2 positioned side by side, and the inductor L1 included in the driving signal output circuit 52*a*-4 is positioned on the side 732 side of the transistors M1 and M2 positioned side by side.

The driving signal output circuit 52*b*-4 includes the integrated circuit 500, the transistors M1 and M2, and the inductor L1, and is provided on the side 734 side of the driving signal output circuit 52*a*-4 on the surface 743 of the rigid wiring member 730 of the drive circuit substrate 700. At this time, the transistors M1 and M2 included in the driving signal output circuit 52*b*-4 are positioned side by side in the order of the transistor M1 and the transistor M2 along the direction from the side 733 to the side 734, the integrated circuit 500 included in the driving signal output circuit 52*b*-4 is positioned on the side 731 side of the transistors M1 and M2 positioned side by side, and the inductor L1 included in the driving signal output circuit 52*b*-4 is positioned on the side 732 side of the transistors M1 and M2 positioned side by side.

That is, the integrated circuit 500, the transistors M1 and M2, and the inductor L1 included in the driving signal output circuit 52*a*-3 are provided on the surface 743 to be arranged in the order of the integrated circuit 500, the transistors M1 and M2, and the inductor L1 along the direction from the side 731 to the side 732. The integrated circuit 500, the transistors M1 and M2, and the inductor L1 included in the driving signal output circuit 52*b*-3 are provided on the surface 743 to be arranged in the order of the integrated circuit 500, the transistors M1 and M2, and the inductor L1 along the direction from the side 731 to the side 732. The integrated circuit 500, the transistors M1 and M2, and the inductor L1 included in the driving signal output circuit 52*a*-4 are provided on the surface 743 to be arranged in the order of the integrated circuit 500, the transistors M1 and M2, and the inductor L1 along the direction from the side 731 to the side 732. The integrated circuit 500, the transistors M1 and M2, and the inductor L1 included in the driving signal output circuit 52*b*-4 are provided on the surface 743 to be arranged in the order of the integrated circuit 500, the transistors M1 and M2, and the inductor L1 along the direction from the side 731 to the side 732.

The driving signal output circuits 52*a*-3, 52*a*-4, 52*b*-3, and 52*b*-4 are positioned to be directed from the side 733 to the side 734 on the surface 743 of the rigid wiring member 730 of the drive circuit substrate 700, and to be arranged adjacent to each other in the order of the driving signal output circuit 52*a*-3, the driving signal output circuit 52*b*-3, the driving signal output circuit 52*a*-4, and the driving signal output circuit 52*b*-4.

In this case, all the electronic components that configure the driving signal output circuits 52*a*-3, 52*a*-4, 52*b*-3, and 52*b*-4 are provided on the surface 743 of the rigid wiring member 730. In other words, the electronic components that configure the driving signal output circuits 52*a*-3, 52*a*-4, 52*b*-3, and 52*b*-4 are not provided on the surface 744 of the rigid wiring member 730.

Further, the driving signal output circuits 52*a*-3, 52*b*-3, 52*a*-4, and 52*b*-4 are arranged in a staggered manner from the side 733 to the side 734. Specifically, in the direction from the side 731 to the side 732, the driving signal output circuit 52*a*-3 and the driving signal output circuit 52*a*-4 are arranged at substantially the same position, the driving signal output circuit 52*b*-3 and the driving signal output circuit 52*b*-4 are arranged at substantially the same position, the driving signal output circuit 52*a*-3 and the driving signal output circuits 52*b*-3 and 52*b*-4 are arranged at different positions, and the driving signal output circuit 52*a*-4 and the driving signal output circuits 52*b*-3 and 52*b*-4 are arranged at different positions.

Specifically, the driving signal output circuit 52*a*-3 is arranged overlapping with at least a part of the driving signal output circuit 52*b*-3, at least a part of the driving signal output circuit 52*a*-4, and at least a part of the driving signal output circuit 52*b*-4, when viewed along the direction from the side 733 to the side 734. The integrated circuit 500 included in the driving signal output circuit 52*a*-3 is arranged not overlapping with the integrated circuit 500 included in the driving signal output circuit 52*b*-3 and the integrated circuit 500 included in the driving signal output circuit 52*b*-4, but overlapping with at least a part of the integrated circuit 500 included in the driving signal output circuit 52*a*-4, when viewed along the direction from the side 733 to the side 734.

In this case, when the transistors M1 and M2 included in the driving signal output circuit 52*a*-3 may be arranged not overlapping with the transistors M1 and M2 included in the driving signal output circuit 52*b*-3 and the transistors M1 and M2 included in the driving signal output circuit 52*b*-4, but overlapping with at least a part of the transistors M1 and M2 included in the driving signal output circuit 52*a*-4, when viewed along the direction from the side 733 to the side 734. Further, when the inductor L1 included in the driving signal output circuit 52*a*-3 may be arranged not overlapping with the inductor L1 included in the driving signal output circuit 52*b*-3 and the inductor L1 included in the driving signal output circuit 52*b*-4, but overlapping with at least a part of the inductor L1 included in the driving signal output circuit 52*a*-4, when viewed along the direction from the side 733 to the side 734.

Similarly, the driving signal output circuit 52*b*-3 is arranged overlapping with at least a part of the driving signal output circuit 52*a*-3, at least a part of the driving signal output circuit 52*a*-4, and at least a part of the driving signal output circuit 52*b*-4, when viewed along the direction from the side 733 to the side 734. The integrated circuit 500 included in the driving signal output circuit 52*b*-3 is arranged not overlapping with the integrated circuit 500 included in the driving signal output circuit 52*a*-3 and the integrated circuit 500 included in the driving signal output circuit 52*a*-4, but overlapping with at least a part of the integrated circuit 500 included in the driving signal output circuit 52*b*-4, when viewed along the direction from the side 733 to the side 734.

In this case, the transistors M1 and M2 included in the driving signal output circuit 52*b*-3 may be arranged not overlapping with the transistors M1 and M2 included in the driving signal output circuit 52*a*-3 and the transistors M1 and M2 included in the driving signal output circuit 52*a*-4, but overlapping with at least a part of the transistors M1 and M2 included in the driving signal output circuit 52*b*-4, when viewed along the direction from the side 733 to the side 734. Further, the inductor L1 included in the driving signal output circuit 52*b*-3 may be arranged not overlapping with the inductor L1 included in the driving signal output circuit 52*a*-3 and the inductor L1 included in the driving signal output circuit 52*a*-4, but overlapping with at least a part of the inductor L1 included in the driving signal output circuit 52*b*-2, when viewed along the direction from the side 733 to the side 734.

Here, the fact that the driving signal output circuit 52*a*-3, the driving signal output circuit 52*b*-3, the driving signal output circuit 52*a*-4, and the driving signal output circuit 52*b*-4 are arranged overlapping with each other at least partially when viewed along the direction from the side 733 to the side 734, means that at least one of the electronic components included in the driving signal output circuit 52*a*-3, at least one of the electronic components included in the driving signal output circuit 52*b*-3, at least one of the electronic components included in the driving signal output circuit 52*a*-4, and at least one of the electronic components included in the driving signal output circuit 52*b*-4 overlap with each other when viewed along the direction from the side 733 to the side 734. For example, a case where at least one of the integrated circuit 500, the transistors M1 and M2, and the inductor L1 included in the driving signal output circuit 52*a*-3, at least one of the integrated circuit 500, the transistors M1 and M2, and the inductor L1 included in the driving signal output circuit 52*b*-3, at least one of the integrated circuit 500, the transistors M1 and M2, and the inductor L1 included in the driving signal output circuit 52*a*-4, and at least one of the integrated circuit 500, the transistors M1 and M2, and the inductor L1 included in the driving signal output circuit 52*b*-4 overlap with each other when viewed along the direction from the side 733 to the side 734, is included.

The capacitor C7*b* is positioned on the side 731 side of the driving signal output circuits 52*a*-3, 52*b*-3, 52*a*-4, and 52*b*-4 provided side by side from the side 733 to the side 734 on the surface 743 of the rigid wiring member 730. The capacitor C7*b* corresponds to the above-described capacitor C7 corresponding to the driving signal output circuits 52*a*-3, 52*b*-3, 52*a*-4, and 52*b*-4, the concern that the voltage value of the voltage signal VHV supplied to each of the driving signal output circuits 52*a*-3, 52*b*-3, 52*a*-4, and 52*b*-4 fluctuates is reduced, and the concern that noise is superimposed on the voltage signal VHV is reduced.

The abnormality detection circuits 54*a* and 54*b* are positioned on the side 731 side of the driving signal output circuits 52*a*-3, 52*b*-3, 52*a*-4, and 52*b*-4 provided side by side from the side 733 to the side 734 and on the side 734 side of the capacitor C7*b*, on the surface 743 of the rigid wiring member 730. The abnormality detection circuit 54*a* detects whether or not the voltage value of the voltage signal VHV is normal, and the abnormality detection circuit 54*b* detects whether or not the voltage value of the voltage signal VDD generated based on the voltage signal VMV is normal.

The abnormality notification circuits 55*a* and 55*b* are positioned on the side 731 side of the driving signal output circuits 52*a*-3, 52*b*-3, 52*a*-4, and 52*b*-4 provided side by side from the side 733 to the side 734, in the vicinity of the abnormality detection circuits 54*a* and 54*b*, on the surface 744 of the rigid wiring member 730. The abnormality notification circuit 55*a* is turned on, is turned off, or blinks based on the result of an abnormality detection in the abnormality detection circuit 54*a*. The abnormality notification circuit 55*b* is turned on, is turned off, or blinks based on the result of an abnormality detection in the abnormality detection circuit 54*b*.

The rigid wiring member 750 is provided with the temperature detection circuit 56 and the voltage conversion circuit 58.

The temperature detection circuit 56 is positioned at substantially the center of the rigid wiring member 750 on the surface 763 of the rigid wiring member 750. Specifically, the temperature detection circuit 56 is provided to overlap with the intersection between a virtual line in which at least a part of the distance from the side 751 and the distance from the side 752 are equal, and a virtual line in which the distance from the side 753 and the distance from the side 754 are equal. The temperature detection circuit 56 detects the environmental temperature of the drive circuit module 50, generates a temperature information signal Tt including temperature information corresponding to the environmental temperature, and outputs the temperature information signal Tt to the head control circuit 12. The temperature detection circuit 56 is required to comprehensively detect temperature information of the plurality of circuits provided on the drive circuit substrate 700.

In the liquid discharge apparatus 1 of the present embodiment, the temperature detection circuit 56 is provided on the rigid wiring member 750 different from the rigid wiring members 710 and 730 provided with the driving signal output circuit 52 having a large heat generation amount, and further, is positioned at substantially the center of the rigid wiring member 750. As a result, the contribution of the driving signal output circuit 52 having a large amount of heat generation is reduced, and as a result, the acquisition accuracy of the environmental temperature in the entire drive circuit module 50 is improved.

The voltage conversion circuit 58 is positioned on the side 751 side of the temperature detection circuit 56 on the surface 763 of the rigid wiring member 750. Then, the voltage conversion circuit 58 generates and outputs the voltage signal VDD by converting the voltage value of the voltage signal VMV. The voltage signal VDD is used in various configurations provided on the drive circuit substrate 700, and has a voltage value smaller than that of the voltage signals VHV and VMV. Therefore, the voltage signal VDD is easily affected by noise. By providing the voltage conversion circuit 58 that outputs the voltage signal VDD in the rigid wiring member 750 positioned between the rigid wiring member 710 provided with a plurality of circuits including the driving signal output circuits 52*a*-1, 52*b*-1, 52*a*-2, and 52*b*-2, and the rigid wiring member 730 provided with a plurality of circuits including the driving signal output circuits 52*a*-3, 52*b*-3, 52*a*-4, and 52*b*-4, the wiring length through which the voltage signal VDD propagates can be shortened, and as a result, the concern that the voltage value of the voltage signal VDD fluctuates is reduced, and the concern that noise is superimposed on the voltage signal VDD is also reduced.

The rigid wiring member 770 is provided with the capacitor 53, a connector CN3*b*, and the connector CN1*a*.

The connector CN3*b* includes a plurality of terminals TM3*b*. The connector CN3*b* is positioned such that the plurality of terminals TM3*b* are arranged in parallel along the side 772 on the surface 783 of the rigid wiring member 770.

The capacitor 53 is positioned on the surface 783 of the rigid wiring member 770. The capacitor 53 stabilizes the voltage value of the reference voltage signal VBS output by the driving signal output circuit 52*a*-1.

The connector CN1*a* is positioned on the surface 784 of the rigid wiring member 770. When the connector CN1*a* is fitted to the connector CN1*b* included in the print head 30, various signals generated by the drive circuit substrate 700 are supplied to the print head 30.

As described above, on the surface 723 of the rigid wiring member 710 of the drive circuit substrate 700, which is the surface 723 of the rigid member 721, the driving signal output circuits 52*a*-1, 52*b*-1, 52*a*-2, and 52*b*-2, the discharge control circuit 51 configured by the above-described FPGA, the capacitors C7*a*, and the connectors CN2*b* and CN3*a* are provided. On the surface 743 of the rigid wiring member 730, which is the surface 743 of the rigid member 741, the driving signal output circuits 52*a*-3, 52*b*-3, 52*a*-4, and 52*b*-4, the capacitors C7*b*, and the abnormality detection circuits 54*a* and 54*b* are provided. On the surface 744 of the rigid wiring member 730, which is the surface 744 of the rigid member 742, the abnormality notification circuits 55*a* and 55*b* are provided. On the surface 763 of the rigid wiring member 750, which is the surface 763 of the rigid member 761, the temperature detection circuit 56 and the voltage conversion circuit 58 are provided. On the surface 783 of the rigid wiring member 770, which is the surface 783 of the rigid member 781, the capacitor 53 and the connector CN3*b* are provided. On the surface 784 of the rigid wiring member 770, which is the surface 784 of the rigid member 782, the connector CN1*a* are provided.

Here, an example of the wiring pattern formed on the drive circuit substrate 700 configured as described above, which is the wiring pattern through which the voltage signals VHV, VMV, and VDD that function as power supply voltages of various circuits provided on the drive circuit substrate 700 propagate, and the wiring pattern through which the driving signals COMA1 to COMA4 and COMB1 to COMB4 generated by the drive circuit substrate 700, and the reference voltage signal VBS propagate, will be described.

Figure 21:
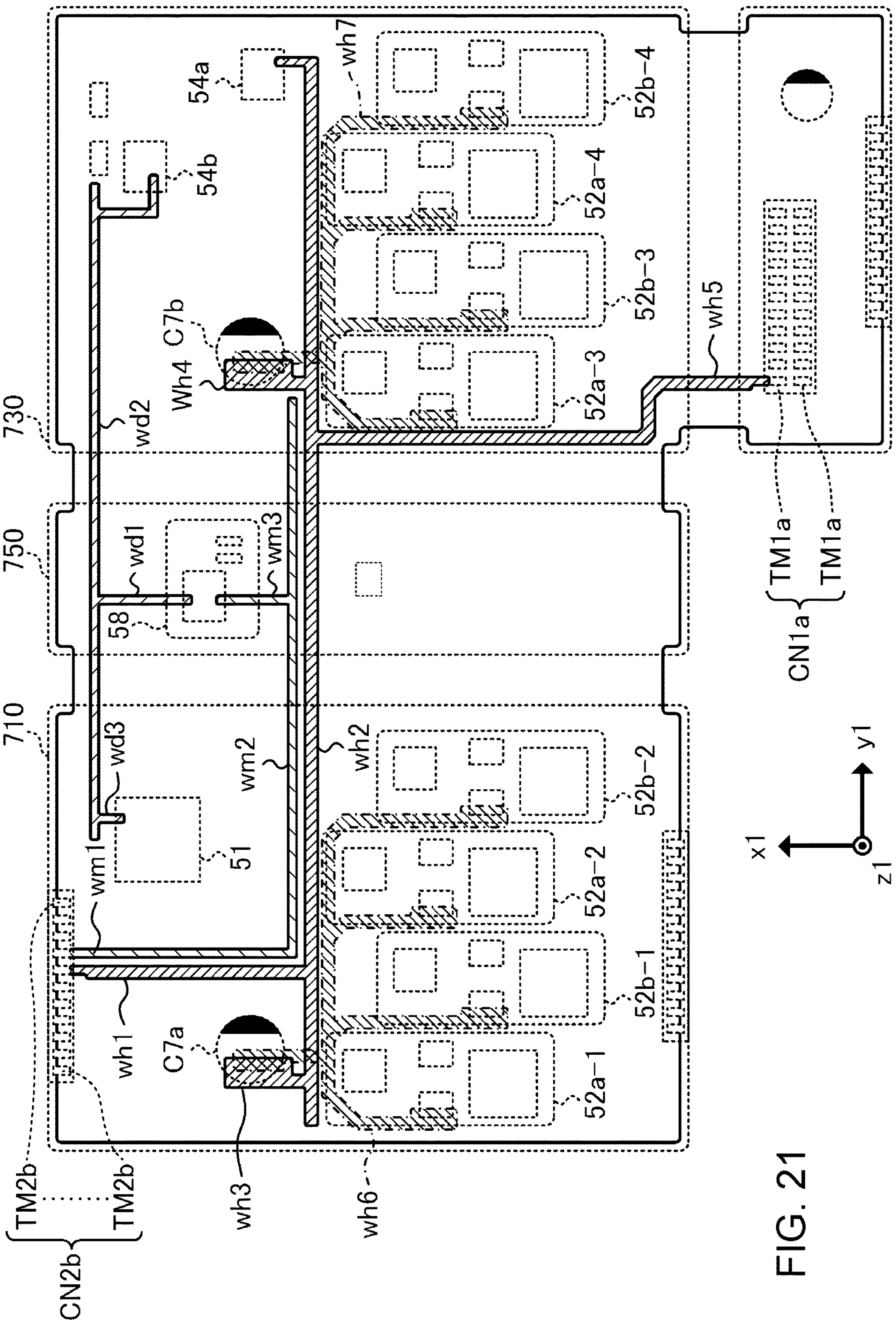
FIG. 21 is a diagram illustrating an example of a wiring pattern in which voltage signals propagate.

FIG. 21 is a diagram illustrating an example of the wiring pattern through which the voltage signals VHV, VMV, and VDD propagate. As described above, the voltage signals VHV and VMV propagating through the drive circuit substrate 700 are output by the power supply voltage output circuit 18 included in the control unit 2. The voltage signals VHV and VMV are input to the drive circuit substrate 700 via the connector CN2*b*.

The voltage signal VHV input via the connector CN2*b* propagates through the wirings wh1 to wh5 provided in the flexible wiring member 790 of the drive circuit substrate 700, the wiring wh6 provided on the rigid wiring member 710, and the wiring wh7 provided on the rigid wiring member 730, and is input to the various configurations provided on the drive circuit substrate 700 and the driving signal selection circuit 200 included in the print head 30.

One end of the wiring wh1 is electrically coupled to the terminal TM2*b* of the connector CN2*b*, the wiring wh1 extends to the −x1 side along the x1 axis, and the other end is electrically coupled to the wiring wh2.

The wiring wh2 is continuously provided over the regions 701, 702, 703, 704, and 705. That is, the flexible wiring member 790 includes the driving signal selection circuit 200 and the wiring wh2 through which the voltage signal VHV supplied to the driving signal output circuit 52 propagates, and the wiring wh2 is continuously provided over the regions 701, 702, 703, 704, and 705. At this time, the wiring wh2 is preferably provided linearly along the y1 axis over the regions 701, 702, 703, 704, and 705. The voltage signal VHV propagating through the wiring wh2 branches in each of the regions 701, 703, and 705, and is supplied to various circuits provided on the rigid wiring members 710, 730, and 750 through through-holes (not illustrated).

For example, the wiring wh2 branches into the wiring wh3 in the region 701. The wiring wh3 is supplied to the capacitor C7*a* provided on the rigid wiring member 710 through a through-hole (not illustrated). The voltage signal VHV supplied to the capacitor C7*a* propagates through the wiring wh6 provided on the rigid wiring member 710 and is supplied to each of the driving signal output circuits 52*a*-1, 52*a*-2, 52*b*-1, and 52*b*-2.

Further, for example, the wiring wh2 branches into the wiring wh4 in the region 705. The wiring wh4 is supplied to the capacitor C7*b* provided on the rigid wiring member 730 through a through-hole (not illustrated). The voltage signal VHV supplied to the capacitor C7*b* propagates through the wiring wh7 provided on the rigid wiring member 730 and is supplied to each of the driving signal output circuits 52*a*-3, 52*a*-4, 52*b*-3, and 52*b*-4.

Further, for example, the wiring wh2 branches into the wiring wh5 in the region 705. The wiring wh5 propagates through the regions 706 and 707 and is supplied to the terminal TM1*a* of the connector CN1*a* provided on the rigid wiring member 770 through a through-hole (not illustrated). Accordingly, the voltage signal VHV is supplied to the driving signal selection circuit 200 included in the print head 30.

As described above, the voltage signal VHV is input to the drive circuit substrate 700 via the wiring wh1, propagates through the wiring wh2, and is supplied to various circuit configurations of the drive circuit substrate 700 and the print head 30. Therefore, since the voltage signal VHV, which is supplied to various circuit configurations of the drive circuit substrate 700 and the print head 30, propagates through the wiring wh2, a large amount of current is generated. By continuously providing the wiring wh2 in the flexible wiring member 790 over the regions 701, 702, 703, 704, and 705, it is not necessary to provide a via wiring or the like, and thus, the concern that impedance fluctuation in the wiring wh2 occurs is reduced. As a result, the concern that the voltage value of the voltage signal VHV propagating through the wiring wh2 fluctuates is reduced, and the operational stability of various circuits operating using the voltage signal VHV as the power supply voltage is also improved.

Further, by providing the wiring wh2 linearly over the regions 701, 702, 703, 704, and 705, the concern that the current density is biased at the bent portion of the wiring wh2 is reduced. As a result, the concern that the voltage value of the voltage signal VHV propagating through the wiring wh2 fluctuates is further reduced, and the operational stability of various circuits operating using the voltage signal VHV as the power supply voltage is further improved. In addition to the wirings wh3, wh4, and wh5, a plurality of branch wirings may be electrically coupled to the wiring wh2.

Further, the voltage signal VMV input via the connector CN2*b* propagates through wirings wm1 to wm3 provided in the flexible wiring member 790 of the drive circuit substrate 700 and is input to various configurations provided in the drive circuit substrate 700.

One end of the wiring wm1 is electrically coupled to the terminal TM2*b* of the connector CN2*b*, the wiring wm1 extends to the −x1 side along the x1 axis, and the other end is electrically coupled to the wiring wm2.

The wiring wm2 is continuously provided over the regions 701, 702, 703, 704, and 705. At this time, the wiring wm2 is preferably provided linearly along the y1 axis over the regions 701, 702, 703, 704, and 705. The voltage signal VMV propagating through the wiring wm2 branches in each of the regions 701, 703, and 705, and is supplied to various circuits provided on the rigid wiring members 710, 730, and 750 through through-holes (not illustrated).

For example, the wiring wm2 branches into the wiring wm3 in the region 703. The wiring wm3 is supplied to the voltage conversion circuit 58 through a through-hole (not illustrated). Then, the voltage conversion circuit 58 generates and outputs the voltage signal VDD based on the supplied voltage signal VMV.

As described above, the voltage signal VMV is input to the drive circuit substrate 700 via the wiring wm1, propagates through the wiring wm2, and is supplied to various circuit configurations of the drive circuit substrate 700. Therefore, since the voltage signal VMV, which is supplied to various circuit configurations of the drive circuit substrate 700, propagates through the wiring wm2, a large amount of current is generated. By continuously providing the wiring wm2 in the flexible wiring member 790 over the regions 701, 702, 703, 704, and 705, it is not necessary to provide a via wiring or the like, and thus, the concern that impedance fluctuation in the wiring wm2 occurs is reduced. As a result, the concern that the voltage value of the voltage signal VMV propagating through the wiring wm2 fluctuates is reduced, and the operational stability of various circuits operating using the voltage signal VMV as the power supply voltage is also improved.

Further, by providing the wiring wm2 linearly over the regions 701, 702, 703, 704, and 705, the concern that the current density is biased at the bent portion of the wiring wm2 is reduced. As a result, the concern that the voltage value of the voltage signal VMV propagating through the wiring wm2 fluctuates is further reduced, and the operational stability of various circuits operating using the voltage signal VMV as the power supply voltage is further improved.

Further, the voltage signal VDD output by the voltage conversion circuit 58 propagates through wirings wd1 and wd2 provided in the flexible wiring member 790 of the drive circuit substrate 700 and is input to various configurations provided in the drive circuit substrate 700.

One end of the wiring wd1 is electrically coupled to the voltage conversion circuit 58, the wiring wd1 extends to the +x1 side along the x1 axis, and the other end is electrically coupled to the wiring wd2.

The wiring wd2 is continuously provided over the regions 701, 702, 703, 704, and 705. At this time, the wiring wd2 is preferably provided linearly along the y1 axis over the regions 701, 702, 703, 704, and 705. The voltage signal VDD propagating through the wiring wd2 branches in each of the regions 701, 703, and 705, and is supplied to various circuits provided on the rigid wiring members 710, 730, and 750 through through-holes (not illustrated).

For example, the wiring wd2 branches into a wiring wd3 in the region 701. The wiring wd3 is supplied to the FPGA including the discharge control circuit 51 via a through-hole (not illustrated). The discharge control circuit 51 operates based on the supplied voltage signal VDD.

As described above, the voltage signal VDD is input to the drive circuit substrate 700 via the wiring wd1, propagates through the wiring wd2, and is supplied to various circuit configurations of the drive circuit substrate 700. Therefore, since the voltage signal VDD, which is supplied to various circuit configurations of the drive circuit substrate 700, propagates through the wiring wd2, a large amount of current is generated. By continuously providing such wiring wd2 in the flexible wiring member 790 over the regions 701, 702, 703, 704, and 705, it is not necessary to provide via wiring or the like, and therefore, the concern that impedance fluctuation in the wiring wd2 occurs is reduced. As a result, the concern that the voltage value of the voltage signal VDD propagating through the wiring wd2 fluctuates is reduced, and the operational stability of various circuits operating using the voltage signal VDD as the power supply voltage is also improved.

Further, by providing the wiring wd2 linearly over the regions 701, 702, 703, 704, and 705, the concern that the current density is biased at the bent portion of the wiring wd2 is reduced. As a result, the concern that the voltage value of the voltage signal VDD propagating through the wiring wd2 fluctuates is further reduced, and the operational stability of various circuits operating using the voltage signal VDD as the power supply voltage is further improved.

Figure 22:
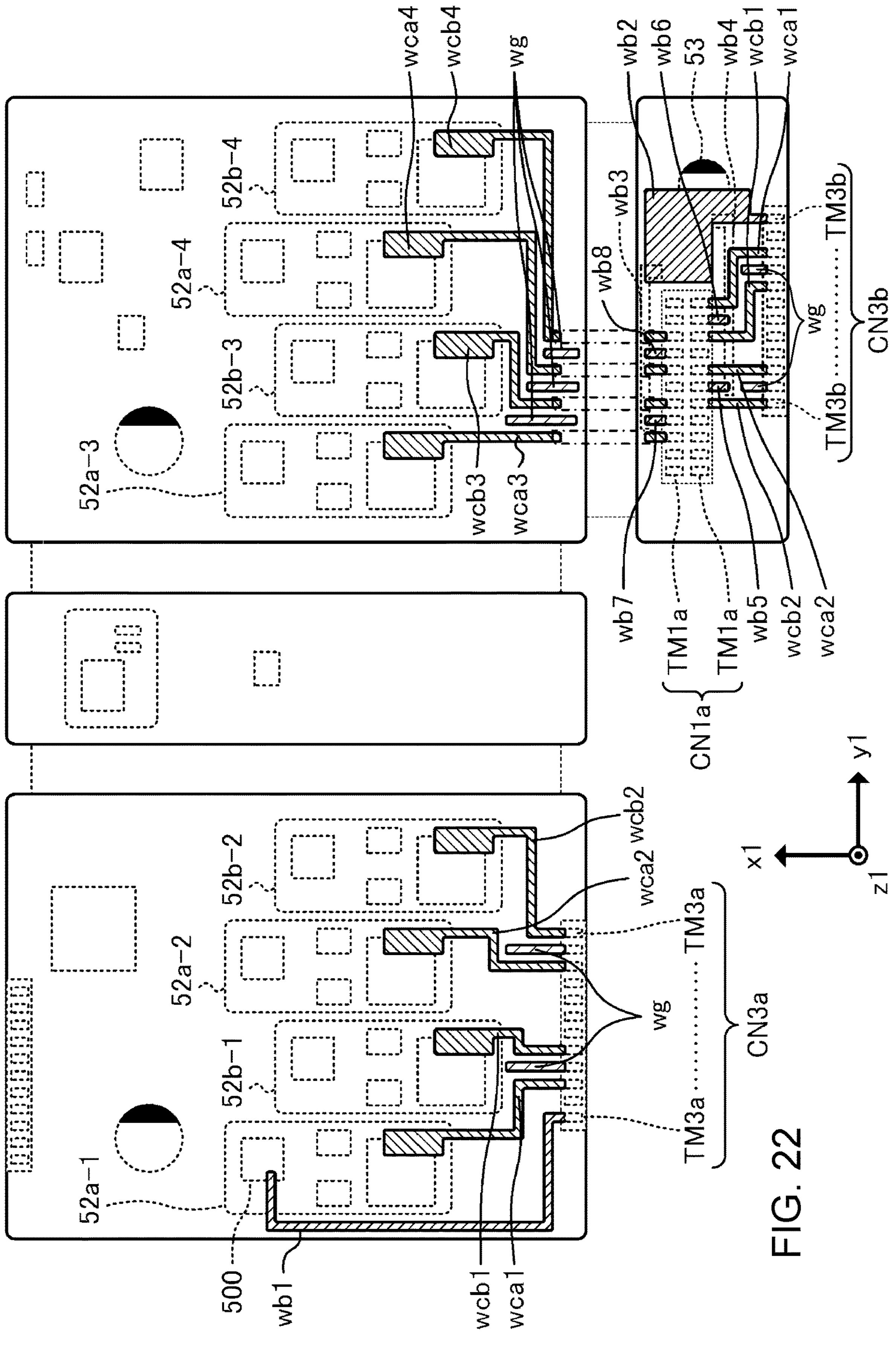
FIG. 22 is a diagram illustrating an example of a wiring pattern in which a driving signal and a reference voltage signal propagate.

Next, an example of a wiring pattern in which the driving signals COMA1 to COMA4 and COMB1 to COMB4 generated by the drive circuit substrate 700 and the reference voltage signal VBS propagate will be described. FIG. 22 is a diagram illustrating an example of a wiring pattern in which the driving signal COM and the reference voltage signal VBS propagate.

The driving signal COMA1 output by the driving signal output circuit 52*a*-1 propagates through a wiring wca1 and is input to the terminal TM1*a* of the connector CN1*a*. Further, the driving signal COMB1 output by the driving signal output circuit 52*b*-1 propagates through a wiring wcb1 and is input to the terminal TM1*a* of the connector CN1*a*. The driving signal COMA1 and the driving signal COMB1 are input to the driving signal selection circuit 200 included in the discharge module 32-1 via the corresponding terminal TM1*a* of the connector CN1*a*.

Similarly, the driving signal COMA2 output by the driving signal output circuit 52*a*-2 propagates through a wiring wca2, and is input to the driving signal selection circuit 200 included in the discharge module 32-2 via the terminal TM1*a* of the connector CN1*a*. The driving signal COMB2 output by the driving signal output circuit 52*b*-2 propagates through a wiring wcb2, and is input to the driving signal selection circuit 200 included in the discharge module 32-2 via the terminal TM1*a* of the connector CN1*a*. Similarly, the driving signal COMA3 output by the driving signal output circuit 52*a*-3 propagates through a wiring wca3, and is input to the driving signal selection circuit 200 included in the discharge module 32-3 via the terminal TM1*a* of the connector CN1*a*. The driving signal COMB3 output by the driving signal output circuit 52*b*-3 propagates through a wiring wcb3, and is input to the driving signal selection circuit 200 included in the discharge module 32-3 via the terminal TM1*a* of the connector CN1*a*. Similarly, the driving signal COMA4 output by the driving signal output circuit 52*a*-4 propagates through a wiring wca4, and is input to the driving signal selection circuit 200 included in the discharge module 32-4 via the terminal TM1*a* of the connector CN1*a*. The driving signal COMB4 output by the driving signal output circuit 52*b*-4 propagates through a wiring wcb4, and is input to the driving signal selection circuit 200 included in the discharge module 32-4 via the terminal TM1*a* of the connector CN1*a*.

The reference voltage signal VBS output by the reference voltage signal output circuit 530 included in the integrated circuit 500 included in the driving signal output circuit 52*a*-1 propagates through a wiring wb1 and is input to a wiring wb2 to which the capacitor 53 is electrically coupled. The reference voltage signal VBS input to the capacitor 53 propagates through a wiring wb4 and a wiring wb6, and is supplied to the electrode 612 of the piezoelectric element 60 included in the discharge module 32-1 via the terminal TM1*a* of the connector CN1*a*. In addition, the reference voltage signal VBS input to the capacitor 53 propagates through the wiring wb4 and a wiring wb5, and is supplied to the electrode 612 of the piezoelectric element 60 included in the discharge module 32-2 via the terminal TM1*a* of the connector CN1*a*. In addition, the reference voltage signal VBS input to the capacitor 53 propagates through the wiring wb3 and a wiring wb7, and is supplied to the electrode 612 of the piezoelectric element 60 included in the discharge module 32-3 via the terminal TM1*a* of the connector CN1*a*. In addition, the reference voltage signal VBS input to the capacitor 53 propagates through the wiring wb3 and a wiring wb8, and is supplied to the electrode 612 of the piezoelectric element 60 included in the discharge module 32-4 via the terminal TM1*a* of the connector CN1*a*. That is, the reference voltage signal VBS is input to the capacitor 53, then branches, and is supplied to the electrode 612 of the piezoelectric element 60 included in each of the discharge modules 32-1 to 32-4.

At this time, between a part of the wiring wca1 through which the driving signal COMA1 supplied to the discharge module 32-1 propagates and a part of the wiring wcb1 through which the driving signal COMB1 supplied to the discharge module 32-1 propagates, the wiring wb6 through which the reference voltage signal VBS supplied to the discharge module 32-1 propagates is positioned. Between a different part of the wiring wca1 through which the driving signal COMA1 supplied to the discharge module 32-1 propagates and a different part of the wiring wcb1 through which the driving signal COMB1 supplied to the discharge module 32-1 propagates, the wiring wg through which the ground signal propagates is positioned.

Similarly, between a part of the wiring wca2 through which the driving signal COMA2 supplied to the discharge module 32-2 propagates and a part of the wiring wcb2 through which the driving signal COMB2 supplied to the discharge module 32-2 propagates, the wiring wb5 through which the reference voltage signal VBS supplied to the discharge module 32-2 propagates is positioned. Between a different part of the wiring wca2 through which the driving signal COMA2 supplied to the discharge module 32-2 propagates and a different part of the wiring wcb2 through which the driving signal COMB2 supplied to the discharge module 32-2 propagates, the wiring wg through which the ground signal propagates is positioned.

Similarly, between a part of the wiring wca3 through which the driving signal COMA3 supplied to the discharge module 32-3 propagates and a part of the wiring wcb3 through which the driving signal COMB3 supplied to the discharge module 32-3 propagates, the wiring wb7 through which the reference voltage signal VBS supplied to the discharge module 32-3 propagates is positioned. Between a different part of the wiring wca3 through which the driving signal COMA3 supplied to the discharge module 32-3 propagates and a different part of the wiring wcb3 through which the driving signal COMB3 supplied to the discharge module 32-3 propagates, the wiring wg through which the ground signal propagates is positioned.

Similarly, between a part of the wiring wca4 through which the driving signal COMA4 supplied to the discharge module 32-4 propagates and a part of the wiring wcb4 through which the driving signal COMB4 supplied to the discharge module 32-4 propagates, the wiring wb8 through which the reference voltage signal VBS supplied to the discharge module 32-4 propagates is positioned. Between a different part of the wiring wca4 through which the driving signal COMA4 supplied to the discharge module 32-4 propagates and a different part of the wiring wcb4 through which the driving signal COMB4 supplied to the discharge module 32-4 propagates, the wiring wg through which the ground signal propagates is positioned.

That is, the drive circuit substrate 700 includes the wiring wca1 that electrically couples the driving signal output circuit 52*a*-1 and the terminal TM1*a* of the connector CN1*a*, the wiring wcb1 that electrically couples the driving signal output circuit 52*b*-1 and the terminal TM1*a* of the connector CN1*a*, the wiring wca2 that electrically couples the driving signal output circuit 52*a*-2 and the terminal TM1*a* of the connector CN1*a*, the wiring wcb2 that electrically couples the driving signal output circuit 52*b*-2 and the terminal TM1*a* of the connector CN1*a*, the wiring wca3 that electrically couples the driving signal output circuit 52*a*-3 and the terminal TM1*a* of the connector CN1*a*, the wiring wcb3 that electrically couples the driving signal output circuit 52*b*-3 and the terminal TM1*a* of the connector CN1*a*, the wiring wca4 that electrically couples the driving signal output circuit 52*a*-4 and the terminal TM1*a* of the connector CN1*a*, the wiring wcb4 that electrically couples the driving signal output circuit 52*b*-4 and the terminal TM1*a* of the connector CN1*a*, the wiring wb1 that electrically couples the reference voltage signal output circuit 530 and the capacitor 53, the wiring wb6 that electrically couples the capacitor 53 and the connector CN3*a* and branches from the wiring wb1, and through which the reference voltage signal VBS supplied to the electrode 612 of the piezoelectric element 60 included in the discharge module 32-1 propagates, the wiring wb5 that electrically couples the capacitor 53 and the connector CN3*a* and branches from the wiring wb1, and through which the reference voltage signal VBS supplied to the electrode 612 of the piezoelectric element 60 included in the discharge module 32-2 propagates, the wiring wb7 that electrically couples the capacitor 53 and the connector CN3*a* and branches from the wiring wb1, and through which the reference voltage signal VBS supplied to the electrode 612 of the piezoelectric element 60 included in the discharge module 32-3 propagates, the wiring wb8 that electrically couples the capacitor 53 and the connector CN3*a* and branches from the wiring wb1, and through which the reference voltage signal VBS supplied to the electrode 612 of the piezoelectric element 60 included in the discharge module 32-4 propagates, and the wiring wg through which the ground signal propagates.

A part of the wiring wca1 is provided adjacent to the wiring wb6 and a different part is provided adjacent to the wiring wg, a part of the wiring wcb1 is provided adjacent to the wiring wb6 and a different part is provided adjacent to the wiring wg, a part of the wiring wca2 is provided adjacent to the wiring wb5 and a different part is provided adjacent to the wiring wg, a part of the wiring wcb2 is provided adjacent to the wiring wb5 and a different part is provided adjacent to the wiring wg, a part of the wiring wca3 is provided adjacent to the wiring wb7 and a different part is provided adjacent to the wiring wg, a part of the wiring wcb3 is provided adjacent to the wiring wb7 and a different part is provided adjacent to the wiring wg, a part of the wiring wca4 is provided adjacent to the wiring wb8 and a different part is provided adjacent to the wiring wg, and a part of the wiring wcb4 is provided adjacent to the wiring wb8 and a different part is provided adjacent to the wiring wg.

With the above configuration, the current generated by supplying the driving signals COMA1 and COMB1 to the discharge module 32-1 is fed back via the wiring wb6 that supplies the reference voltage signal VBS to the discharge module 32-1. Therefore, the magnetic field generated by the current generated by supplying the driving signals COMA1 and COMB1 to the discharge module 32-1 is canceled by the magnetic field generated by the current fed back through the wiring wb6 supplying the reference voltage signal VBS to the discharge module 32-1. As a result, the waveform accuracy of the driving signals COMA1 and COMB1 supplied to the discharge module 32-1 is improved. Further, in a section where the wirings wca1 and wcb1 through which the driving signals COMA1 and COMB1 propagate to the discharge module 32-1 are not adjacent to the wiring wb6 for supplying the reference voltage signal VBS to the discharge module 32-1, by providing the wiring wg through which the ground signal propagates adjacent to the wirings wca1 and wcb1 through which the driving signals COMA1 and COMB1 propagate to the discharge module 32-1, the concern that the noise is superimposed on the driving signals COMA1 and COMB1 supplied to the discharge module 32-1 is reduced, and the waveform accuracy of the driving signals COMA1 and COMB1 is further improved.

Similarly, the magnetic field generated by the current generated by supplying the driving signals COMA2 and COMB2 to the discharge module 32-2 is canceled by the magnetic field generated by the current fed back through the wiring wb5 supplying the reference voltage signal VBS to the discharge module 32-2, and thus the waveform accuracy of the driving signals COMA2 and COMB2 supplied to the discharge module 32-2 is improved. In a section where the wirings wca2 and wcb2 through which the driving signals COMA2 and COMB2 propagate are not adjacent to the wiring wb5, by providing the wiring wg adjacent to the wirings wca2 and wcb2, the concern that noise is superimposed on the driving signals COMA2 and COMB2 is reduced, and the waveform accuracy of the driving signals COMA2 and COMB2 is further improved.

Similarly, the magnetic field generated by the current generated by supplying the driving signals COMA3 and COMB3 to the discharge module 32-3 is canceled by the magnetic field generated by the current fed back through the wiring wb7 supplying the reference voltage signal VBS to the discharge module 32-3, and thus the waveform accuracy of the driving signals COMA3 and COMB3 supplied to the discharge module 32-3 is improved. In a section where the wirings wca3 and wcb3 through which the driving signals COMA3 and COMB3 propagate are not adjacent to the wiring wb7, by providing the wiring wg adjacent to the wirings wca3 and wcb3, the concern that noise is superimposed on the driving signals COMA3 and COMB3 is reduced, and the waveform accuracy of the driving signals COMA3 and COMB3 is further improved.

Similarly, the magnetic field generated by the current generated by supplying the driving signals COMA4 and COMB4 to the discharge module 32-4 is canceled by the magnetic field generated by the current fed back through the wiring wb8 supplying the reference voltage signal VBS to the discharge module 32-4, and thus the waveform accuracy of the driving signals COMA4 and COMB4 supplied to the discharge module 32-4 is improved. In a section where the wirings wca4 and wcb4 through which the driving signals COMA4 and COMB4 propagate are not adjacent to the wiring wb8, by providing the wiring wg adjacent to the wirings wca4 and wcb4, the concern that noise is superimposed on the driving signals COMA4 and COMB4 is reduced, and the waveform accuracy of the driving signals COMA4 and COMB4 is further improved.

Figure 23:
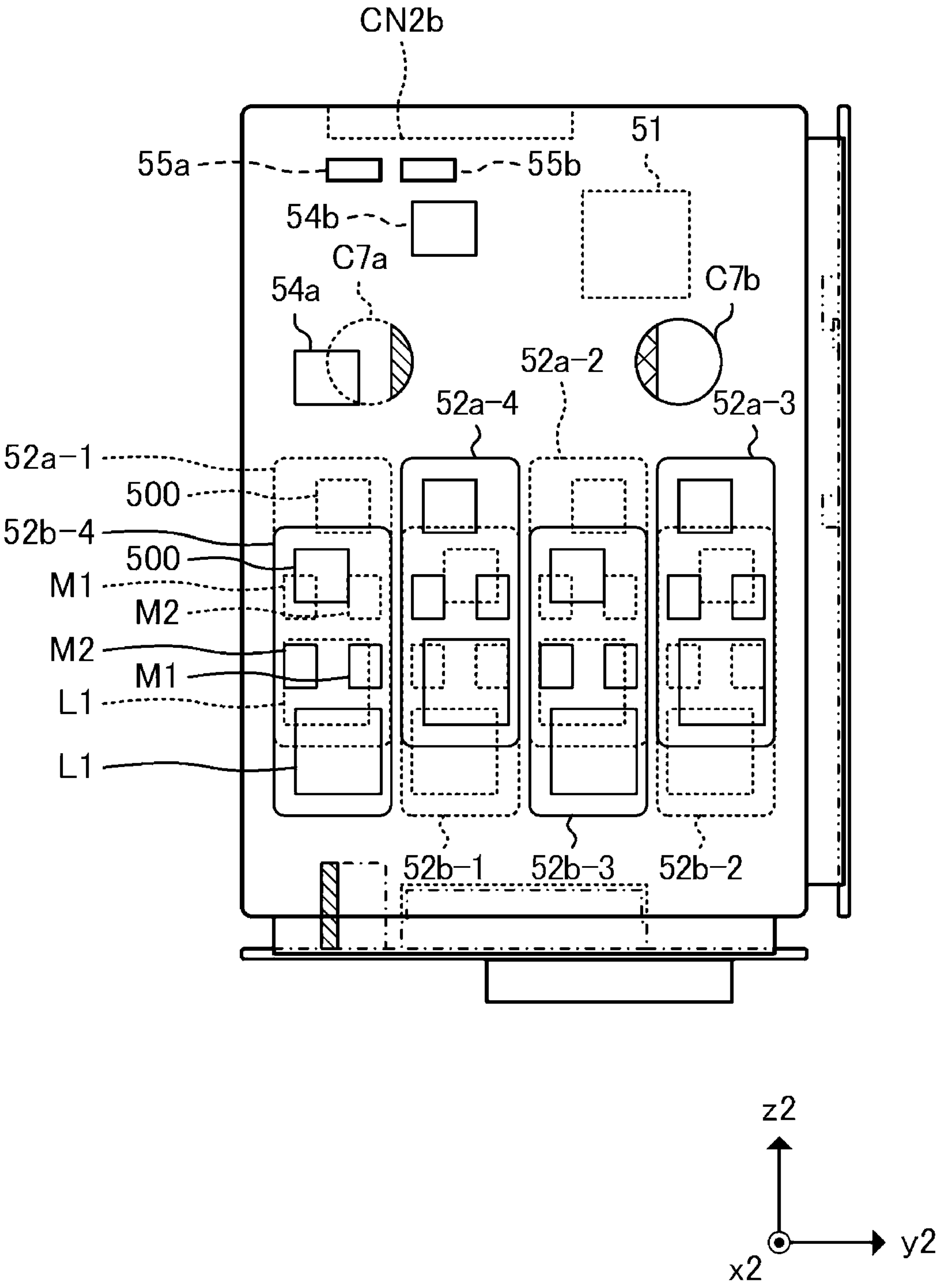
FIG. 23 is a diagram illustrating an example of component arrangement in the drive circuit substrate in an assembled state.
Figure 24:
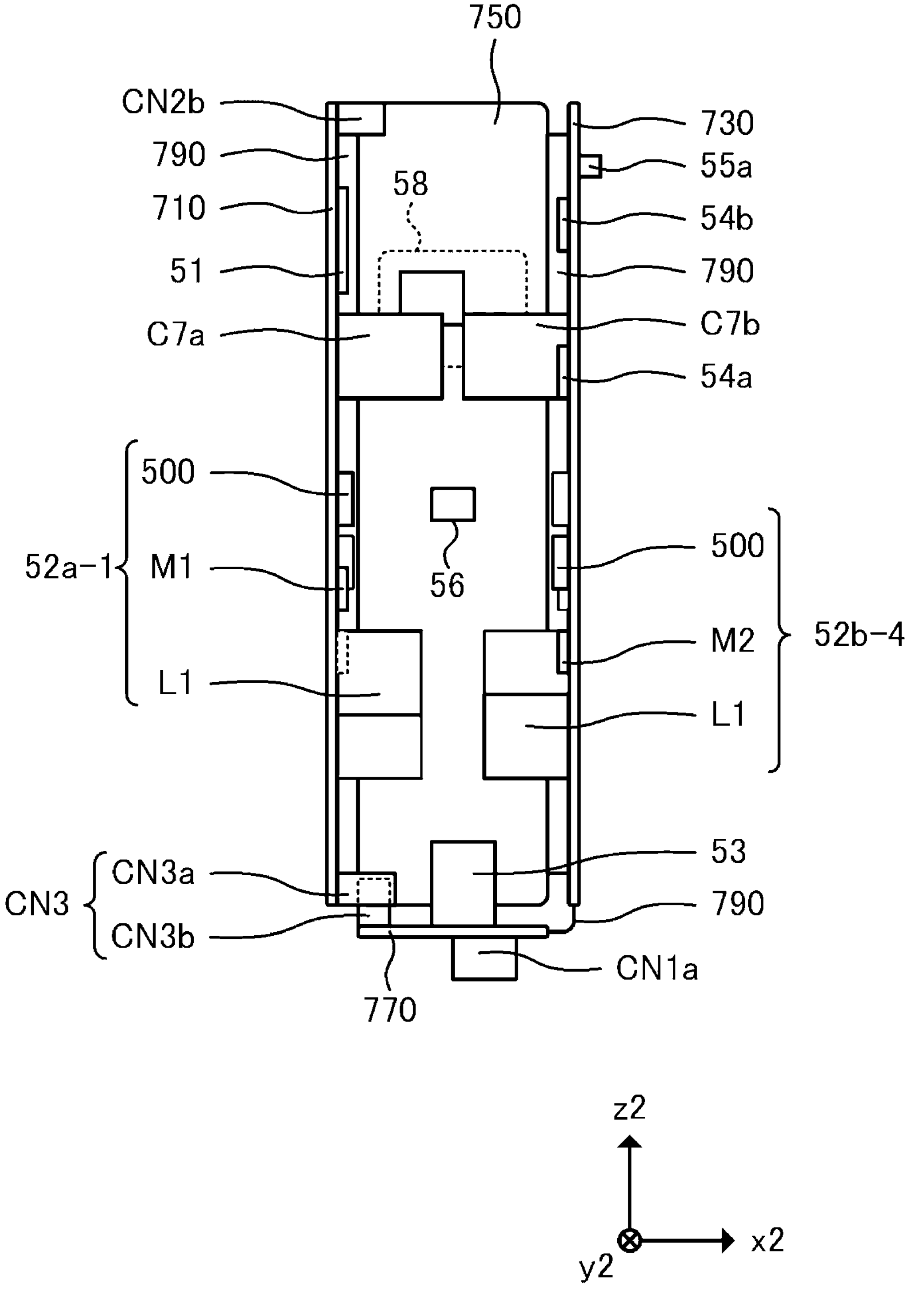
FIG. 24 is a diagram illustrating an example of component arrangement in the drive circuit substrate in an assembled state.

Next, component arrangement in an assembled state of the drive circuit substrate 700 provided with various circuits will be described. FIG. 23 is a diagram illustrating an example of component arrangement when the drive circuit substrate 700 in the assembled state is viewed from the +x2 side along the x2 axis, and FIG. 24 is a diagram illustrating an example of the component arrangement when the drive circuit substrate 700 in the assembled state is viewed from the −y2 side along the y2 axis.

As described above, in the drive circuit substrate 700 in the assembled state, the surface 723 of the rigid wiring member 710 provided with the driving signal output circuits 52*a*-1, 52*a*-2, 52*b*-1, and 52*b*-2, and the surface 743 of the rigid wiring member 730 provided in the driving signal output circuit 52*a*-3, 52*a*-4, 52*b*-3, and 52*b*-4 are positioned facing each other in the direction along the x2 axis. At this time, as illustrated in FIG. 23, when the drive circuit substrate 700 in the assembled state is viewed along the x2 axis, the driving signal output circuit 52*a*-1 provided on the surface 723 of the rigid wiring member 710 and the driving signal output circuit 52*b*-4 provided on the surface 743 of the rigid wiring member 730 are arranged overlapping with each other at least partially, and the integrated circuit 500 included in the driving signal output circuit 52*a*-1 and the integrated circuit 500 included in the driving signal output circuit 52*b*-4 are arranged not overlapping with each other.

In this case, the transistors M1 and M2 included in the driving signal output circuit 52*a*-1 may be arranged not overlapping with the transistors M1 and M2 included in the driving signal output circuit 52*b*-4 when viewed along the direction along the x2 axis. Further, the inductor L1 included in the driving signal output circuit 52*a*-1 may be arranged not overlapping with the inductor L1 included in the driving signal output circuit 52*b*-4 when viewed along the direction along the x2 axis.

Here, the fact that the driving signal output circuit 52*a*-1 and the driving signal output circuit 52*b*-4 are arranged overlapping with each other at least partially when the drive circuit substrate 700 in the assembled state is viewed along the x2 axis, means that at least one of the electronic components included in the driving signal output circuit 52*a*-1 and at least one of the electronic components included in the driving signal output circuit 52*b*-4 overlap with each other when the drive circuit substrate 700 in the assembled state is viewed along the x2 axis. For example, a case where at least one of the integrated circuit 500, the transistors M1 and M2, and the inductor L1 included in the driving signal output circuit 52*a*-1 and at least one of the integrated circuit 500, the transistors M1 and M2, and the inductor L1 included in the driving signal output circuit 52*b*-4 overlap with each other, is included.

Similarly, when the drive circuit substrate 700 in the assembled state is viewed along the x2 axis, the driving signal output circuit 52*b*-1 provided on the surface 723 of the rigid wiring member 710 and the driving signal output circuit 52*a*-4 provided on the surface 743 of the rigid wiring member 730 are arranged overlapping with each other at least partially, and the integrated circuit 500 included in the driving signal output circuit 52*b*-1 and the integrated circuit 500 included in the driving signal output circuit 52*a*-4 are arranged not overlapping with each other.

In this case, the transistors M1 and M2 included in the driving signal output circuit 52*b*-1 may be arranged not overlapping with the transistors M1 and M2 included in the driving signal output circuit 52*a*-4 when viewed along the direction along the x2 axis. Further, the inductor L1 included in the driving signal output circuit 52*b*-1 may be arranged not overlapping with the inductor L1 included in the driving signal output circuit 52*a*-4 when viewed along the direction along the x2 axis.

Here, the fact that the driving signal output circuit 52*b*-1 and the driving signal output circuit 52*a*-4 are arranged overlapping with each other at least partially when the drive circuit substrate 700 in the assembled state is viewed along the x2 axis, means that at least one of the electronic components included in the driving signal output circuit 52*b*-1 and at least one of the electronic components included in the driving signal output circuit 52*a*-4 overlap with each other when the drive circuit substrate 700 in the assembled state is viewed along the x2 axis. For example, a case where at least one of the integrated circuit 500, the transistors M1 and M2, and the inductor L1 included in the driving signal output circuit 52*b*-1 and at least one of the integrated circuit 500, the transistors M1 and M2, and the inductor L1 included in the driving signal output circuit 52*a*-4 overlap with each other, is included.

Similarly, when the drive circuit substrate 700 in the assembled state is viewed along the x2 axis, the driving signal output circuit 52*a*-2 provided on the surface 723 of the rigid wiring member 710 and the driving signal output circuit 52*b*-3 provided on the surface 743 of the rigid wiring member 730 are arranged overlapping with each other at least partially, and the integrated circuit 500 included in the driving signal output circuit 52*a*-2 and the integrated circuit 500 included in the driving signal output circuit 52*b*-3 are arranged not overlapping with each other.

In this case, the transistors M1 and M2 included in the driving signal output circuit 52*a*-2 may be arranged not overlapping with the transistors M1 and M2 included in the driving signal output circuit 52*b*-3 when viewed along the direction along the x2 axis. Further, the inductor L1 included in the driving signal output circuit 52*a*-2 may be arranged not overlapping with the inductor L1 included in the driving signal output circuit 52*b*-3 when viewed along the direction along the x2 axis.

Here, the fact that the driving signal output circuit 52*a*-2 and the driving signal output circuit 52*b*-3 are arranged overlapping with each other at least partially when the drive circuit substrate 700 in the assembled state is viewed along the x2 axis, means that at least one of the electronic components included in the driving signal output circuit 52*a*-2 and at least one of the electronic components included in the driving signal output circuit 52*b*-3 overlap with each other when the drive circuit substrate 700 in the assembled state is viewed along the x2 axis. For example, a case where at least one of the integrated circuit 500, the transistors M1 and M2, and the inductor L1 included in the driving signal output circuit 52*a*-2 and at least one of the integrated circuit

500, the transistors M1 and M2, and the inductor L1 included in the driving signal output circuit 52*b*-3 overlap with each other, is included.

Similarly, when the drive circuit substrate 700 in the assembled state is viewed along the x2 axis, the driving signal output circuit 52*b*-2 provided on the surface 723 of the rigid wiring member 710 and the driving signal output circuit 52*a*-3 provided on the surface 743 of the rigid wiring member 730 are arranged overlapping with each other at least partially, and the integrated circuit 500 included in the driving signal output circuit 52*b*-2 and the integrated circuit 500 included in the driving signal output circuit 52*a*-3 are arranged not overlapping with each other.

In this case, the transistors M1 and M2 included in the driving signal output circuit 52*b*-2 may be arranged not overlapping with the transistors M1 and M2 included in the driving signal output circuit 52*a*-3 when viewed along the direction along the x2 axis. Further, the inductor L1 included in the driving signal output circuit 52*b*-2 may be arranged not overlapping with the inductor L1 included in the driving signal output circuit 52*a*-3 when viewed along the direction along the x2 axis.

Here, the fact that the driving signal output circuit 52*b*-2 and the driving signal output circuit 52*a*-3 are arranged overlapping with each other at least partially when the drive circuit substrate 700 in the assembled state is viewed along the x2 axis, means that at least one of the electronic components included in the driving signal output circuit 52*b*-2 and at least one of the electronic components included in the driving signal output circuit 52*a*-3 overlap with each other when the drive circuit substrate 700 in the assembled state is viewed along the x2 axis. For example, a case where at least one of the integrated circuit 500, the transistors M1 and M2, and the inductor L1 included in the driving signal output circuit 52*b*-2 and at least one of the integrated circuit 500, the transistors M1 and M2, and the inductor L1 included in the driving signal output circuit 52*a*-3 overlap with each other, is included.

Further, as illustrated in FIG. 23, in the drive circuit substrate 700 in the assembled state, the connector CN3*a* provided on the rigid wiring member 710 and the connector CN3*b* provided on the rigid wiring member 770 are fitted to each other, and accordingly, the rigid wiring member 710 is fixed to the rigid wiring member 770. As a result, the assembled state of the drive circuit substrate 700 having a substantially box shape is held by the connector CN3*a* and the connector CN3*b*. That is, the drive circuit substrate 700 has the connector CN3*a* provided on the rigid wiring member 710 and the connector CN3*b* provided on the rigid wiring member 770, the connector CN3*a* and the connector CN3*b* are fitted to each other, the rigid wiring member 710 is fixed to the rigid wiring member 770, and accordingly, the assembled state of the drive circuit substrate 700 is held. In other words, the connector CN3 including the connector CN3*a* and the connector CN3*b* functions as a holding member for holding the drive circuit substrate 700 in the assembled state.

As a result, the drive circuit substrate 700 does not need to be provided with a framework for holding the assembled state in a substantially box shape, and therefore, the mounting area of the drive circuit substrate 700 in the liquid discharge apparatus 1 can be further reduced, and it is possible to realize further dense arrangement of the drive circuit substrate 700 and further size reduction of the liquid discharge apparatus 1.

Further, the connector CN3*a* and the connector CN3*b* are fitted to each other to configure the connector CN3 which is a BtoB connector that electrically couples the rigid wiring member 710 and the rigid wiring member 770. That is, the rigid wiring member 710 and the rigid wiring member 770 are electrically coupled to each other via the connector CN3*a* and the connector CN3*b*. As a result, the signal generated by the circuit provided on the rigid wiring member 710 can be supplied to the rigid wiring member 770 via the connector CN3*a* and the connector CN3*b* without going through the rigid wiring members 730 and 750. Accordingly, the propagation path through which the signal generated by the circuit provided on the rigid wiring member 710 propagates to the rigid wiring member 770 can be shortened, and the concern that noise is superimposed on the signal is reduced. As a result, the accuracy of the signal is improved.

At this time, the signals propagating via the connector CN3*a* and the connector CN3*b* include the clock signal SCK, which is a part of the signal generated by the rigid wiring member 710 and is output by the discharge control circuit 51 configured with the FPGA, and the differential print data signal Dpt are preferable. In other words, the clock signal SCK and the differential print data signal Dpt preferably propagate to the print head 30 via the connector CN3*a* and the connector CN3*b*.

The clock signal SCK and the differential print data signal Dpt output by the discharge control circuit 51 configured with the FPGA are low voltage signals that are easily affected by noise, and are signals that control the operation of the print head 30. Therefore, a case where noise is superimposed is directly related to the discharge accuracy of the ink from the print head 30. By propagating the signals via the connector CN3*a* and the connector CN3*b*, the accuracy of the clock signal SCK and the differential print data signal Dpt input to the print head 30 is improved, and the ink discharge accuracy is improved.

2.2.3.3 Structure of Relay Substrate

Figure 25:
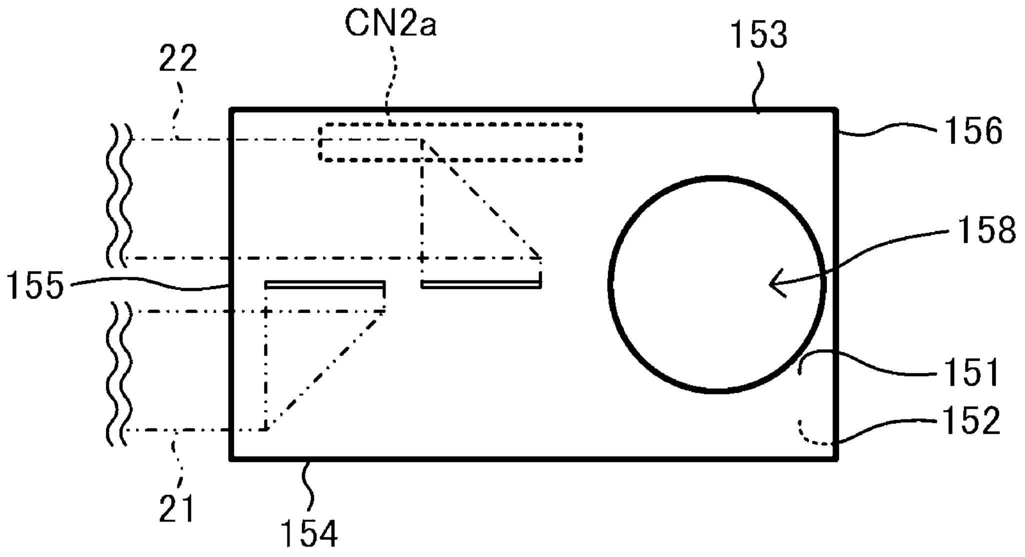
FIG. 25 is a plan view illustrating an example of a structure of a relay substrate.
Figure 26:
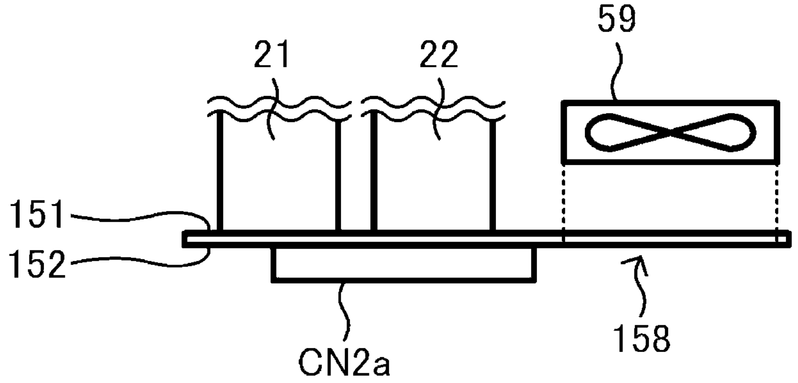
FIG. 26 is a side view illustrating an example of the structure of the relay substrate.

Next, the structure of the relay substrate 150 included in the drive circuit module 50 will be described. FIG. 25 is a plan view illustrating an example of the structure of the relay substrate 150, and FIG. 26 is a side view illustrating an example of the structure of the relay substrate 150. As illustrated in FIGS. 25 and 26, the relay substrate 150 includes a surface 151, a surface 152 opposite to the surface 151, and sides 153, 154, 155, and 156. Further, in the relay substrate 150, the side 153 and the side 154 are positioned facing each other, the side 155 and the side 156 are positioned facing each other, the side 153 is positioned to intersect both the side 155 and the side 156, and the side 154 is positioned to intersect both the side 155 and the side 156.

The other end of the FFC cable 21 and the other end of the FFC cable 22 are electrically coupled to the surface 151 of the relay substrate 150. The FFC cable 21 propagates the voltage signal VHV and the voltage signal VMV supplied to the drive circuit substrate 700, and the FFC cable 22 propagates the clock signal SCK, the differential print data signal Dp, and the differential drive data signal Dd supplied to the drive circuit substrate 700. That is, the FFC cable 21 includes a plurality of signal wirings including a signal wiring propagating the voltage signal VHV and a signal wiring propagating the voltage signal VMV, and the FFC cable 22 includes a plurality of signal wiring including a signal wiring propagating the clock signal SCK, a signal wiring propagating the differential print data signal Dp, and a signal wiring propagating the differential drive data signal Dd. Here, the FFC cable 21 and the FFC cable 22 may be electrically coupled to the relay substrate 150 via an FFC connector (not illustrated), or may be electrically coupled to the relay substrate 150 by solder or the like.

The connector CN2*a* is provided on the surface 152 of the relay substrate 150. The connector CN2*a* is fitted to the connector CN2*b* provided on the drive circuit substrate 700. As a result, the relay substrate 150 and the drive circuit substrate 700 are electrically coupled. That is, the connector CN2*a* and the connector CN2*b* configure the connector CN2 which is a BtoB connector that directly electrically couples the relay substrate 150 and the drive circuit substrate 700 without using a cable.

The voltage signal VHV and the voltage signal VMV propagating through the FFC cable 21, the clock signal SCK propagating through the FFC cable 22, the differential print data signal Dp, and the differential drive data signal Dd are input to the relay substrate 150 configured as described above. The relay substrate 150 propagates the input voltage signal VHV, the voltage signal VMV, the clock signal SCK, the differential print data signal Dp, and the differential drive data signal Dd to the connector CN2*a*. Then, the voltage signal VHV, the voltage signal VMV, the clock signal SCK, the differential print data signal Dp, and the differential drive data signal Dd propagated to the connector CN2*a* are input to the drive circuit substrate 700 via the connector CN2*b*.

As described above, the plurality of signals propagated through the FFC cable 21 and the FFC cable 22 are input to the relay substrate 150. The relay substrate 150 propagates the input signal and outputs the signal to the drive circuit substrate 700 via the connector CN2 which is a BtoB connector. That is, the relay substrate 150 propagates the signal input via the plurality of cables. The relay substrate 150 outputs the signal via the number of connectors smaller than the number of cables through which the signal propagates, preferably one connector.

As a result, even when the number of cables coupled to the liquid discharge module 20 increases, only by attaching and detaching the connector CN1*a* provided on the relay substrate 150 and the connector CN1*b* provided on the drive circuit substrate 700, the drive circuit substrate 700 included in the liquid discharge module 20 and the print head 30 electrically coupled to the drive circuit substrate 700 can be easily attached to and detached from the liquid discharge apparatus 1. As a result, workability at the time of replacement, maintenance, and assembly of the drive circuit substrate 700 and the print head 30 electrically coupled to the drive circuit substrate 700 is improved. As a result, the convenience of the liquid discharge apparatus 1 is improved.

Further, since the drive circuit substrate 700 and the print head 30 included in the liquid discharge module 20 can be easily attached and detached, it is possible to reduce the space to be secured when the attachment and detachment is performed. As a result, the liquid discharge modules 20 included in the liquid discharge apparatus 1 can be further densely arranged, and as a result, further size reduction of the liquid discharge apparatus 1 can be realized.

In the liquid discharge apparatus 1 configured as described above, among the connector CN2 which is a BtoB connector for electrically coupling the relay substrate 150 and the drive circuit substrate 700, the connector CN2*a* provided on the relay substrate 150 is preferably a straight type connector, and the connector CN2*b* provided on the drive circuit substrate 700 is preferably a right-angle type connector. As a result, when attaching and detaching the connector CN2*a* of the relay substrate 150 to and from the connector CN2*b* of the drive circuit substrate 700, the relay substrate 150 may be moved along the normal direction of the surface 152, and a space to be secured at the time of attachment and detachment can be further reduced. As a result, the liquid discharge modules 20 included in the liquid discharge apparatus 1 can be further densely arranged, and further size reduction of the liquid discharge apparatus 1 can be realized.

In the relay substrate 150, the number of times of attachment/detachment between the connector CN2*a* and the connector CN2*b* is preferably larger than the number of times of attachment/detachment of the FFC cable 21 electrically coupled to the relay substrate 150, and preferably larger than the number of times of attachment/detachment of the FFC cable 22 electrically coupled to the relay substrate 150.

Here, the number of times of attachment/detachment means the number of times of attachment/detachment that can satisfy the desired reliability for the electrical coupling, and is defined based on, for example, the wear condition of the terminal plating of the contact portion that may occur due to attachment and detachment, the exposed condition of the base of the terminal plating, and the like. Specifically, the number of times of attachment/detachment between the connector CN2*a* and the connector CN2*b* may be the number of times of insertion/removal defined based on the specifications of the connector CN2*a* and the connector CN2*b*. The number of times of attachment/detachment of the FFC cables 21 and 22 may be the number of times of insertion/removal of the FFC connector even when the FFC cables 21 and 22 are electrically coupled to the relay substrate 150 via the FFC connector, and may be the number of times of soldering based on soldering conditions of the FFC cables 21 and 22 even when the FFC cables 21 and 22 are directly electrically coupled to the relay substrate 150 by soldering or the like.

The relay substrate 150 of the present embodiment outputs a signal propagated via the FFC cables 21 and 22 from the connector CN2*a*, and accordingly, the liquid discharge module 20 can be attached and detached by attaching and detaching only the connector CN2*a*. By making the number of times of attachment/detachment of the connector CN2*a* is larger than the number of times of attachment/detachment of the FFC cables 21 and 22, even when the relay substrate 150 is repeatedly attached and detached, the concern that the reliability of the electrical coupling of the relay substrate 150 and the drive circuit substrate 700 with the print head 30 is impaired is reduced. As a result, the operational stability of the liquid discharge module 20 and the reliability of the liquid discharge apparatus 1 are improved.

Further, the relay substrate 150 has the through-hole 158 that penetrates the surface 151 and the surface 152. A part of the cooling fan 59 is inserted through the through-hole 158. Accordingly, the cooling fan 59 is fixed to the relay substrate 150 in a state where at least a part of the cooling fan 59 is inserted through the through-hole 158. That is, the relay substrate 150 and the cooling fan 59 are integrally configured. Therefore, when the relay substrate 150 is removed from the drive circuit substrate 700, the cooling fan 59 is also separated from the drive circuit substrate 700 together with the relay substrate 150, and when the relay substrate 150 is attached to the drive circuit substrate 700, the cooling fan 59 is also attached to the drive circuit substrate 700 together with the relay substrate 150.

As a result, even when the cooling fan 59 is used for cooling the drive circuit substrate 700, the concern that the cooling fan 59 hinders the attachment and detachment of the relay substrate 150 from the drive circuit substrate 700 and the print head 30 is reduced. Although it is described that the cooling fan 59 of the present embodiment is inserted through the through-hole 158 formed in the relay substrate 150 to be fixed to the relay substrate 150, but the cooling fan 59 may be fixed to the relay substrate 150 by a holding member (not illustrated) or the like that fixes the cooling fan 59 to the relay substrate 150.

Further, when the cooling fan 59 is fixed to the relay substrate 150, the fan driving signal Fp for driving the cooling fan 59 is preferably supplied to the cooling fan 59 without being supplied to the drive circuit substrate 700. Specifically, the fan driving signal Fp for driving the cooling fan 59 propagate through the FFC cable 21 together with the voltage signals VHV and VMV, and is supplied to the relay substrate 150. Then, the fan driving signal Fp propagates through the relay substrate 150 and is supplied to the cooling fan 59. In other words, the FFC cable 21 includes a signal wiring that propagates the voltage signal VHV for driving the drive circuit substrate 700, a signal wiring that propagates the voltage signal VMV for driving the drive circuit substrate 700, and a signal wiring that propagates the fan driving signal Fp for driving the cooling fan 59, and the signal wiring that propagates the fan driving signal Fp for driving the cooling fan 59 is electrically coupled to the relay substrate 150, and the fan driving signal Fp propagates through the relay substrate 150 and is input to the cooling fan 59.

When the relay substrate 150 and the cooling fan 59 are integrally configured, by propagating the fan driving signal Fp for driving the cooling fan 59 through the relay substrate 150 and supplying the fan driving signal Fp to the cooling fan 59, there is no need to provide a wiring for propagating the fan driving signal Fp on the drive circuit substrate 700, and as a result, the concern that the drive circuit substrate 700 becomes large is reduced. That is, the concern that the drive circuit substrate 700 becomes large can be reduced, and the detachability of the liquid discharge apparatus 1 can be maintained.

Although not illustrated, the fan driving signal Fp for driving the cooling fan 59 may be supplied to the cooling fan 59 without propagating through the relay substrate 150 in a state where the cooling fan 59 is fixed to the relay substrate 150. Specifically, the fan driving signal Fp for driving the cooling fan 59 propagates through the FFC cable 21 together with the voltage signals VHV and VMV. At this time, the signal wiring for propagating the fan driving signal Fp branches from the FFC cable 21, and the branched signal wiring is directly electrically coupled to the cooling fan 59. Accordingly, the fan driving signal Fp is supplied to the cooling fan 59 without propagating through the relay substrate 150. In other words, the FFC cable 21 may include a signal wiring that propagates the voltage signal VHV for driving the drive circuit substrate 700, a signal wiring that propagates the voltage signal VMV for driving the drive circuit substrate 700, and a signal wiring that propagates the fan driving signal Fp for driving the cooling fan 59, the signal wiring that propagates the fan driving signal Fp for driving the cooling fan 59 may be electrically coupled to the cooling fan 59, and the fan driving signal Fp is input to the cooling fan 59 without propagating through the relay substrate 150.

When the relay substrate 150 and the cooling fan 59 are integrally configured, even when the fan driving signal Fp for driving the cooling fan 59 is directly supplied to the cooling fan 59 without propagating through the relay substrate 150, there is no need to provide a wiring for propagating the fan driving signal Fp on the drive circuit substrate 700, and as a result, the concern that the drive circuit substrate 700 becomes large is reduced. That is, even when the cooling fan 59 is used for cooling the drive circuit substrate 700, the concern that the drive circuit substrate 700 becomes large can be reduced, and the detachability of the liquid discharge apparatus 1 can be maintained.

As described above, when the fan driving signal Fp for driving the cooling fan 59 propagates through the relay substrate 150 and is supplied to the cooling fan 59 when the relay substrate 150 and the cooling fan 59 are integrally configured, and when the fan driving signal Fp for driving the cooling fan 59 is directly supplied to the cooling fan 59 without propagating through the relay substrate 150 when the relay substrate 150 and the cooling fan 59 are integrally configured, the concern that the size of the drive circuit substrate 700 becomes large is reduced, and an effect that the detachability of the liquid discharge apparatus 1 can be maintained is achieved.

Further, when the relay substrate 150 and the cooling fan 59 are integrally configured, and when the fan driving signal Fp for driving the cooling fan 59 propagates through the relay substrate 150 and is supplied to the cooling fan 59, by providing a predetermined circuit on the relay substrate 150, it is possible to adjust the voltage value of the fan driving signal Fp and remove noise contained in the fan driving signal Fp. As a result, the driving accuracy of the cooling fan 59 can be improved, and the operational stability of various circuits included in the drive circuit substrate 700 is improved. As a result, the discharge accuracy of the ink from the print head 30 is improved.

On the other hand, when the relay substrate 150 and the cooling fan 59 are integrally configured, and when the fan driving signal Fp for driving the cooling fan 59 is directly supplied to the cooling fan 59 without propagating through the relay substrate 150, there is no need to provide a wiring for propagating the fan driving signal Fp on the relay substrate 150, and accordingly, the size of the relay substrate 150 can be reduced. As a result, the liquid discharge modules 20 can be further densely arranged, and the size of the liquid discharge apparatus 1 can be further reduced.

2.2.3.4 Structure of Drive Circuit Module

Figure 27:
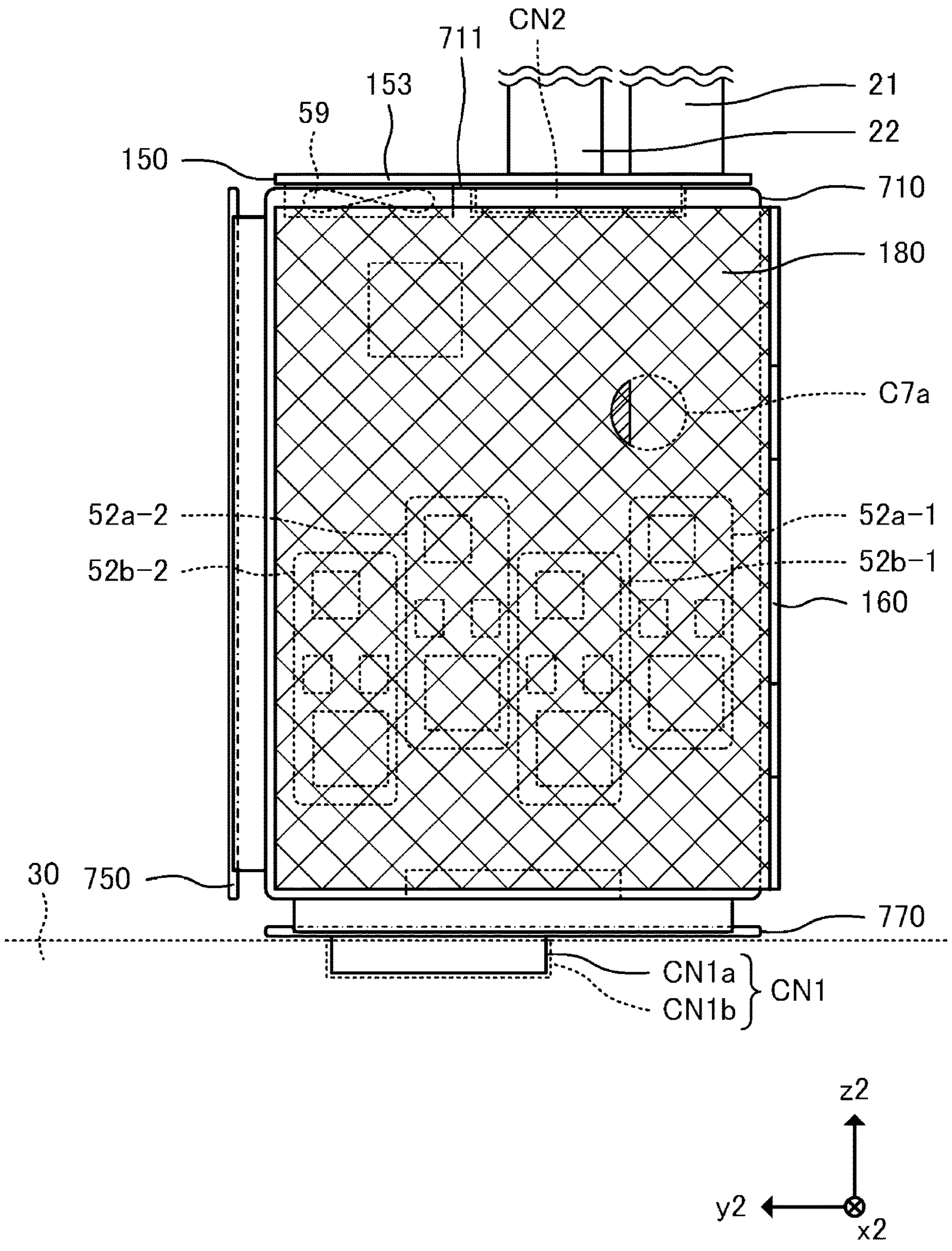
FIG. 27 is a view of the drive circuit module viewed from a −x2 side along an x2 axis.
Figure 28:
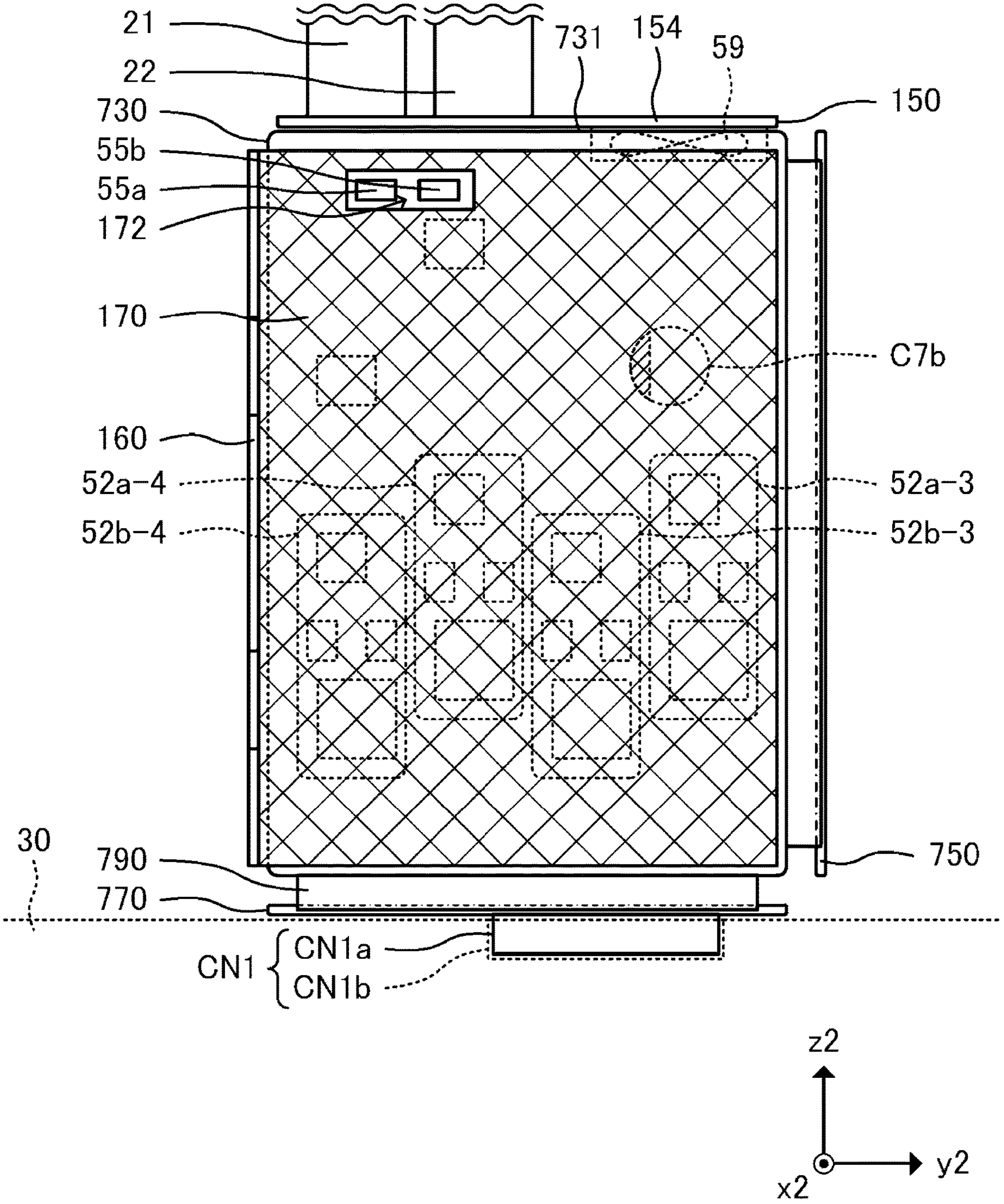
FIG. 28 is a view of the drive circuit module viewed from a +x2 side along the x2 axis.
Figure 29:
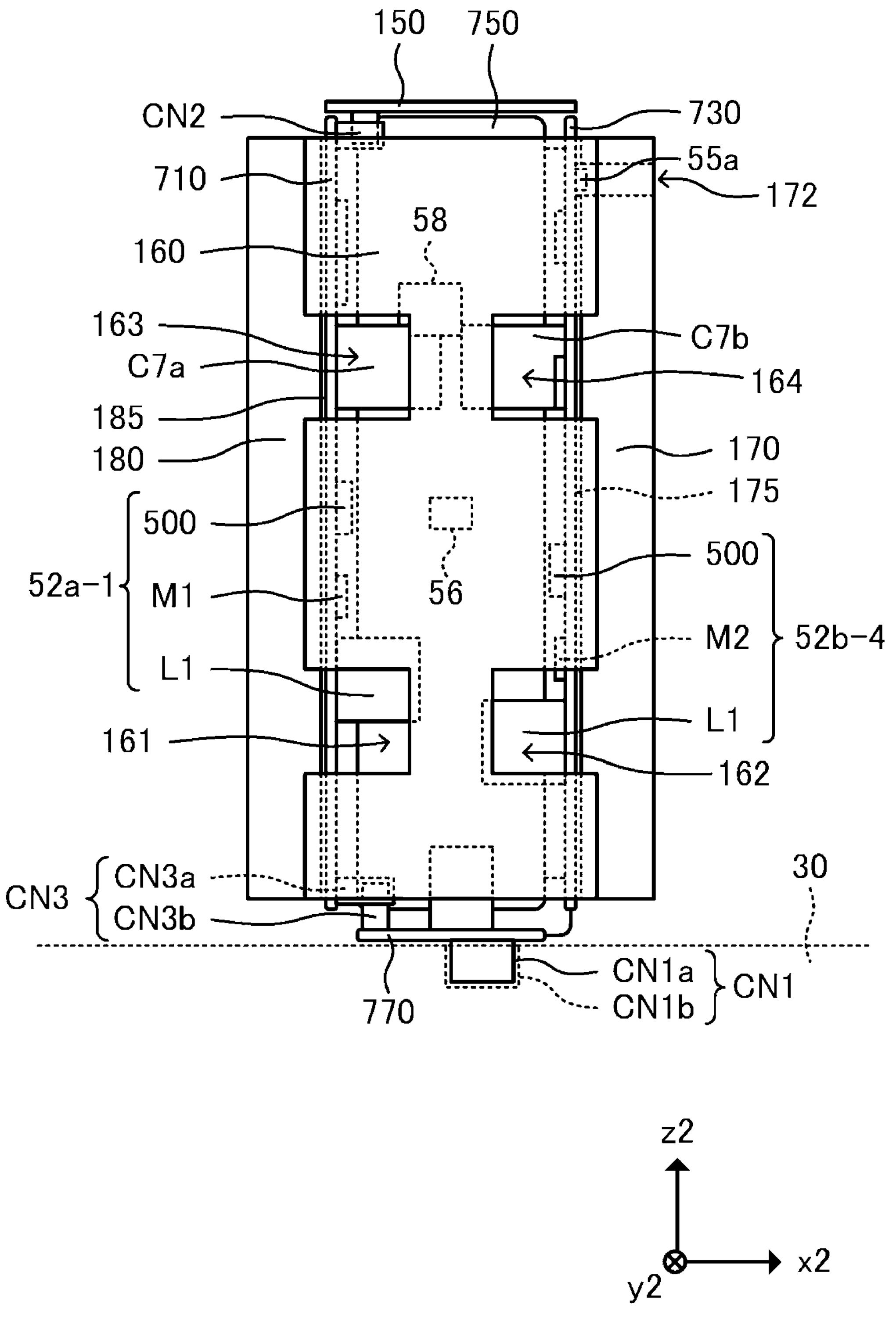
FIG. 29 is a view of the drive circuit module viewed from a −y2 side along a y2 axis.
Figure 30:
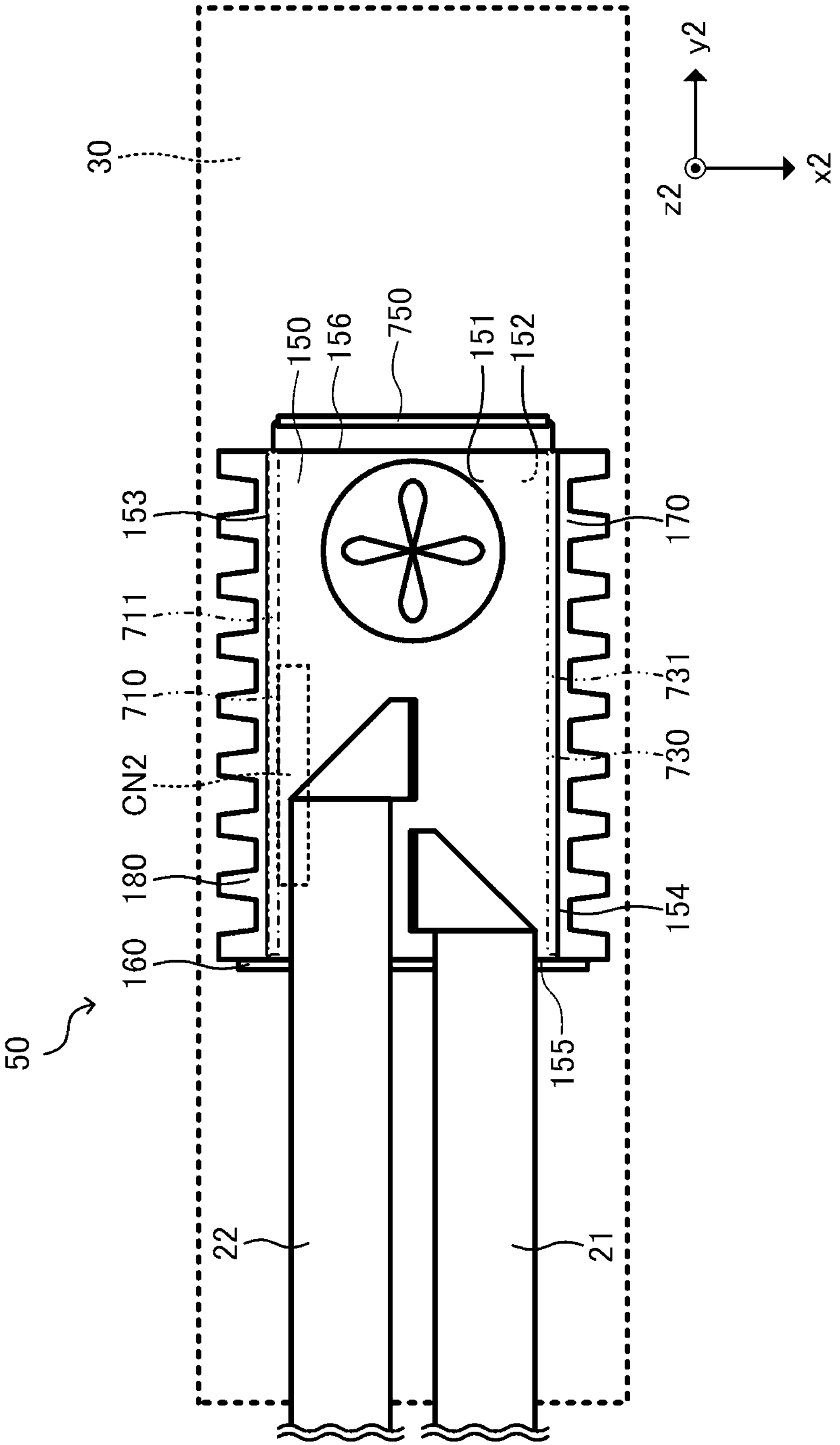
FIG. 30 is a view of the drive circuit module viewed from a +z2 side along a z2 axis.

The structure of the drive circuit module 50 having the drive circuit substrate 700 and the relay substrate 150 configured as described above will be described. FIG. 27 is a view of the drive circuit module 50 viewed from the −x2 side along the x2 axis. FIG. 28 is a view of the drive circuit module 50 viewed from the +x2 side along the x2 axis. FIG. 29 is a view of the drive circuit module 50 viewed from the −y2 side along the y2 axis. FIG. 30 is a view of the drive circuit module 50 viewed from the +z2 side along the z2 axis. Here, FIGS. 27 to 30 show a part of the print head 30 to which the drive circuit module 50 is coupled in addition to the drive circuit module 50 by a broken line.

As illustrated in FIGS. 27 and 29, the heat sink 180 is positioned on the outer surface side of the drive circuit substrate 700 on the −x2 side and on the surface 724 side of the rigid wiring member 710 included in the drive circuit substrate 700. The heat sink 180 is attached to the rigid wiring member 710. At this time, as illustrated in FIG. 29, the heat conductive member 185 is positioned between the heat sink 180 and the surface 724 of the rigid wiring member 710. As a result, the adhesion between the heat sink 180 and the surface 724 is improved, heat generated in the rigid wiring member 710 including the surface 724 can be efficiently released, and the insulation performance between the heat sink 180 and the surface 724 can be improved. That is, the heat sink 180 is positioned closer to the surface 724 than the surface 723 of the rigid wiring member 710 and closer to the rigid member 722 than the rigid members 721, 741, and 742 in the direction along the x2 axis, and is attached to the rigid wiring member 710. The heat conductive member 185 is positioned between the heat sink 180 and the surface 724 of the rigid wiring member 710 and is in contact with both the heat sink 180 and the surface 724 of the rigid wiring member 710. The heat sink 180 and the heat conductive member 185 release the heat generated in various circuits provided on the rigid wiring member 710 into the atmosphere.

Here, when the drive circuit module 50 is viewed from the −x2 side to the +x2 side along the x2 axis, at least a part of the heat sink 180 and the heat conductive member 185 is positioned overlapping with the driving signal output circuits 52*a*-1, 52*b*-1, 52*a*-2, and 52*b*-2 provided on the rigid wiring member 710. The driving signal output circuits 52*a*-1, 52*b*-1, 52*a*-2, and 52*b*-2 are circuits having a large heat generation amount among the circuits provided on the rigid wiring member 710, the heat sink 180 and the heat conductive member 185 are positioned overlapping with the driving signal output circuits 52*a*-1, 52*b*-1, 52*a*-2, and 52*b*-2, and accordingly, the heat generated in the rigid wiring member 710 can be efficiently released into the atmosphere.

Further, as illustrated in FIGS. 28 and 29, the heat sink 170 is positioned on the outer surface side of the drive circuit substrate 700 on the +x2 side and on the surface 744 side of the rigid wiring member 730 included in the drive circuit substrate 700. The heat sink 170 is attached to the rigid wiring member 730. At this time, as illustrated in FIG. 29, the heat conductive member 175 is positioned between the heat sink 170 and the surface 744 of the rigid wiring member 730. As a result, the adhesion between the heat sink 170 and the surface 744 is improved, heat generated in the rigid wiring member 730 including the surface 744 can be efficiently released, and the insulation performance between the heat sink 170 and the surface 744 can be improved.

That is, the heat sink 170 is positioned closer to the surface 744 than the surface 743 of the rigid wiring member 730 and closer to the rigid member 742 than the rigid members 721, 722, and 741 in the direction along the x2 axis, and is attached to the rigid wiring member 730. The heat conductive member 175 is positioned between the heat sink 170 and the surface 744 of the rigid wiring member 730 and is in contact with both the heat sink 170 and the surface 744 of the rigid wiring member 730. The heat sink 170 and the heat conductive member 175 release the heat generated in various circuits provided on the rigid wiring member 730 into the atmosphere.

Here, when the drive circuit module 50 is viewed from the +x2 side to the −x2 side along the x2 axis, at least a part of the heat sink 170 and the heat conductive member 175 is positioned overlapping with the driving signal output circuits 52*a*-3, 52*b*-3, 52*a*-4, and 52*b*-4 provided on the rigid wiring member 730. The driving signal output circuits 52*a*-3, 52*b*-3, 52*a*-4, and 52*b*-4 are circuits having a large heat generation amount among the circuits provided on the rigid wiring member 730, the heat sink 170 and the heat conductive member 175 are positioned overlapping with the driving signal output circuits 52*a*-3, 52*b*-3, 52*a*-4, and 52*b*-4, and accordingly, the heat generated in the rigid wiring member 730 can be efficiently released into the atmosphere.

Further, the abnormality notification circuits 55*a* and 55*b* are positioned on the surface 744 of the rigid wiring member 730 where the heat sink 170 and the heat conductive member 175 are positioned. In other words, the abnormality notification circuits 55*a* and 55*b* are surfaces 744 of the rigid wiring member 730 and are provided on the rigid member 742.

Here, as described above, the abnormality notification circuit 55*a* is turned on, is turned off, or blinks based on the result of the abnormality detection in the abnormality detection circuit 54*a*, and the abnormality detection circuit 54*a* detects whether or not the voltage value of the voltage signal VHV is normal. Further, the abnormality notification circuit 55*b* is turned on, is turned off, or blinks based on the result of an abnormality detection in the abnormality detection circuit 54*b*, and the abnormality detection circuit 54*b* detects whether or not the voltage value of the voltage signal VDD generated based on the voltage signal VMV is normal. That is, the abnormality notification circuit 55*a* detects the presence or absence of an abnormality in the voltage values of the voltage signal VHV that functions as the power supply voltage of the driving signal output circuits 52*a*-1 to 52*a*-4 and 52*b*-1 to 52*b*-4 and the print head 30, and the abnormality notification circuit 55*b* detects the presence or absence of an abnormality in the power supply voltage supplied to the FPGA that configures the discharge control circuit 51. Therefore, the heat sink 170 and the heat conductive member 175 are attached to the rigid wiring member 730 such that the user can visually recognize the state where the abnormality notification circuits 55*a* and 55*b* are turned on. The abnormality detection circuits 54*a* and 54*b* may detect various abnormalities of the drive circuit module 50 in addition to the abnormalities of the voltage signals VHV and VDD described above, and the abnormality notification circuits 55*a* and 55*b* may notify various abnormalities of the drive circuit module 50 in addition to the abnormalities of the voltage signals VHV and VDD described above.

Specifically, as illustrated in FIGS. 28 and 29, the heat sink 170 has an opening 172. When the heat sink 170 is attached to the rigid wiring member 730, the opening 172 is provided at a position overlapping the abnormality notification circuits 55*a* and 55*b* provided on the surface 744 of the rigid wiring member 730. That is, when the drive circuit substrate 700 is viewed along the direction from the rigid member 742 to the rigid member 741, the abnormality notification circuits 55*a* and 55*b* are positioned overlapping with at least a part of the opening 172. As a result, the user is visually notified whether or not an abnormality occurred in the drive circuit module 50 while reducing the concern that the heat release efficiency of the rigid wiring member 730 by the heat sink 170 and the heat conductive member 175 is reduced. The opening 172 may be a notch or the like as long as the heat sink 170 and the heat conductive member 175 are not arranged at the positions where the abnormality notification circuits 55*a* and 55*b* are arranged when the drive circuit substrate 700 is viewed along the direction from the rigid member 742 to the rigid member 741.

Here, as described above, at least a part of the heat sink 170 and the heat conductive member 175 may be positioned overlapping with the driving signal output circuits 52*a*-3, 52*b*-3, 52*a*-4, and 52*b*-4. Therefore, when viewed along the direction from the rigid member 742 to the rigid member 741, the abnormality notification circuits 55*a* and 55*b* are positioned not overlapping with the driving signal output circuits 52*a*-3, 52*b*-3, 52*a*-4, and 52*b*-4. As a result, the user is visually notified whether or not an abnormality occurred in the drive circuit module 50 while reducing the concern that the heat release efficiency of the rigid wiring member 730 by the heat sink 170 and the heat conductive member 175 is reduced.

Further, as illustrated in FIGS. 27, 28, and 30, the relay substrate 150 is positioned on the +z2 side of the drive circuit substrate 700 and is electrically coupled to the drive circuit substrate 700 via the connector CN2. At this time, the relay substrate 150 is provided on the +z2 side of the drive circuit substrate 700 such that the side 153 is positioned along the side 711 of the rigid wiring member 710, the side 154 is positioned along the side 731 of the rigid wiring member 730, and the normal direction of the surface 152 of the relay substrate 150 intersects both the normal direction of the surface 723 of the rigid wiring member 710 and the normal direction of the surface 743 of the rigid wiring member 730. That is, the relay substrate 150 is provided to configure one surface of a substantially box shape configured by the drive circuit substrate 700. At this time, the surface 151 of the relay substrate 150 configures the outer surface of the substantially box shape, and the surface 152 of the relay substrate 150 configures the inner surface of the substantially box shape. At this time, the cooling fan 59 fixed to the relay substrate 150 blows the air on the surface 151 side of the relay substrate 150 to the surface 152 side of the relay substrate 150, or blows the air on the surface 152 side of the relay substrate 150 to the surface 151 side of the relay substrate 150. As a result, the cooling fan 59 generates an air flow toward the surface 783 of the rigid wiring member 770 on the inside of the drive circuit substrate 700 having a substantially box shape, and in a space between the surface 723 included in the rigid wiring member 710 of the drive circuit substrate 700 and the surface 743 included in the rigid wiring member 730 facing each other. In other words, the drive circuit substrate 700 having a substantially box shape includes the gas flow path having the surface 723 included in the rigid wiring member 710, the surface 743 included in the rigid wiring member 730, and the surface 783 included in the rigid wiring member 770, and the cooling fan 59 provided on the relay substrate 150 generates an air flow in the gas flow path. Then, the cooling fan 59 cools the driving signal output circuits 52*a*-1 to 52*a*-4 and 52*b*-1 to 52*b*-4 by the air flow. In other words, the cooling fan 59 generates an air flow that cools the driving signal output circuits 52*a*-1 to 52*a*-4 and 52*b*-1 to 52*b*-4. As a result, even when the drive circuit substrate 700 is assembled in the substantially box shape, the gas inside the substantially box shape circulates, and the cooling efficiencies of the driving signal output circuits 52*a*-1 to 52*a*-4 and 52*b*-1 to 52*b*-4 arranged inside the substantially box shape can be further improved.

In this case, the capacitor C7*a* provided on the rigid wiring member 710 and the capacitor C7*b* provided on the rigid wiring member 730 are preferably provided in the vicinity of the cooling fan 59. The capacitors C7*a* and C7*b* configured as electrolytic capacitors have a larger component height and a smaller contact area with the drive circuit substrate 700 than the integrated circuit 500 and the transistors M1 and M2 configured as surface-mounted components. Therefore, the amount of heat generated by the capacitors C7*a* and C7*b* released to the drive circuit substrate 700 is small. By arranging the capacitors C7*a* and C7*b* in the vicinity of the cooling fan 59, the capacitors C7*a* and C7*b* can be efficiently cooled by the air flow generated by the cooling fan 59. As a result, the cooling efficiency of the capacitors C7*a* and C7*b* is improved, and the rising temperature of the drive circuit module 50 is reduced.

In other words, the shortest distance between the capacitor C7*a* and the cooling fan 59 is shorter than the shortest distance between the transistors M1 and M2 and the cooling fan 59, the shortest distance between the capacitor C7*b* and the cooling fan 59 is shorter than the shortest distance between the transistors M1 and M2 and the cooling fan 59. Accordingly, the cooling efficiency of the capacitors C7*a* and C7*b* is improved, and as a result, the temperature rise of the drive circuit module 50 is reduced.

Further, as illustrated in FIGS. 27, 28, and 29, the opening plate 160 is positioned on the −y2 side of the drive circuit substrate 700 in the assembled state. The opening plate 160 is a plate-shaped member extending in the x2z2 plane, and openings 161, 162, 163, and 164 penetrating the plate-shaped member are formed on the opening plate 160. Then, as illustrated in FIG. 29, the opening plate 160 configures one surface having a substantially box shape of the drive circuit substrate 700 in the assembled state. Further, when the opening plate 160 is viewed along the normal direction of the opening plate 160 which is a plate-shaped member, the opening 161 is positioned overlapping with at least a part of the inductor L1 of the driving signal output circuit 52*a*-1 and at least a part of the inductor L1 of the driving signal output circuit 52*a*-2, the opening 162 is positioned overlapping with at least a part of the inductor L1 of the driving signal output circuit 52*b*-4 and at least a part of the inductor L1 of the driving signal output circuit 52*b*-3, the opening 163 is positioned overlapping with at least a part of the capacitor C7*a*, and the opening 164 is positioned overlapping with at least a part of the capacitor C7*b*.

The air flow generated inside the drive circuit substrate 700 in the assembled state by the cooling fan 59 passes through the openings 161, 162, 163, and 164. At this time, the flow speed of the air flow generated inside the drive circuit substrate 700 becomes the fastest in the vicinity of the openings 161, 162, 163, and 164. The inductor L1 included in each of the driving signal output circuits 52*a*-1, 52*a*-2, 52*b*-4, and 52*b*-3 having large component heights in the vicinity of the openings 161, 162, 163, and 164 having such a large flow speed, and the capacitors C7*a* and C7*b* are positioned, and accordingly, the inductor L1 and the capacitors C7*a* and C7*b* can be efficiently cooled by the air flow generated by the cooling fan 59.

The electronic components having a large component height such as the inductor L1 included in the driving signal output circuit 52 and the capacitors C7*a* and C7*b* have a smaller contact area with the drive circuit substrate 700, and therefore, the amount of heat released to the drive circuit substrate 700 is small as compared with the surface-mounted component such as the integrated circuit 500 or the transistors M1 and M2. Therefore, there is a possibility that the inductor L1 and the capacitors C7*a* and C7*b* included in the driving signal output circuit 52 having a large component height cannot be sufficiently cooled only by the heat sinks 170 and 180 attached to the drive circuit substrate 700.

By arranging the inductor L1 and the capacitors C7*a* and C7*b* having such a large component height in the vicinity of the openings 161, 162, 163, and 164 having a high flow speed of the air flow, the inductor L1 having a large component height and the capacitors C7*a* and C7*b* can be efficiently cooled by the air flow generated by the cooling fan 59, and as a result, the rising temperature of the drive circuit module 50 is reduced.

In this case, preferably, the opening plate 160 is arranged such that the inductor L1 of the driving signal output circuit 52*a*-1 does not cover the entire opening 161, the inductor L1 of the driving signal output circuit 52*b*-4 does not cover the entire opening 162, the capacitor C7*a* does not cover the entire opening 163, and the capacitor C7*b* does not cover the entire opening 164.

That is, when viewed along the normal direction of the opening plate 160 which is a plate-shaped member, preferably, the opening plate 160 is positioned such that at least a part of the opening 161 does not overlap with the inductor L1 of the driving signal output circuit 52*a*-1, at least a part of the opening 162 does not overlap with the inductor L1 of the driving signal output circuit 52*b*-4, at least a part of the opening 163 does not overlap with the capacitor C7*a*, and at least a part of the opening 164 does not overlap with the capacitor C7*b*.

As a result, the concern that the air flow passing through the openings 161, 162, 163, and 164 is blocked by the inductor L1 of the driving signal output circuit 52*a*-1, the inductor L1 of the driving signal output circuit 52*b*-4, the capacitor C7*a*, and the capacitor C7*b* is reduced, and the concern that a local temperature rise occurs in the drive circuit module 50 is reduced.

As described above, the drive circuit module 50 includes the drive circuit substrate 700, the relay substrate 150, the opening plate 160, and the heat sinks 170 and 180 attached to the drive circuit substrate 700. The drive circuit module 50 operates based on various signals input via the relay substrate 150 to generate various control signals for controlling the operation of the print head 30, and outputs the control signals to the print head 30 via the connector CN1.

The size of the drive circuit module 50 when viewed along the z2 axis is smaller than the size when the print head 30 is viewed from the connector CN1*b* to the discharge section 600, and as illustrated in FIG. 30, the drive circuit module 50 is arranged inside the print head 30 in a state where the connector CN1*a* is attached to the print head 30. That is, in the drive circuit substrate 700 included in the drive circuit module 50, the sizes of the rigid member 781 and the rigid member 782 when the rigid wiring member 770 is viewed along the direction from the rigid member 781 to the rigid member 782 is smaller than the size of the print head 30 when viewed along the direction from the connector CN1*b* to the discharge section 600, the drive circuit substrate 700 included in the drive circuit module 50 is positioned inside the print head 30 in a state where the drive circuit substrate 700 is electrically coupled to the print head 30 by the connectors CN1*a* and CN1*b*.

As a result, when the liquid discharge module 20 having the drive circuit substrate 700 and the print head 30 electrically coupled to the drive circuit substrate 700 is attached to the liquid discharge apparatus 1, the concern that the arrangement of the liquid discharge modules 20 will be restricted due to the size of the drive circuit substrate 700 on which many circuit components are provided is reduced. As a result, the liquid discharge modules 20 included in the liquid discharge apparatus 1 can be further densely arranged, and the concern that the liquid discharge apparatus 1 becomes large is reduced.

Further, as described above, in the drive circuit substrate 700 of the present embodiment, the size of the rigid wiring member 710 when the drive circuit substrate 700 is viewed along the z1 axis and the size of the rigid wiring member 730 when the drive circuit substrate 700 is viewed along the z1 axis is substantially equal. The size of the rigid wiring member 750 when the drive circuit substrate 700 is viewed along the z1 axis is smaller than the size of the rigid wiring member 710 when the drive circuit substrate 700 is viewed along the z1 axis and the size of the rigid wiring member 730 when the drive circuit substrate 700 is viewed along the z1 axis. The size of the rigid wiring member 770 when the drive circuit substrate 700 is viewed along the z1 axis is smaller than the size of the rigid wiring member 710 when the drive circuit substrate 700 is viewed along the z1 axis and the size of the rigid wiring member 730 when the drive circuit substrate 700 is viewed along the z1 axis. In other words, the size of the rigid member 781 when the drive circuit substrate 700 is viewed along the direction from the rigid member 781 to the rigid member 782 is smaller than the size of the rigid member 721 when viewed along the direction from the rigid member 721 to the rigid member 722, and smaller than the size of the rigid member 741 when viewed along the direction from the rigid member 741 to the rigid member 742.

As a result, it is possible to increase the mounting area of the electronic component on the drive circuit substrate 700 included in the liquid discharge module 20. As a result, even when the number of components mounted on the drive circuit substrate 700 increases due to the increase in the number of discharge sections 600 included in the print head 30, the liquid discharge modules 20 included in the liquid discharge apparatus 1 can be densely arranged, and the concern that the liquid discharge apparatus 1 becomes large is reduced.

Here, the drive circuit module 50 is an example of a substrate unit. Further, the piezoelectric element 60 included in the discharge module 32-1 is an example of a first piezoelectric element, the discharge section 600 included in the discharge module 32-1 is an example of a first discharge section, the piezoelectric element 60 included in the discharge module 32-1 is an example of a second piezoelectric element, and the discharge section 600 included in the discharge module 32-1 is an example of a second discharge section. Further, the connector CN1*b* is an example of a first connector, the connector CN1*a* is an example of a second connector, the connector CN3*a* is an example of a first fixing member, and the connector CN3*b* is an example of a second fixing member. Further, the drive circuit substrate 700 is an example of a wiring substrate, the electronic components that configure various circuits provided on the drive circuit substrate 700 are examples of a plurality of circuit components, the rigid members 721, 722, 741, 742, 761, 762, 781, and 782 included in the drive circuit substrate 700 are examples of a plurality of rigid members, and the flexible wiring member 790 is an example of a flexible member. Further, the rigid member 721 is an example of a first rigid member, the rigid member 741 is an example of a second rigid member, the rigid member 781 is an example of a third rigid member, the rigid member 782 is an example of a fourth rigid member, the rigid member 722 is an example of a fifth rigid member, the rigid member 742 is an example of a sixth rigid member, the surface 723 of the rigid member 721 is an example of a first front surface, the surface 743 of the rigid member 741 is an example of a second front surface, the surface 783 of the rigid member 781 is an example of a third front surface, the surface 784 of the rigid member 782 is an example of a fourth front surface, the surface 724 of the rigid member 722 is an example of a fifth front surface, and the surface 744 of the rigid member 742 is an example of a sixth front surface. Further, the surface 791 of the flexible wiring member 790 is an example of a first surface, the surface 792 of the flexible wiring member 790 is an example of a second surface, and the region 701 of the flexible wiring member 790 is an example of a first region, the region 705 of the flexible wiring member 790 is an example of a second region, the region 707 of the flexible wiring member 790 is an example of a third region, at least one of the regions 702 and 704 of the flexible wiring member 790 is an example of a fourth region, and the region 706 of the flexible wiring member 790 is an example of a fifth region. The driving signal output circuit 52*a*-1 provided on the drive circuit substrate 700 is an example of a first drive circuit, the driving signal VOUT based on the driving signal COMA1 output by the driving signal output circuit 52*a*-1, which is the trapezoidal waveform Adp1 or the trapezoidal waveform Adp2 of the driving signal COMA1, is an example of a first driving signal, the driving signal output circuit 52*a*-3 provided on the drive circuit substrate 700 is an example of a second drive circuit, the driving signal VOUT based on the driving signal COMA3 output by the driving signal output circuit 52*a*-3, which is the trapezoidal waveform Adp1 or the trapezoidal waveform Adp2 of the driving signal COMA3, is an example of a second driving signal, and any one of the clock signal SCK, the differential print data signal Dp, and the differential drive data signal Dd are examples of a print head control signal.

3. Operational Effect

As described above, the liquid discharge apparatus 1 of the present embodiment includes the print head 30 that discharges an ink, and the drive circuit substrate 700 that is electrically coupled to the print head 30. In addition, the drive circuit substrate 700 includes the rigid wiring member 710 including the rigid members 721 and 722 provided with a plurality of circuit components, the rigid wiring member 730 including rigid members 741 and 742, the rigid wiring member 750 including the rigid members 761 and 762, the rigid wiring member 770 including the rigid members 781 and 782, and the flexible wiring member 790 more flexible than the rigid wiring members 710, 730, 750, and 770. The rigid members 721, 722, 741, 742, 761, 762, 781, and 782 are laminated on the flexible wiring member 790, and accordingly, the rigid wiring members 710, 730, 750, and 770 are electrically coupled to each other by the flexible wiring member 790.

At this time, in the rigid wiring member 710 and the rigid wiring member 730, the rigid member 721 included in the rigid wiring member 710 and the rigid member 741 included in the rigid wiring member 730 are arranged such that the surface 723 and the surface 743 face each other when the flexible wiring member 790 is bent in the regions 702 and 704. As a result, in the liquid discharge module 20, the region occupied by the drive circuit substrate 700 electrically coupled to the print head 30 can be reduced, the liquid discharge modules 20 can be densely arranged, and the size reduction of the liquid discharge apparatus 1 including the plurality of liquid discharge modules 20 can be realized.

Further, the rigid wiring member 770 of the drive circuit substrate 700 is positioned such that the normal direction of the surface 783 of the rigid member 781 included in the rigid wiring member 770 intersects both the normal direction of the surface 723 of the rigid member 721 included in the rigid wiring member 710, and the normal direction of the surface 743 of the rigid member 741 included in the rigid wiring member 730. That is, the rigid wiring member 770 is positioned to cover at least a part of a region between the rigid wiring member 710 and the rigid wiring member 730 positioned facing each other. Accordingly, the concern about ink mist entering the region between the rigid wiring member 710 and the rigid wiring member 730 is reduced. As a result, the concern that ink mist adheres to various circuits provided on the drive circuit substrate 700 is reduced, the operational stability of various circuits provided on the drive circuit substrate 700 is improved, and the operational stability of the print head 30 that operates based on the output signals of the various circuits provided on the drive circuit substrate 700 is also improved. Therefore, the discharge accuracy of the ink discharged from the print head 30 is improved.

Further, the rigid wiring member 770 is provided with the connector CN1*a* that is electrically coupled to the print head 30. The connector CN1*a* is fitted to the connector CN1*b* provided on the print head 30 to electrically couple the drive circuit substrate 700 and the print head 30. That is, the drive circuit substrate 700 and the print head 30 are electrically coupled by the connector CN1 which is a BtoB connector. As a result, the impedance of the propagation path through which the signal output by the drive circuit substrate 700 and input to the print head 30 propagates is reduced. As a result, the accuracy of the signal input to the print head 30 is improved, and the discharge accuracy of the ink discharged from the print head 30 is improved.

In the drive circuit substrate 700 configured as described above, the circuit configured with various circuit components provided on the rigid members 721, 722, 741, 742, 761, 762, 781, and 782, and the wiring wh2 through which the voltage signal VHV as the power supply voltage of the driving signal selection circuit 200 included in the print head 30 propagates, are continuously provided over the region 701 in which the rigid members 721 and 722 are laminated, the region 703 in which the rigid members 761 and 762 are laminated, the region 705 in which the rigid members 741 and 742 are laminated, the region 702 positioned between the region 701 and the region 703, and the region 704 positioned between the region 703 and the region 705, in the flexible wiring member 790. That is, the voltage signal VHV propagates through the wiring wh2 without passing through the via wiring and is supplied to the rigid wiring member 710, the rigid wiring member 730, and the rigid wiring member 750. As a result, the concern that signals of different wiring layers are superimposed as noise on the voltage signals VHV supplied to the rigid wiring member 710, the rigid wiring member 730, and the rigid wiring member 750 is reduced. That is, the accuracy of the voltage signal VHV supplied to the various circuits provided on the rigid wiring member 710, various circuits provided on the rigid wiring member 730, and the various circuits provided on the rigid wiring member 750 is improved, and the operational stability of various circuits provided in the rigid wiring member 710, various circuits provided on the rigid wiring member 730, and various circuits provided on the rigid wiring member 750 is improved. As a result, the accuracy of the output signal output by various circuits provided on the rigid wiring member 710, various circuits provided on the rigid wiring member 730, and various circuits provided on the rigid wiring member 750 is improved, the operation of the print head 30 that operates based on the output signal is stabilized, and the discharge accuracy of the ink discharged from the print head 30 is improved.

Further, in the liquid discharge apparatus 1 of the present embodiment, the wiring wh2 through which the voltage signal VHV propagates is provided continuously and linearly over the region 701, the region 703, and the region 705 in the direction from the region 701 to the region 705 of the flexible wiring member 790. The voltage signal VHV functions as a power supply voltage of the driving signal selection circuit 200 included in the print head 30 and the circuit composed of various circuit components provided on the rigid member 721, 722, 741, 742, 761, 762, 781, and 782. Therefore, a large amount of current flows through the wiring wh2 through which the voltage signal VHV propagates. By making the wiring wh2 linear, the concern that the current density based on the voltage signal VHV propagating through the wiring wh2 is biased is reduced, and the concern that the voltage value of the voltage signal VHV fluctuates is reduced. As a result, the accuracy of the voltage signal VHV supplied to the various circuits provided on the rigid wiring members 710, 730, and 750 is improved, and the operational stability of the various circuits provided on the rigid wiring members 710, 730, and 750 is improved. As a result, the accuracy of the output signal output by various circuits provided on the rigid wiring members 710, 730, and 750 is improved, the operation of the print head 30 that operates based on the output signal is further stabilized, and the discharge accuracy of the ink discharged from the print head 30 is further improved. Here, the linear shape includes the case where the wiring wh2 is provided along the virtual straight line from the region 701 to the region 705 in the drive circuit substrate 700 in the expanded state.

Further, the rigid member 721 of the rigid wiring member 710 and the rigid member 741 of the rigid wiring member 730 are provided with the driving signal output circuits 52*a*-1 to 52*a*-4 and 52*b*-1 to 52*b*-4. The driving signal output circuits 52*a*-1 to 52*a*-4 and 52*b*-1 to 52*b*-4 generate driving signals COMA1 to COMA4 and COMB1 to COMB4 by performing class D amplification based on the voltage signal VHV. The accuracy of the voltage signal VHV input to the rigid members 721 and 741 provided with the driving signal output circuits 52*a*-1 to 52*a*-4 and 52*b*-1 to 52*b*-4 is improved, and accordingly, the accuracy of the driving signals COMA1 to COMA4 and COMB1 to COMB4 output by the driving signal output circuits 52*a*-1 to 52*a*-4 and 52*b*-1 to 52*b*-4 is also improved. As a result, the discharge accuracy of the ink discharged from the print head 30 is further improved.

Further, the size of the rigid wiring member 770 having the connector CN1*a* electrically coupled to the connector CN1*b* of the print head 30 when viewed along the direction from the rigid member 781 to the rigid member 782 is smaller than the size of the print head 30 when viewed along the direction from the connector CN1*b* to the discharge section 600, and accordingly, the liquid discharge modules 20 including the drive circuit substrate 700 and the print head 30 can be densely arranged, and as a result, the size of the liquid discharge apparatus 1 provided with the plurality of liquid discharge modules 20 can be further reduced.

At this time, the drive circuit substrate 700 has the connectors CN3*a* and CN3*b*, the connector CN3*a* is provided on the rigid wiring member 710, and the connector CN3*b* is provided on the rigid wiring member 770. Then, in the drive circuit substrate 700 in the assembled state, the substantially box shape is held by fitting the connector CN3*a* and the connector CN3*b*. As a result, a holding member for holding the shape of the drive circuit substrate 700 in the assembled state is not required, and the size of the drive circuit module 50 including the drive circuit substrate 700 can be further reduced. As a result, the liquid discharge modules 20 including the drive circuit module 50 can be further densely arranged, and as a result, the size of the liquid discharge apparatus 1 provided with the plurality of liquid discharge modules 20 can be further reduced.

Further, the connectors CN3*a* and CN3*b* of the drive circuit substrate 700 are fitted to electrically couple the rigid wiring member 710 and the rigid wiring member 770. As a result, the signal generated by the rigid wiring member 710 can propagate to the rigid wiring member 770 without passing through the rigid wiring members 730 and 750. As a result, the number of wiring patterns provided on the drive circuit substrate 700 can be reduced, and the size of the drive circuit substrate 700 can be further reduced. As a result, the liquid discharge modules 20 including the drive circuit module 50 can be further densely arranged, and as a result, the size of the liquid discharge apparatus 1 provided with the plurality of liquid discharge modules 20 can be further reduced.

At this time, the clock signal SCK and the differential print data signal Dpt output by the discharge control circuit 51 included in the FPGA provided on the drive circuit substrate 700 are input to the print head 30 via the connectors CN1*a* and CN1*b* and the rigid wiring member 770. The clock signal SCK and the differential print data signal Dpt are signals having a small voltage value, the clock signal SCK and the differential print data signal Dpt can propagate to the rigid wiring member 770 via the connectors CN3*a* and CN3*b* without passing through the rigid wiring members 730 and 750, and accordingly, the signal accuracy of the clock signal SCK and the differential print data signal Dpt input to the print head 30 is improved. As a result, the discharge accuracy of the ink from the print head 30 is further improved.

Further, in the drive circuit module 50, the rigid wiring member 710 and the rigid wiring member 730 included in the drive circuit substrate 700 are positioned such that the surface 723 and the surface 743 face each other, the heat sink 180 is positioned on the surface 724 of the rigid wiring member 710, the heat sink 170 is positioned on the surface 744 of the rigid wiring member 730, and the cooling fan 59 generates an air flow in the region between the rigid wiring member 710 and the rigid wiring member 730 positioned facing each other. As a result, the drive circuit substrate 700 is cooled from both surfaces of the drive circuit substrate 700 by both the heat dissipation effect due to the air flow generated by the cooling fan 59 and the heat release effect due to the heat sinks 170 and 180, the cooling efficiency, which is the heat release efficiency of the drive circuit substrate 700, is improved, and the operational stability of various circuits provided on the drive circuit substrate 700 is further improved. As a result, the signal accuracy of the output signal output by the drive circuit substrate 700 is improved, and the discharge accuracy of ink from the print head 30 that discharges an ink based on the output signals of various circuits provided on the drive circuit substrate 700 is also improved.

At this time, the heat conductive member 185 having insulation performance is positioned between the heat sink 180 and the surface 724 of the rigid wiring member 710, and the heat conductive member 175 having insulation performance is positioned between the heat sink 170 and the surface 744 of the rigid wiring member 730. The heat conductive member 185 is in contact with both the surface 724 and the heat sink 180, and the heat conductive member 175 is in contact with both the surface 744 and the heat sink 170. As a result, the adhesion and insulation performance between the heat sink 170 and the rigid wiring member 730 are improved, and the adhesion and insulation performance between the heat sink 180 and the rigid wiring member 710 are improved. As a result, the heat release performance by the heat sinks 170 and 180 is further improved, the heat release efficiency of the drive circuit substrate 700, which is the cooling efficiency, is further improved, the insulation performance between the heat sinks 170 and 180 and the drive circuit substrate 700 is improved, and the operational stability of various circuits provided on the drive circuit substrate 700 is further improved.

Further, in the drive circuit substrate 700 in the present embodiment, the rigid wiring member 770 of the drive circuit substrate 700 is positioned such that the normal direction of the surface 783 of the rigid member 781 included in the rigid wiring member 770 intersects both the normal direction of the surface 723 of the rigid member 721 included in the rigid wiring member 710, and the normal direction of the surface 743 of the rigid member 741 included in the rigid wiring member 730, to configure a part of the gas flow path of the gas generated by the cooling fan 59. At this time, the cooling fan 59 generates an air flow toward the rigid wiring member 770. As a result, the cooling fan 59 can also cool the electronic components that configure the circuit provided on the rigid wiring member 770. Thereby, the operational stability of various circuits provided on the drive circuit substrate 700 is further improved.

Further, in the drive circuit module 50 configured as described above, the driving signal output circuits 52*a*-1, 52*a*-2, 52*b*-1, and 52*b*-2 that output the driving signals COMA1, COMA2, COMB1, and COMB2 are provided on the surface 723 of the rigid wiring member 710, and the driving signal output circuits 52*a*-3, 52*a*-4, 52*b*-3, and 52*b*-4 that output the driving signals COMA3, COMA4, COMB3, and COMB4 are provided on the surface 743 of the rigid wiring member 730. The driving signal output circuits 52*a*-1 to 52*a*-4 and 52*b*-1 to 52*b*-4 supply the driving signals COMA1 to COMA4 and COMB1 to COMB4 based on the voltage signal VHV to each of the plurality of discharge sections 600, and thus a large amount of heat is generated. Even when the drive circuit substrate 700 is provided with the driving signal output circuits 52*a*-1 to 52*a*-4 and 52*b*-1 to 52*b*-4 having such a large amount of heat generation, the drive circuit substrate 700 of the present embodiment is cooled by both the heat dissipation effect by an air flow generated by the cooling fan 59 and the heat release effect by the heat sinks 170 and 180, and accordingly, the operational stability of the driving signal output circuits 52*a*-1 to 52*a*-4 and 52*b*-1 to 52*b*-4 is further improved.

Further, the drive circuit substrate 700 is provided with the capacitors C7*a* and C7*b* which are electrolytic capacitors. In the capacitors C7*a* and C7*b*, the drive circuit substrate 700 is provided such that the shortest distance between the capacitors C7*a* and C7*b* and the cooling fan 59 is shorter than the shortest distance between the transistors M1 and M2 included in the driving signal output circuit 52 and the cooling fan 59. The component heights of the capacitors C7*a* and C7*b*, which are electrolytic capacitors, are larger than those of the surface mount-type transistors M1 and M2. Therefore, the cooling is performed via the drive circuit substrate 700, and the cooling effect is small due to the heat release by the heat sinks 170 and 180. By arranging the capacitors C7*a* and C7*b* close to the cooling fan 59, the capacitors C7*a* and C7*b* can be cooled. As a result, the operational stability of various circuits provided on the drive circuit substrate 700 is further improved.

Further, the drive circuit module 50 has a plate-shaped opening plate 160 having the opening 161 and the opening 162 through which the air flow generated by the cooling fan 59 passes. When viewed along the normal direction of the opening plate 160, the opening plate 160 is positioned such that the opening 161 overlaps with at least a part of the inductor L1 of the driving signal output circuit 52*a*-1, and the opening 162 overlaps with at least a part of the inductor L1 of the driving signal output circuit 52*a*-1. When the air flow generated by the cooling fan 59 passes through the openings 161 and 162, the flow speed of the air flow increases. By providing the inductor L1 included in the driving signal output circuit 52 having a large component height in a region where the flow speed of the air flow generated by the cooling fan 59 increases, the cooling efficiency of the inductor L1 can be improved, and the operational stability of various circuits provided on the drive circuit substrate 700 is improved. As a result, the signal accuracy of the output signal output by the drive circuit substrate 700 is improved, and the discharge accuracy of ink from the print head 30 that discharges an ink based on the output signals of various circuits provided on the drive circuit substrate 700 is also improved.

Further, since the flow speed of the air flow generated by the cooling fan 59 when passing through the openings 161 and 162 can be increased, a sufficient cooling capacity can be obtained even with the small cooling fan 59. As a result, the concern that the discharge accuracy of the ink discharged from the print head 30 is lowered due to the vibration that may occur when the cooling fan 59 is driven is reduced.

Further, the drive circuit module 50 includes the relay substrate 150 in which the FFC cable 21 through which the voltage signals VHV and VMV propagate and the FFC cable 22 through which the clock signal SCK, the differential print data signal Dp, and the differential drive data signal Dd propagate are electrically coupled on the surface 151, and the connector CN2*a* electrically coupled to the drive circuit substrate 700 is provided on the surface 152 opposite to the surface 151. That is, a signal propagated through the FFC cables 21 and 22 is input to the relay substrate 150 and output to the drive circuit substrate 700 via the connector CN2*a*. As a result, the drive circuit substrate 700 can be attached to and detached from the liquid discharge apparatus 1 only by attaching and detaching the connectors CN2*a* and CN2*b*, and the work efficiency of the maintenance work, the replacement work, and the assembly work of the drive circuit substrate 700 can be improved.

Further, since the drive circuit substrate 700 can be attached to and detached from the liquid discharge apparatus 1 only by attaching and detaching the connectors CN2*a* and CN2*b*, the space to be secured for the attachment and detachment can be reduced. As a result, the liquid discharge modules 20 can be further densely arranged, and as a result, the size of the liquid discharge apparatus 1 can be further reduced.

Further, a cooling fan 59 is fixed to the relay substrate 150. As a result, the drive circuit substrate 700 can be attached to and detached from the liquid discharge apparatus 1, and the cooling fan 59 can be attached and detached. As a result, it is not necessary to provide the drive circuit substrate 700 with wiring that propagates the fan driving signal Fp for driving the cooling fan 59, and the size of the drive circuit substrate 700 can be reduced.

Further, the drive circuit module 50 includes the temperature detection circuit 56 that detects the environmental temperature of the drive circuit module 50 and the internal space temperature of the drive circuit module 50, and the control unit 2 and the head control circuit 12 control the operations of the drive circuit module 50 and the print head 30 based on the environmental temperature detected by the temperature detection circuit 56. That is, in the liquid discharge apparatus 1 of the present embodiment, the temperatures of various circuits included in the drive circuit module 50 are not detected individually, but the internal space temperature of the drive circuit module 50 that changes according to the operating state of the drive circuit module 50 is detected by the temperature detection circuit 56 as the environmental temperature. The control unit 2 and the head control circuit 12 control the operations of the drive circuit module 50 and the print head 30 based on the environmental temperature detected by the temperature detection circuit 56. As a result, it is not necessary to individually provide a temperature detector such as a sensor element for each electronic component or the like included in the drive circuit module 50, and the size of the drive circuit module 50 can be reduced. As a result, the liquid discharge modules 20 can be further densely arranged, and the size of the liquid discharge apparatus 1 can be further reduced.

The temperature detection circuit 56 is provided on the rigid wiring member 750 positioned between the rigid wiring member 710 provided with the driving signal output circuits 52*a*-1, 52*a*-2, 52*b*-1, and 52*b*-2, and the rigid wiring member 730 provided in the driving signal output circuit 52*a*-3, 52*a*-4, 52*b*-3, and 52*b*-4 in the drive circuit substrate 700. As a result, the concern that the contribution of the temperature change that can occur in the driving signal output circuits 52*a*-1 to 52*a*-4 and 52*b*-1 to 52*b*-4, which generate a large amount of heat, with respect to the environmental temperature detected by the temperature detection circuit 56 becomes extremely high is reduced. That is, the detection accuracy of the environmental temperature detected by the temperature detection circuit 56 is improved. Therefore, the accuracy of operation control of the control unit 2, the drive circuit module 50 by the head control circuit 12, and the print head 30, based on the environmental temperature detected by the temperature detection circuit 56, is improved, and the discharge accuracy of the ink discharged from the print head 30 is improved.

Further, in the drive circuit substrate 700, the driving signal output circuit 52*a*-1 and the driving signal output circuit 52*b*-1 provided on the rigid wiring member 710 each have the integrated circuit 500, the transistors M1 and M2, and the inductor L1, and the driving signal output circuit 52*a*-1 and the driving signal output circuit 52*b*-1 are positioned overlapping with each other at least partially along the direction from the side 713 to the side 714. At this time, the integrated circuit 500 included in the driving signal output circuit 52*a*-1 and the integrated circuit 500 included in the driving signal output circuit 52*b*-1 are arranged not overlapping with each other along the direction from the side 713 to the side 714. As a result, the concern that a local high temperature part is generated in the drive circuit substrate 700 due to the concentration of the heat generated in the driving signal output circuit 52*a*-1 and the heat generated in the driving signal output circuit 52*b*-1 is reduced.

Further, in the drive circuit substrate 700 according to the present embodiment, the driving signal output circuit 52*b*-4 provided on the rigid wiring member 730 includes the integrated circuit 500, the transistors M1 and M2, and the inductor L1. The driving signal output circuit 52*a*-1 and the driving signal output circuit 52*b*-4 are positioned overlapping with each other at least partially along the x2 axis. The integrated circuit 500 included in the driving signal output circuit 52*a*-1 and the integrated circuit 500 included in the driving signal output circuit 52*b*-4 are arranged not overlapping with each other along the x2 axis. As a result, even in the drive circuit substrate 700 in the assembled state, the concern that a local high temperature part is generated in the drive circuit substrate 700 due to the concentration of the heat generated in the driving signal output circuit 52*a*-1 and the heat generated in the driving signal output circuit 52*b*-4 is reduced.

That is, in the liquid discharge apparatus 1 of the present embodiment, the driving signal output circuits 52*a*-1 to 52*a*-4 and 52*b*-1 to 52*b*-4 having a large heat generation amount are arranged in a staggered manner. As a result, in the drive circuit substrate 700, the concern that local heat concentration occurs is reduced, and as a result, the waveform accuracy of the driving signals COMA1 to COMA4 and COMB1 to COMB4 output by the drive circuit substrate 700 to the print head 30 is improved, and the discharge accuracy of the ink discharged from the print head 30 is improved.

In this case, the transistors M1 and M2 included in the driving signal output circuit 52*a*-1 and the transistors M1 and M2 included in the driving signal output circuit 52*b*-1 are arranged not overlapping with each other along the direction from the side 713 to the side 714, the transistors M1 and M2 included in the driving signal output circuit 52*a*-1 and the transistors M1 and M2 included in the driving signal output circuit 52*b*-4 are arranged not overlapping with each other along the x2 axis, and accordingly, the heat concentration in the drive circuit substrate 700 can be further reduced. In addition, the inductor L1 included in the driving signal output circuit 52*a*-1 and the inductor L1 included in the driving signal output circuit 52*b*-1 are arranged not overlapping with each other along the direction from the side 713 to the side 714, the inductor L1 included in the driving signal output circuit 52*a*-1 and the inductor L1 included in the driving signal output circuit 52*b*-4 are arranged not overlapping with each other along the x2 axis, and accordingly, the heat concentration in the drive circuit substrate 700 can be further reduced.

Further, a capacitor C53, which is an electrolytic capacitor for stabilizing the voltage value of the reference voltage signal VBS, is provided on the surface 783 of the rigid wiring member 770 of the drive circuit substrate 700, and the connector CN1*a* electrically coupled to the print head 30 is provided on the surface 784 of the rigid wiring member 770 of the drive circuit substrate 700. That is, the voltage value of the reference voltage signal VBS is stabilized in the rigid wiring member 770 provided with the connector CN1*a* electrically coupled to the print head 30. As a result, the stability of the voltage value of the reference voltage signal VBS supplied to the print head 30 is improved, the displacement accuracy of the piezoelectric element 60 included in the print head 30 is improved, and the discharge accuracy of the ink discharged by the displacement of the piezoelectric element 60 is improved.

Further, the reference voltage signal VBS supplied to the electrode 612 of the piezoelectric element 60 is commonly supplied to the piezoelectric element 60 to which the driving signal VOUT based on the driving signals COMA1 and COMB1 is supplied, the piezoelectric element 60 to which the driving signal VOUT based on the driving signals COMA2 and COMB2 is supplied, the piezoelectric element 60 to which the driving signal VOUT based on the driving signals COMA3 and COMB3 is supplied, and the piezoelectric element 60 to which the driving signal VOUT based on the driving signals COMA4 and COMB4 is supplied. The reference voltage signal VBS is supplied from one reference voltage signal output circuit 530. As a result, even the piezoelectric element 60 to which the driving signal VOUT based on the different driving signal COM is supplied can be driven based on the common reference potential, the displacement accuracy of the piezoelectric element 60 included in the print head 30 can be improved, and the discharge accuracy of the ink discharged by the displacement of the piezoelectric element 60 is improved.

Further, the drive circuit module 50 includes the abnormality notification circuits 55*a* and 55*b*. The abnormality notification circuits 55*a* and 55*b* are provided on the surfaces 744 of the rigid wiring member 730 of the drive circuit substrate 700, which is the surface 744 of the rigid member 742 included in the rigid wiring member 730. That is, the abnormality notification circuit 55 is provided on the outer surface of the drive circuit substrate 700 in the assembled state, which is configured in a substantially box shape. As a result, the user can visually confirm the abnormality of the liquid discharge module 20, and the reliability of the liquid discharge module 20 and the liquid discharge apparatus 1 is improved.

At this time, as described above, the heat sink 170 is positioned on the surface 744 of the rigid wiring member 730 of the drive circuit substrate 700, which is the surface 744 of the rigid member 742 included in the rigid wiring member 730. On the surface 744 of the rigid wiring member 730 of the drive circuit substrate 700, which is the surface 744 of the rigid member 742 included in the rigid wiring member 730, along the direction from the rigid member 742 to the rigid member 741, the abnormality notification circuits 55*a* and 55*b* are positioned not overlapping with the driving signal output circuit 52, and the heat sink 170 is positioned overlapping with the driving signal output circuit 52. Accordingly, the visibility of the abnormality notification circuits 55*a* and 55*b* is not impaired, and the heat generated in the driving signal output circuit 52 can be released. As a result, the accuracy of the signal output by the drive circuit substrate 700 can be improved, and the reliability of the liquid discharge module 20 and the liquid discharge apparatus 1 can be improved.

Further, the heat sink 170 has the opening 172, and the abnormality notification circuits 55*a* and 55*b* are positioned overlapping with the opening 172 along the direction from the rigid member 742 to the rigid member 741. Accordingly, the visibility of the abnormality notification circuits 55*a* and 55*b* is not impaired, and the heat generated in the driving signal output circuit 52 can be efficiently released. As a result, the accuracy of the signal output by the drive circuit substrate 700 can be improved, and the reliability of the liquid discharge module 20 and the liquid discharge apparatus 1 can be improved.

4. Modification Example

Figure 31:
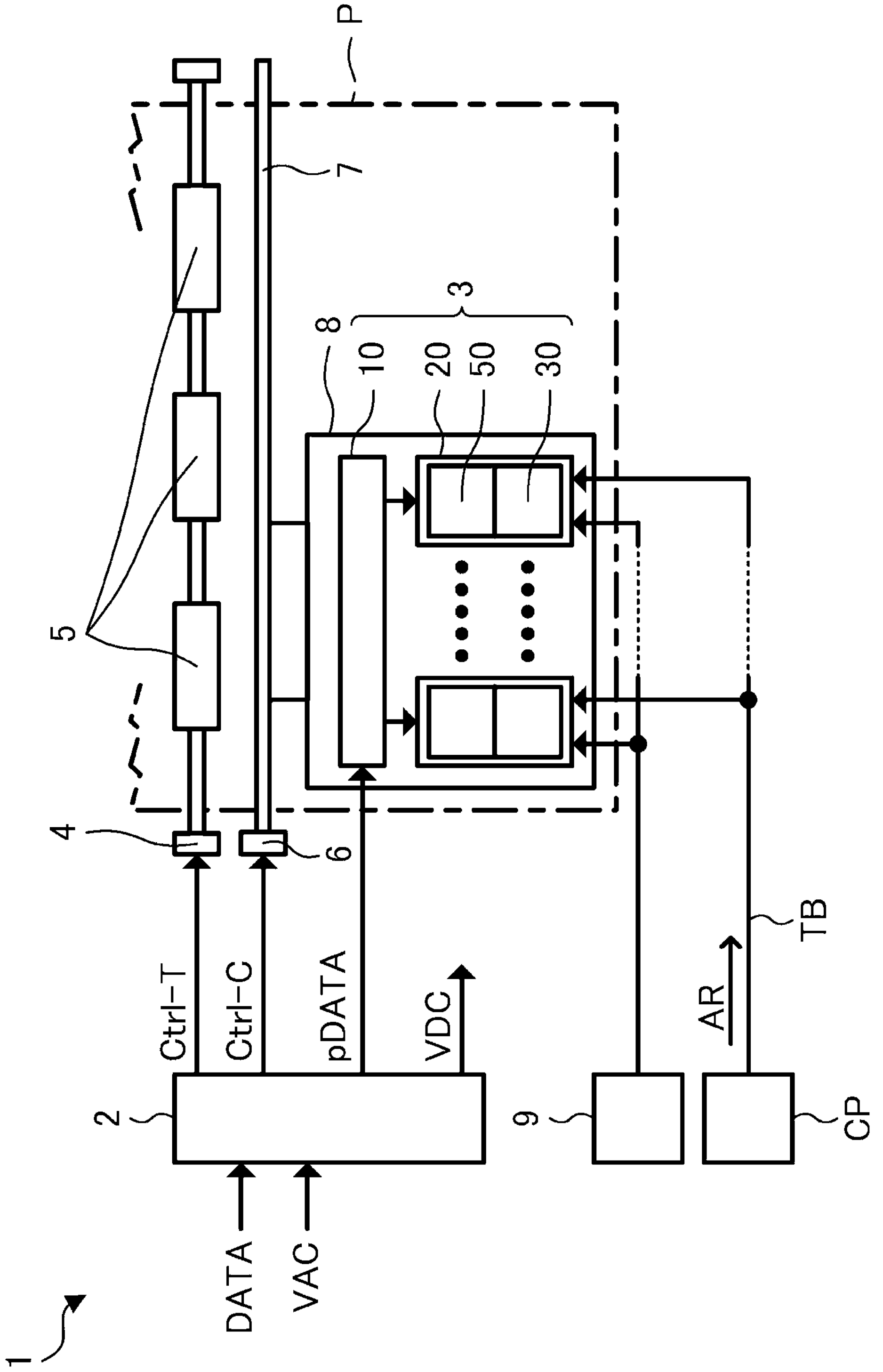
FIG. 31 is a diagram illustrating a schematic configuration of a liquid discharge apparatus of a modification example.

Next, the liquid discharge apparatus 1 of the modification example will be described. FIG. 31 is a diagram illustrating a schematic configuration of the liquid discharge apparatus 1 of a modification example. In the liquid discharge apparatus 1 described above, it is described that the drive circuit module 50 included in the liquid discharge module 20 has the cooling fan 59, and the cooling fan 59 generates an air flow in the gas flow path configured with the rigid wiring members 710, 730, 750, and 770 of the drive circuit substrate 700 to cool the drive circuit substrate 700. However, in the liquid discharge apparatus 1 of the modification example, a compressor CP is provided in place of or in addition to the cooling fan 59, the air flow generated by driving the compressor CP is supplied to the gas flow path configured with the rigid wiring members 710, 730, 750, and 770 of the drive circuit substrate 700 to cool the drive circuit substrate 700.

That is, the liquid discharge apparatus 1 of the modification example includes the print head 30 that discharges an ink as an example of a liquid, the drive circuit module 50 that is electrically coupled to the print head 30, the compressor CP that sends out the compressed air AR, and a tube TB that couples the drive circuit module 50 and the compressor CP, and the compressor CP supplies the compressed air AR via the tube TB to a region where the surface 723 of the rigid member 721, which is the surface 723 of the rigid wiring member 710 included in the drive circuit substrate 700, and the surface 743 of the rigid member 741, which is the surface 743 of the rigid wiring member 730, face each other.

As illustrated in FIG. 31, the compressor CP is provided separately from the head unit 3. At this time, the compressor CP is provided in a space outside the printing region where the head unit 3 discharges the ink to the medium P to form an image, and preferably in a space isolated from the printing region. When the compressor CP is driven, the air in the space is suctioned, compressed, and then output as the compressed air AR. The compressed air AR output by the compressor CP is supplied to the liquid discharge module 20 via the tube TB.

Figure 32:
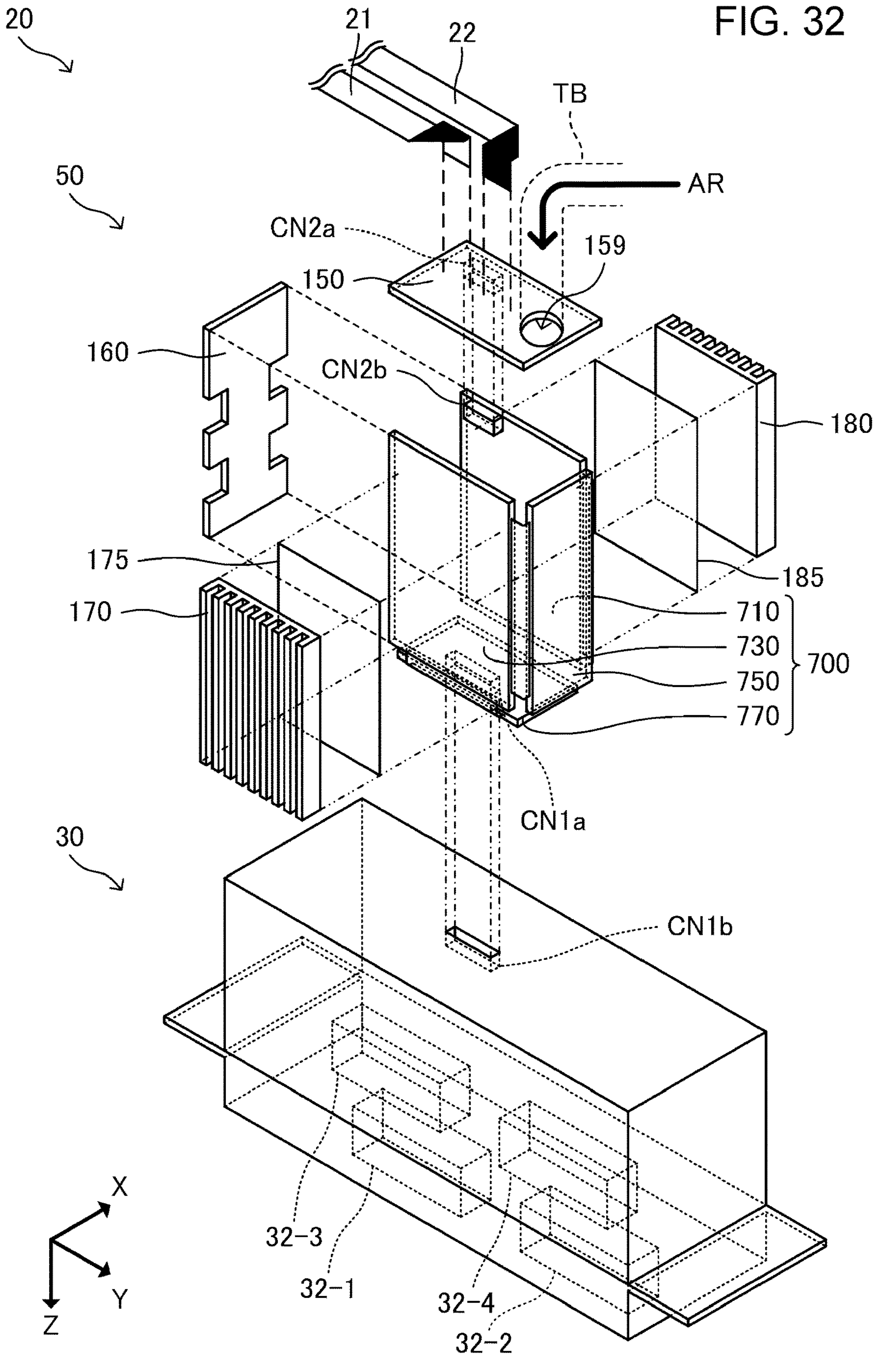
FIG. 32 is an exploded perspective view illustrating an example of a structure of a liquid discharge module of a modification example.

FIG. 32 is an exploded perspective view illustrating an example of a structure of the liquid discharge module 20 of a modification example. As illustrated in FIG. 32, the tube TB is coupled to the through-hole 159 penetrating the surface 151 and the surface 152 formed on the relay substrate 150. As a result, the compressed air AR is supplied to the liquid discharge module 20. The compressed air AR is supplied via the through-hole 159 of the relay substrate 150 to the region where the surface 723 of the rigid member 721, which is the surface 723 of the rigid wiring member 710 of the drive circuit substrate 700 included in the drive circuit module 50, and the surface 743 of the rigid member 741, which is the surface 743 of the rigid wiring member 730, face each other. Even in the liquid discharge apparatus 1 of the modification example configured as described above, the same operational effects as those of the above-described embodiment can be obtained.

Further, in the liquid discharge apparatus 1 of the modification example, as described above, the compressor CP is provided in a space isolated from the printing region. As a result, the compressed air AR output by the compressor CP is not mixed with ink mist which is a part of the ink discharged to the medium P by the print head 30, and dust such as paper dust and feathers which may be generated by transporting the medium P. Therefore, the concern that the ink mist and the dust adhere to various electronic components provided on the drive circuit substrate 700 cooled by the compressed air AR is reduced. As a result, the operational stability of the drive circuit substrate 700 is further improved, and the discharge accuracy of the ink from the print head 30 that operates based on the output signal output by the drive circuit substrate 700 is further improved.

That is, in the liquid discharge apparatus 1 of the modification example, since the cloth is used as the medium P, in a case of the so-called textile printing ink jet printer having a high risk of dust floating in the printing region, from the viewpoint of further improving the operational stability of the drive circuit substrate 700 and further improving the discharge accuracy of the ink from the print head 30, which operates based on the output signal output by the drive circuit substrate 700, particularly large effect is achieved.

Further, in the above-described embodiment, it is described that the temperature detection circuit 56 that detects the environmental temperature of the drive circuit module 50, generates the temperature information signal Tt including temperature information corresponding to the environmental temperature, and outputs the temperature information signal Tt to the head control circuit 12 is provided on the rigid wiring member 750. However, the temperature detection circuit 56 may be provided in the region separated from the driving signal output circuits 52*a*-3, 52*a*-4, 52*b*-3, and 52*b*-4 in the rigid wiring member 730.

Figure 33:
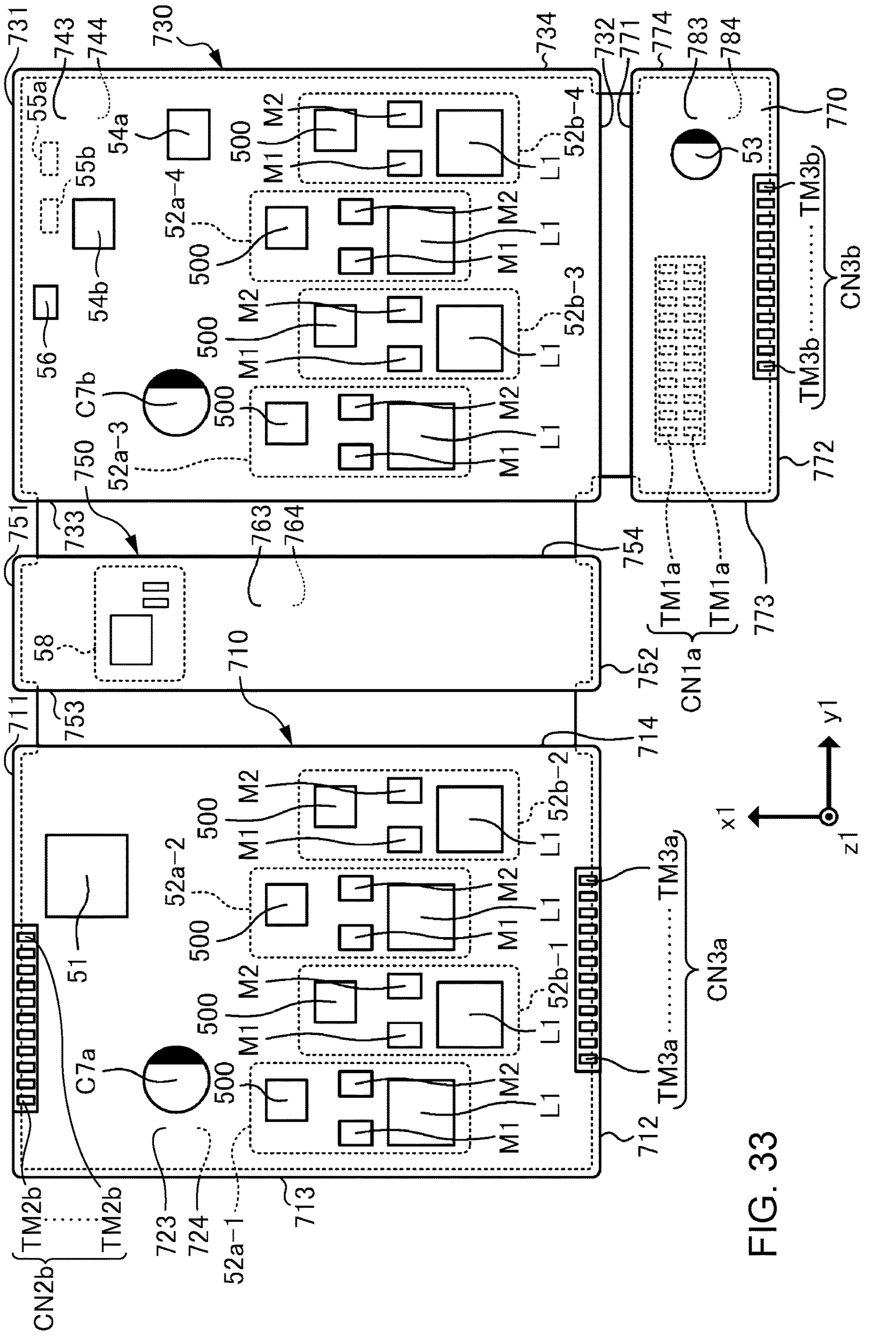
FIG. 33 is a diagram illustrating an example of component arrangement in a drive circuit substrate in an expanded state of a modification example.

FIG. 33 is a diagram illustrating an example of component arrangement in the drive circuit substrate 700 in an expanded state of a modification example. As illustrated in FIG. 33, in the drive circuit substrate 700 of the modification example, the temperature detection circuit 56 is a region separated from the driving signal output circuits 52*a*-3, 52*a*-4, 52*b*-3, and 52*b*-4. Specifically, the temperature detection circuit 56 is provided along the side 731 of the rigid wiring member 730, and the driving signal output circuits 52*a*-3, 52*a*-4, 52*b*-3, and 52*b*-4 are provided in the region along the side 732 positioned facing the side 731 in the rigid wiring member 730. That is, in the rigid wiring member 730, the temperature detection circuit 56 and each of the driving signal output circuits 52*a*-3, 52*a*-4, 52*b*-3, and 52*b*-4 are respectively arranged such that the shortest distance between the temperature detection circuit 56 and the side 731 is shorter than the shortest distance between the temperature detection circuit 56 and the side 732, and the shortest distance between the transistors M1 and M2 included in each of the driving signal output circuits 52*a*-3, 52*a*-4, 52*b*-3, and 52*b*-4, and the side 732 is shorter than the shortest distance between the transistors M1 and M2 included in each of the driving signal output circuits 52*a*-3, 52*a*-4, 52*b*-3, and 52*b*-4, and the side 731.

Even when the temperature detection circuit 56 is arranged in such an arrangement, the temperature detection circuit 56 and the driving signal output circuits 52*a*-3, 52*a*-4, 52*b*-3, and 52*b*-4 are positioned apart from each other. Therefore, the contribution of heat generated in the driving signal output circuits 52*a*-3, 52*a*-4, 52*b*-3, and 52*b*-4 to the temperature detection circuit 56 is reduced, and the same operational effects as those of the above-described embodiments can be obtained.

The embodiments and the modification examples were described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments.

According to an aspect, there is provided a liquid discharge apparatus including: a print head that discharges a liquid; and a substrate unit electrically coupled to the print head, in which the print head includes a first discharge section that has a first piezoelectric element that is displaced by receiving a first driving signal and discharges a liquid by displacement of the first piezoelectric element, and a first connector electrically coupled to the substrate unit, the substrate unit includes a second connector that is electrically coupled to the print head by being fitted to the first connector, and a wiring substrate provided with a plurality of circuit components having the second connector, the wiring substrate is a rigid flexible substrate including a plurality of rigid members provided with the plurality of circuit components and a flexible member more flexible than the plurality of rigid members, the flexible member includes a first surface, a second surface opposite to the first surface, a first region, a second region, a third region, a fourth region, and a fifth region, the fourth region is positioned between the first region and the second region, the fifth region is positioned between the second region and the third region, the plurality of rigid members include a first rigid member, a second rigid member, a third rigid member, and a fourth rigid member, the first rigid member includes a first front surface, and is laminated on the first surface of the first region such that the first front surface extends along the first surface, the second rigid member includes a second front surface, and is laminated on the first surface of the second region such that the second front surface extends along the first surface, the third rigid member includes a third front surface, and is laminated on the first surface of the third region such that the third front surface extends along the first surface, the fourth rigid member includes a fourth front surface, and is laminated on the second surface of the third region such that the fourth front surface extends along the second surface, the first rigid member and the second rigid member are positioned such that the first front surface and the second front surface face each other when the flexible member is bent in the fourth region, the third rigid member is positioned such that a normal direction of the third front surface intersects both a normal direction of the first front surface and a normal direction of the second front surface when the flexible member is bent in the fifth region, the second connector is provided on the fourth rigid member, and sizes of the third rigid member and the fourth rigid member when viewed along a direction from the third rigid member to the fourth rigid member are smaller than a size of the print head when viewed along a direction from the first connector to the first discharge section.

According to this liquid discharge apparatus, by forming the wiring substrate included in the substrate unit into a substantially box shape, it is possible to increase the effective area of the wiring substrate on which the circuit components are provided, and accordingly, the plurality of circuit components can be provided at an appropriate position on the wiring substrate. As a result, the influence of noise on the circuit configured with the plurality of circuit components is reduced, and the accuracy of the signal output by the substrate unit is improved. Further, by making the size of the fourth rigid member provided with the second connector when electrically coupling the substrate unit to the print head smaller than the size of the print head, dense arrangement of the substrate units can be realized. That is, according to this liquid discharge apparatus, it is possible to improve the accuracy of the signal output by the substrate unit in a state where the substrate units are densely arranged. As a result, the discharge accuracy of the ink discharged from the print head is improved, and a high-definition image can be formed on the medium.

In the aspect of the liquid discharge apparatus, the substrate unit may include a first drive circuit that outputs the first driving signal, and the first drive circuit may be provided on at least one of the first rigid member and the second rigid member.

According to this liquid discharge apparatus, the first drive circuit that outputs the first driving signal is provided on the wiring substrate provided with the second connector fitted to the first connector of the print head. Accordingly, the waveform accuracy of the first driving signal input to the print head is improved, and as a result, the discharge accuracy of the ink discharged from the first discharge section is improved.

In the aspect of the liquid discharge apparatus, the print head may include a second discharge section that has a second piezoelectric element that is displaced by receiving a second driving signal and discharges a liquid by displacement of the second piezoelectric element, the substrate unit may include a second drive circuit that outputs the second driving signal, the first drive circuit may be provided on one of the first rigid member and the second rigid member, and the second drive circuit may be provided on another of the first rigid member and the second rigid member.

According to this liquid discharge apparatus, the second drive circuit that outputs the second driving signal is provided on the wiring substrate provided with the second connector fitted to the first connector of the print head. Accordingly, more detailed ink discharge control becomes possible, and a higher-definition image can be formed on the medium. Further, since the first drive circuit and the second drive circuit are provided on different rigid members, the concern that the heat generated in the first drive circuit and the heat generated in the second drive circuit interfere with each other is reduced, and the operational stability of the substrate unit is improved.

In the aspect of the liquid discharge apparatus, the substrate unit may include a first fixing member and a second fixing member, the first fixing member may be provided on the first rigid member, the second fixing member may be provided on the third rigid member, and the first rigid member may be fixed to the third rigid member when the first fixing member and the second fixing member are fitted to each other.

According to this liquid discharge apparatus, the shape of the wiring substrate of the substrate unit can be held without using a dedicated framework, and the sizes of the substrate unit and the liquid discharge apparatus provided with the substrate unit can be further reduced.

In the aspect of the liquid discharge apparatus, the first rigid member and the third rigid member may be electrically coupled to each other via the first fixing member and the second fixing member.

According to this liquid discharge apparatus, the signal generated by the first rigid member can propagate to the third rigid member and the fourth rigid member via the first fixing member and the second fixing member. As a result, the propagation path of the signal generated by the first rigid member can be shortened, and the accuracy of the signal can be improved.

In the aspect of the liquid discharge apparatus, the plurality of circuit components may include an FPGA that outputs a print head control signal that controls an operation of the print head, the FPGA may be provided on the first rigid member, and the print head control signal may propagate through the first fixing member and the second fixing member, and may be input to the print head.

According to this liquid discharge apparatus, the print head control signal generated by the first rigid member can propagate to the third rigid member and the fourth rigid member via the first fixing member and the second fixing member. Thereby, the propagation path of the print head control signal can be shortened, and the accuracy of the print head control signal can be improved. As a result, the operation accuracy of the print head is improved, and the discharge accuracy of the ink discharged from the print head is improved.

In the aspect of the liquid discharge apparatus, in a state where the wiring substrate is electrically coupled to the print head by the first connector and the second connector, the wiring substrate may be positioned inside the print head when viewed along a direction from the wiring substrate to the print head.

According to this liquid discharge apparatus, the substrate units can be further densely arranged, and the sizes of the substrate unit and the liquid discharge apparatus provided with the substrate unit can be further reduced.

In the aspect of the liquid discharge apparatus, the plurality of rigid members may include a fifth rigid member and a sixth rigid member, the fifth rigid member may include a fifth front surface, and may be laminated on the second surface of the first region such that the fifth front surface extends along the second surface, the sixth rigid member may include a sixth front surface, and may be laminated on the second surface of the second region such that the sixth front surface extends along the second surface, and a size of the third rigid member when viewed along a direction from the third rigid member to the fourth rigid member may be smaller than a size of the first rigid member when viewed along a direction from the first rigid member to the fifth rigid member, and may be smaller than a size of the second rigid member when viewed along a direction from the second rigid member to the sixth rigid member.

According to this liquid discharge apparatus, it is possible to further increase the effective area of the wiring substrate on which the circuit components are provided, and accordingly, the plurality of circuit components can be provided at a more appropriate position on the wiring substrate. As a result, the influence of noise on the circuit configured with the plurality of circuit components is further reduced, and the accuracy of the signal output by the substrate unit is further improved.

What is claimed is:

1. A liquid discharge apparatus comprising:

a print head that discharges a liquid; and a substrate unit electrically coupled to the print head, wherein the print head includes a first discharge section that has a first piezoelectric element that is displaced by receiving a first driving signal and discharges a liquid by displacement of the first piezoelectric element, and a first connector electrically coupled to the substrate unit, the substrate unit includes a second connector that is electrically coupled to the print head by being fitted to the first connector, and a wiring substrate provided with a plurality of circuit components having the second connector, the wiring substrate is a rigid flexible substrate including a plurality of rigid members provided with the plurality of circuit components and a flexible member more flexible than the plurality of rigid members, the flexible member includes a first surface, a second surface opposite to the first surface, a first region, a second region, a third region, a fourth region, and a fifth region, the fourth region is positioned between the first region and the second region, the fifth region is positioned between the second region and the third region, the plurality of rigid members include a first rigid member, a second rigid member, a third rigid member, and a fourth rigid member, the first rigid member includes a first front surface, and is laminated on the first surface of the first region such that the first front surface extends along the first surface, the second rigid member includes a second front surface, and is laminated on the first surface of the second region such that the second front surface extends along the first surface, the third rigid member includes a third front surface, and is laminated on the first surface of the third region such that the third front surface extends along the first surface, the fourth rigid member includes a fourth front surface, and is laminated on the second surface of the third region such that the fourth front surface extends along the second surface, the first rigid member and the second rigid member are positioned such that the first front surface and the second front surface face each other when the flexible member is bent in the fourth region, the third rigid member is positioned such that a normal direction of the third front surface intersects both a normal direction of the first front surface and a normal direction of the second front surface when the flexible member is bent in the fifth region, the second connector is provided on the fourth rigid member, and sizes of the third rigid member and the fourth rigid member when viewed along a direction from the third rigid member to the fourth rigid member are smaller than a size of the print head when viewed along a direction from the first connector to the first discharge section.

2. The liquid discharge apparatus according to claim 1, wherein the substrate unit includes a first drive circuit that outputs the first driving signal, and the first drive circuit is provided on at least one of the first rigid member and the second rigid member.

3. The liquid discharge apparatus according to claim 2, wherein the print head includes a second discharge section that has a second piezoelectric element that is displaced by receiving a second driving signal and discharges a liquid by displacement of the second piezoelectric element, the substrate unit includes a second drive circuit that outputs the second driving signal, the first drive circuit is provided on one of the first rigid member and the second rigid member, and the second drive circuit is provided on another of the first rigid member and the second rigid member.

4. The liquid discharge apparatus according to claim 1, wherein the substrate unit includes a first fixing member and a second fixing member, the first fixing member is provided on the first rigid member, the second fixing member is provided on the third rigid member, and the first rigid member is fixed to the third rigid member when the first fixing member and the second fixing member are fitted to each other.

5. The liquid discharge apparatus according to claim 4, wherein the first rigid member and the third rigid member are electrically coupled to each other via the first fixing member and the second fixing member.

6. The liquid discharge apparatus according to claim 5, wherein the plurality of circuit components include an FPGA that outputs a print head control signal that controls an operation of the print head, the FPGA is provided on the first rigid member, and the print head control signal propagates through the first fixing member and the second fixing member, and is input to the print head.

7. The liquid discharge apparatus according to claim 1, wherein in a state where the wiring substrate is electrically coupled to the print head by the first connector and the second connector, the wiring substrate is positioned inside the print head when viewed along a direction from the wiring substrate to the print head.

8. The liquid discharge apparatus according to claim 1, wherein the plurality of rigid members include a fifth rigid member and a sixth rigid member, the fifth rigid member includes a fifth front surface, and is laminated on the second surface of the first region such that the fifth front surface extends along the second surface, the sixth rigid member includes a sixth front surface, and is laminated on the second surface of the second region such that the sixth front surface extends along the second surface, and a size of the third rigid member when viewed along a direction from the third rigid member to the fourth rigid member is smaller than a size of the first rigid member when viewed along a direction from the first rigid member to the fifth rigid member, and is smaller than a size of the second rigid member when viewed along a direction from the second rigid member to the sixth rigid member.

* * * * *